United States Patent [19]
Kamada et al.

[11] Patent Number: 5,980,426
[45] Date of Patent: *Nov. 9, 1999

[54] AUTOMATIC TRANSMISSION CONTROL SYSTEM FOR AUTOMOBILES

[75] Inventors: Shinya Kamada; Shigeru Nagayama; Shin Nakano; Kenji Sawa, all of Hiroshima, Japan

[73] Assignee: Mazda Motor Corporation, Hiroshima, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/834,823

[22] Filed: Mar. 31, 1997

[30] Foreign Application Priority Data

Mar. 31, 1996 [JP] Japan .................................. 8-103874

[51] Int. Cl.$^6$ .................................................. F16H 61/00
[52] U.S. Cl. ........................... 477/143; 477/156; 477/158
[58] Field of Search .................................... 477/143, 148, 477/154, 156, 158

[56] References Cited

U.S. PATENT DOCUMENTS

| | | |
|---|---|---|
| 3,956,947 | 5/1976 | Leising et al. . |
| 5,063,814 | 11/1991 | Baba et al. ............................ 477/159 X |
| 5,159,856 | 11/1992 | Yoshimura et al. ................. 477/162 X |
| 5,197,006 | 3/1993 | Saitou et al. . |
| 5,275,069 | 1/1994 | Baba et al. ............................. 477/98 X |
| 5,339,709 | 8/1994 | Suzuki et al. ............................. 477/145 |
| 5,393,279 | 2/1995 | Bota et al. ................................ 477/143 |
| 5,397,284 | 3/1995 | Matsumoto et al. ..................... 477/150 |
| 5,443,432 | 8/1995 | Fujita et al. ......................... 477/143 X |
| 5,547,437 | 8/1996 | Kamada et al. ..................... 477/155 X |
| 5,551,931 | 9/1996 | Matsumoto ......................... 477/155 X |
| 5,611,752 | 3/1997 | Kamada et al. ..................... 477/156 X |
| 5,667,457 | 9/1997 | Kuriyama et al. .................. 477/158 X |
| 5,725,455 | 3/1998 | Kamada et al. ........................... 477/62 |

FOREIGN PATENT DOCUMENTS

| | | |
|---|---|---|
| 0 565 111 | 10/1993 | European Pat. Off. . |
| 0 740 089 | 10/1996 | European Pat. Off. . |
| 6-21643 | 3/1994 | Japan . |

*Primary Examiner*—Dirk Wright
*Assistant Examiner*—Peter T. Kwon
*Attorney, Agent, or Firm*—Sixbey, Friedman, Leedom & Ferguson; Donald R. Studebaker

[57] ABSTRACT

An automatic transmission control system for an automotive automatic transmission including a speed sensor for detecting a vehicle speed of the vehicle, a load sensor for detecting a load acting on the driving torque generator, a torque sensor for detecting input torque transmitted to the automatic transmission from the driving torque generator, first working fluid pressure control communicating both a first friction coupling element's unlocking pressure chamber and a second friction coupling element's pressure chamber with the working fluid source in the hydraulic pressure control system for controlling supply of working fluid pressure to and from both the unlocking pressure chambers and a second working fluid pressure control in the fluid path communicating both the first friction coupling element's locking pressure chamber with the working fluid source for controlling supply of working fluid pressure to and from the first friction coupling element's locking pressure chamber. Thereby controlling the second working fluid pressure control such that, until a start of a substantial gear shift period of time from an appearance of the specific gear shift command signal, the level of the working fluid pressure supplied to the locking pressure chamber of the first friction coupling element being directly related to a level of the working fluid pressure supplied to the locking pressure chamber of the first friction coupling element during the substantial gear shift period of time.

7 Claims, 32 Drawing Sheets

AUTOMATIC TRANSMISSION CONTROL SYSTEM FOR AUTOMOBILES

BACKGROUND OF THE INVENTION

1. Field of the Invention

This invention relates to an automatic transmission control system for an automobile, and more particularly, to an improvement of an automatic transmission control system in which shift control for a specific gear shift is performed by especially controlling a hydraulic working pressure.

2. Description of the Related Art

Automatic transmissions for automotive vehicles, which typically comprise a torque converter and a transmission gear mechanism, are automatically shifted into desired gears by selectively locking and unlocking a plurality of friction coupling elements such as clutches and brakes to switch the torque transmission path of the transmission gear mechanism. Such an automatic transmission is provided with hydraulic pressure control systems which supplies a pressurized working fluid to and discharges a pressurized working fluid from the respective friction coupling elements to selectively lock and unlock them. This type of automatic transmission includes, in addition to regular types of friction coupling elements, a servo cylinder type of friction coupling element provided with a band brake. This servo cylinder type friction coupling element has a servo cylinder which is divided into two pressure chambers, namely a servo apply pressure chamber and a servo release pressure chamber, by means of a spring loaded piston ordinarily forced in such a direction as to move toward the servo release pressure chamber. The servo cylinder type friction coupling element is locked when only the servo apply pressure chamber is supplied with a pressurized working fluid, and unlocked when both servo apply pressure chamber and servo release pressure chamber are not supplied with a pressurized working fluid, when both servo apply pressure chamber and servo release pressure chamber are supplied with a pressurized working fluid, and when only the servo release pressure chamber is supplied with a pressurized working fluid.

Some of available gear shifts have a necessity of locking a specific friction coupling element simultaneously with unlocking another specific friction coupling element. For example, in the case where the servo cylinder type friction coupling element is employed as a 2–4 brake to be locked in a second gear and in a fourth gear, and a single pressure chamber friction coupling element is employed as a 3–4 clutch to be locked in a third gear and in the fourth gear, it is necessary for a 2–3 gear shift to lock the 3–4 clutch simultaneously with unlocking the 2–4 brake. In this instance, because the pressurized working fluid is simultaneously supplied to both 2–4 brake and 3–4 clutch, the hydraulic pressure control circuit has fluid paths which branch off from a common fluid path and lead to the pressure chambers of these 2–4 brake and 3–4 clutch, respectively and is provided with a single hydraulic pressure regulating valve, such as a duty solenoid valve, located at the junction between the branch fluid paths and common fluid path in order to control supply of the pressurized working fluid to the pressure chambers of the 2–4 brake and 3–4 clutch. Such a hydraulic pressure control system for an automotive automatic transmission is known from, for example, Japanese Patent Publication No. 6-21643.

In the prior art hydraulic pressure control system, while the 3–4 clutch is supplied with a pressurized working fluid (which is referred to as a clutch locking fluid pressure), the 2–4 brake at the servo release pressure chamber is simultaneously supplied with a pressurized working fluid (which is referred to as a servo releasing fluid pressure) to force the piston in such a direction as to release the 2–4 brake. It is hard for the hydraulic pressure control system to perform precise control of the pressurized working fluid during a movement of the piston, and hence it is impossible to perform precise gear shift control which causes the turbine speed to fall keeping the change rate of turbine speed in agreement with a target rate through the control of 3–4 clutch locking pressure during a gear shift.

In regard to this, it may be done to control the 3–4 clutch locking fluid pressure indirectly through the servo releasing fluid pressure by controlling a pressurized working fluid in the servo apply pressure chamber of the 2–4 brake (which is referred to as a servo applying fluid pressure). In this case, even while the piston moves in the servo cylinder of the 2–4 brake, it is enabled to control the 3–4 clutch locking fluid pressure so as to cause, for example, an appropriate change in turbine speed during a gear shift. When controlling the 3–4 clutch locking fluid pressure indirectly by means of the servo applying fluid pressure, the servo applying fluid pressure, which is at a relatively high pressure level and has been supplied to provide a second gear, is fallen once with an effect of causing smooth control of the 3–4 clutch locking fluid pressure, and kept at the fallen pressure level to provide a torque phase. Afterward, when the gear shift is actually activated, in other words when the gear shift control enters on an inertia phase during which the turbine speed falls, the control of servo applying fluid pressure is performed so as to cause a satisfactory 3–4 clutch locking action.

During this control of servo applying fluid pressure, a serious problem is encountered. Specifically, when the servo applying fluid pressure is fallen for the purpose of controlling the 3–4 clutch locking fluid pressure, it is set to a pressure level suitable for the 3–4 clutch to be smoothly locked which is a specific pressure level meeting to, for example, a turbine speed change rate yielded due to input torque to the 3–4 clutch and a locking action of the 3–4 clutch. In some cases, the specific pressure level is insufficient against input torque to the 2–4 brake, allowing slippage of the 2–4 brake in advance of initiation of the 3–4 clutch locking action. This advanced slippage of the 2–4 brake, which is significant especially in the case where, while the specific pressure level of 3–4 clutch locking fluid pressure is made low due to a low turbine speed change rate when the engine is operating in a range of lower speeds, the 2–4 brake input torque increases more than the specific pressure level of 3–4 clutch locking fluid pressure increases in accordance with engine loads as a result of having entered an operating range of higher engine loads, yields an engine blow.

SUMMARY OF THE INVENTION

It is an objective of the present invention to provide an automatic transmission control system for an automotive automatic transmission which causes satisfactorily a specific gear shift, such as a 2–3 gear shift which has a necessity of locking a specific friction coupling element simultaneously with unlocking another specific friction coupling element.

The foregoing object of the present invention is achieved by providing a control system for an automotive automatic transmission comprised of a transmission gear mechanism equipped with a plurality of friction coupling elements, and a hydraulic pressure control circuit which supplies a pressurized fluid to and discharges a pressurized fluid from the friction coupling elements to selectively lock and unlock them to change the torque transmission path in the transmission gear mechanism and thereby to provide desired gears. The friction coupling elements include a first and second specific friction coupling elements locked and unlocked to provide a specific gear. The first friction coupling element is of a cylinder type which has a cylinder chamber divided into a servo apply pressure chamber and a servo release pressure chamber by a piston and is locked when only the servo apply pressure chamber is supplied with a pressurized working fluid and unlocked when at least the servo release pressure chamber is supplied with a pressurized working fluid and when both servo apply pressure chamber and servo release pressure chamber are not supplied with a pressurized working fluid. The second specific friction coupling element has a single pressure chamber and is locked when the pressure chamber is supplied with a pressurized working fluid. The second friction coupling element is in communication with the servo release pressure chamber of the first specific friction coupling element. The control system has first and second fluid control means according to driving conditions to automatically cause a gear shift meeting to the driving condition. Specifically, during a specific gear shift which needs a change from a state where, while the servo apply pressure chamber of the first specific friction coupling element is supplied with a pressurized working fluid, both servo apply pressure chamber and pressure chamber are not supplied with a pressurized working fluid to a state where all of the servo apply pressure chamber, the servo release pressure chamber and the pressure chamber are supplied with a pressurized working fluid, the control system controls the second fluid control means to make the pressurized working fluid supplied to the servo apply pressure chamber lower in pressure level during a gear shift period for which a change in rotational speed input to the transmission gear mechanism is caused due to the specific gear shift than before and after the gear shift period, to cause the pressurized working fluid supplied to the servo apply pressure chamber to reach closely to a pressure level attained in the gear shift period within a previous period from an appearance of a shift command for the specific gear shift to the beginning of the gear shift period, and, according to the input torque, to prevent the pressurized working fluid supplied to the servo apply pressure chamber during the previous period from dropping a critical pressure level. This critical pressure level may be specified as a level at which the transmission gear mechanism at its rotational speed input means is allowed to run idle, or otherwise as a level determined in accordance with the input torque.

According to another embodiment, the automatic transmission control system controls the second fluid control means to make the pressurized working fluid supplied to the servo apply pressure chamber to become equal to a pressure level attained in the gear shift period within the previous period.

With the automatic transmission control system thus structured, in the case where, during the specific gear shift which is caused by unlocking the first specific friction coupling element and simultaneously locking the second specific friction coupling element, the pressurized working pressure of the second specific friction coupling element during the specific gear shift is controlled indirectly by control of the pressurized working pressure of the servo apply pressure chamber of the first specific friction coupling element through the pressurized working pressure of the servo release pressure chamber of the first specific friction coupling element, because the pressurized working pressure of the servo apply pressure chamber of the first specific friction coupling element is changed to be close to the pressure level attained during the specific gear shift before the commencement of actual shift operation, the control of pressurized working pressure of the second specific friction coupling element during the actual shift operation is initiated smoothly. Furthermore, when the pressurized working pressure of the servo apply pressure chamber of the first specific friction coupling element is changed, it is prevented from dropping below the critical pressure level, so that an engine blow-up operation due to slippage of the incompletely locked first specific friction coupling element. For example, even in the case where the pressurized working pressure of the servo apply pressure chamber of the first specific friction coupling element, after having been changed, is set at such a pressure level as to initiate smoothly locking the second specific friction coupling element, and as a result, the pressurized working pressure of the servo apply pressure chamber of the first specific friction coupling element is expected to drop below a pressure level necessary for the first specific friction coupling element to remain locked in, in particular, a range of low engine speeds and high engine loads, it is effectively prevented from encountering such an undesirable drop. The pressurized working fluid supplied to the servo apply pressure chamber of the first specific friction coupling element is changed to be equal to a pressure level attained in the gear shift period within the previous period. Furthermore, the critical pressure level is specified as a level at which the rotational speed input shaft of transmission gear mechanism is allowed to run idle, or otherwise as a level determined in accordance with the input torque, the gear shift is certainly prevented from starting with a delay due to over restriction of a drop in the pressurized working fluid supplied to the servo apply pressure chamber of the first specific friction coupling element when the input torque is low, or from yielding an engine blow-up operation due to an insufficient drop in the pressurized working fluid supplied to the servo apply pressure chamber of the first specific friction coupling element when the input torque is high.

BRIEF DESCRIPTION OF THE DRAWINGS

The foregoing and other objects and features of the present invention will be clearly understood from the following detailed description of preferred embodiments when read in conjunction with the accompanying drawings, in which.

DETAILED DESCRIPTION OF THE PREFERRED EMBODIMENT

Mechanical Structure

Figure 1:
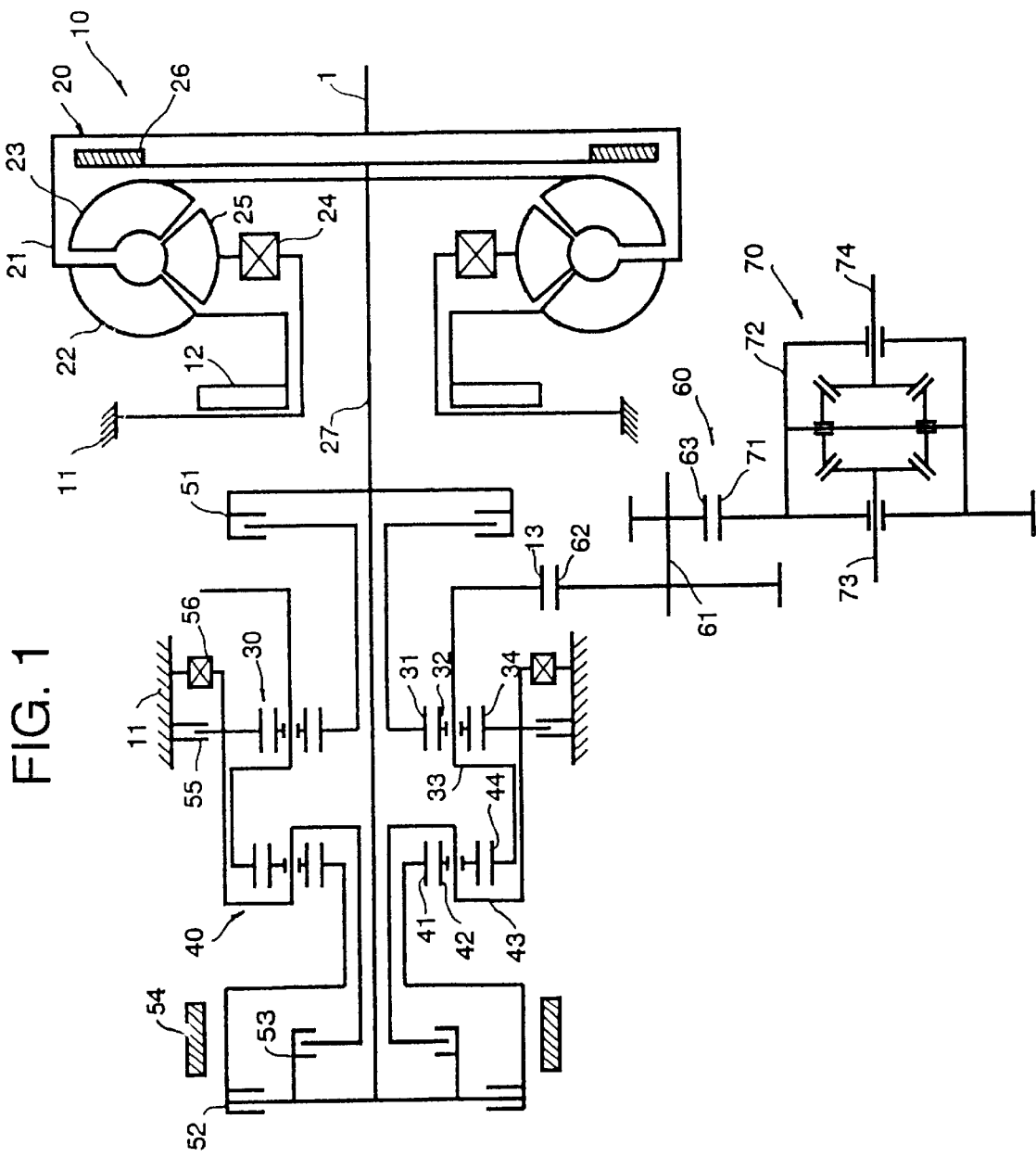
FIG. 1 is a schematic skeleton view showing a mechanical structure of an automatic transmission equipped with a control system of the present invention.

Referring to the drawings in detail, in particular, to FIG. 1 which is a skeleton diagram schematically showing the entire mechanical structure of an automatic transmission 10 in which an automatic transmission control system in accordance with an embodiment of the present invention is incorporated, the automatic transmission 10 has, as its main structural elements, a hydraulic torque converter 20 and front and rear planetary gear mechanisms 30 and 40 arranged contiguously to each other as a transmission gear mechanism which are driven by means of output torque of the torque converter 20. The automatic transmission 10 further has a plurality of friction coupling elements 51–55, such as clutches, brakes and so forth, and a one-way clutch 56 which are selectively locked and unlocked to switch the power transmission path of the front and rear planetary gear mechanism 30 and 40, placing the automatic transmission 10 into desired gears, namely first (1st) to fourth (4th) gears in a drive (D) range, first (1st) to third (3rd) gears in a second (S) range, first (1st) and second (2nd) gears in a low (L) range, and a reverse (RV) gear in a reverse (R) range.

The hydraulic torque converter 20 is comprised of a pump 22 located within a converter housing 21 which is fastened to an engine output shaft 1, a turbine 23 which is arranged to face to the pump 22 and driven by the pump 22 through a working fluid, and a stator 25 which is supported between the pump 22 and the turbine 23 by a transmission housing 11 through a one-way clutch 24 and does multiply engine output torque. The hydraulic torque converter 20 is provided with a lockup clutch 26 between the converter housing 21 and the turbine 23 to mechanically lock the engine output shaft 1 (pump 22) and the turbine 23 together when the lockup clutch 26 is activated. Transmission of engine torque is made from the turbine 23 to the front and rear planetary gear mechanisms 30 and 40 through a turbine shaft 27 fastened to the turbine 23. An oil pump 12, which is driven by the engine output shaft 1 through the converter housing 21 of the hydraulic torque converter 20, is arranged on one side of the hydraulic torque converter 20 opposite to the engine.

Each of the front and rear planetary gear mechanisms 30 and 40 is comprised of a sun gear 31, 41, and a plurality of pinions 32, 42 in mesh with the sun gear 31, 41, a pinion carrier 33, 43 which supports these pinions 32, 42, and a ring gear 34, 44 in mesh with the pinions 32, 42. There are provided in the transmission gear mechanism a forward clutch (FWCL) 51 between the turbine shaft 27 and the sun gear 31 of the front planetary gear mechanism 30, a reverse clutch (RVCL) 52 between the turbine shaft 27 and the sun gear 41 of the rear planetary gear mechanism 40, a 3rd–4th clutch (3–4CL) 53 between the turbine shaft 27 and the pinion carrier 43 of the rear planetary gear mechanism 40, and a 2nd–4th (2–4) brake (2–4BR) 54 which locks the sun gear 41 of the rear planetary gear mechanism 40. Between these front and rear planetary gear mechanisms 30 and 40, the pinion carrier 33 and the ring gear 34 of the front planetary gear mechanism 30 are linked with the ring gear 44 and the pinion carrier 43 of the rear planetary gear mechanism 40, respectively. A low-reverse brake (LRBR) 55 and the one-way clutch (OWCL) 56 are arranged in parallel with respect to these pinion carrier 33 and ring gear 44 and interposed between these pinion carrier 33 and ring gear 44 and the transmission housing 11. Further, there is provided in the transmission gear mechanism an output gear 13 in mesh with the pinion carrier 33.

An intermediate transmission mechanism 60 includes a front intermediate gear 62 fastened to an idle shaft 61 and being in mesh with the output gear 13 and a second intermediate gear 63 fastened to the idle shaft 61 and being in mesh with an input gear 71 of a differential gear 70. Output torque from the automatic transmission 10 is transmitted to the differential case 72 from the output gear 13 through these front and rear intermediate gears 61 and 63 to drive right and left axles 73 and 74.

Operation of the friction coupling elements (brakes and clutches) 51–55 and one-way clutch (OWCL) 56 in regard to the specified transmission gears is described in Table I.

Figure 2:
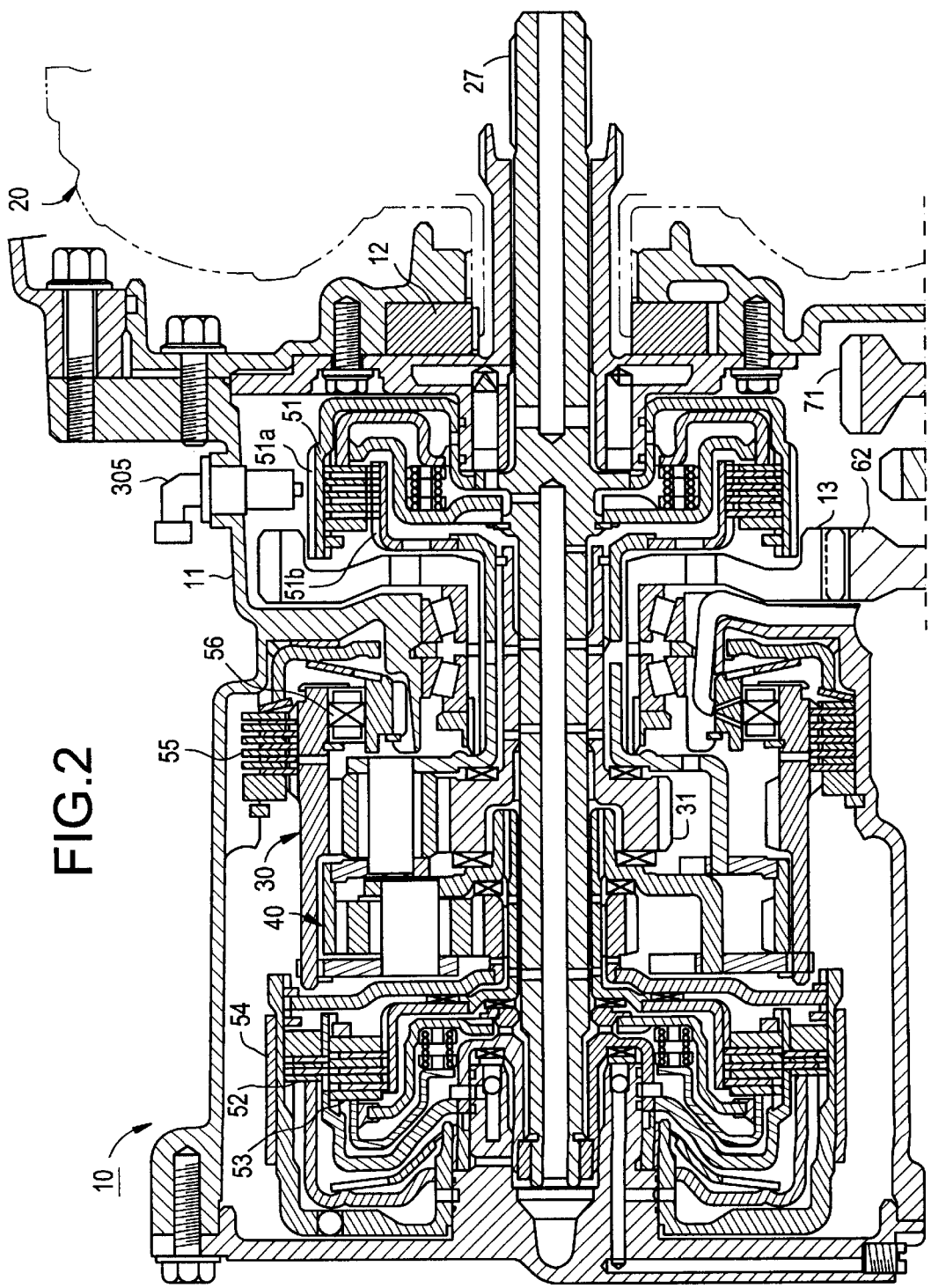
FIG. 2 is a cross-sectional view of a transmission gear mechanism of the automatic transmission shown in FIG. 1.

The transmission gear mechanism of the automatic transmission 10 shown in the skeleton diagram in FIG. 1 is practically constructed as shown in FIG. 2. As shown in FIG. 2, the automatic transmission 10 is provided with a turbine speed sensor 305 installed in the transmission housing 11 which is used in control as will be described later. This turbine speed sensor 305 at its head is installed in order to be opposite to the periphery of a drum 51a of the forward clutch (FWCL) 51 which rotates together with the turbine shaft 27 in one united body and so as to detect the rotational speed of the turbine shaft 27 based on a periodic change of the magnetic field which is generated by splines formed on the periphery of the drum 51a.

In Table I, the low-reverse brake (LRBR) 55 is locked only for the 1st gear.

TABLE 1

| Gear | FWCL (51) | 2-4BR (54) | 3-4CL (53) | LRBR (55) | RVCL (52) | OWCL (56) |
|------|-----------|------------|------------|-----------|-----------|-----------|
| 1ST  | O         |            |            | (O)       |           | O         |
| 2ND  | O         | O          |            |           |           |           |
| 3RD  | O         |            | O          |           |           |           |
| 4TH  |           | O          | O          |           |           |           |
| RV   |           |            |            |           | O         | O         |

Hydraulic Pressure Control Circuit

Figure 3:
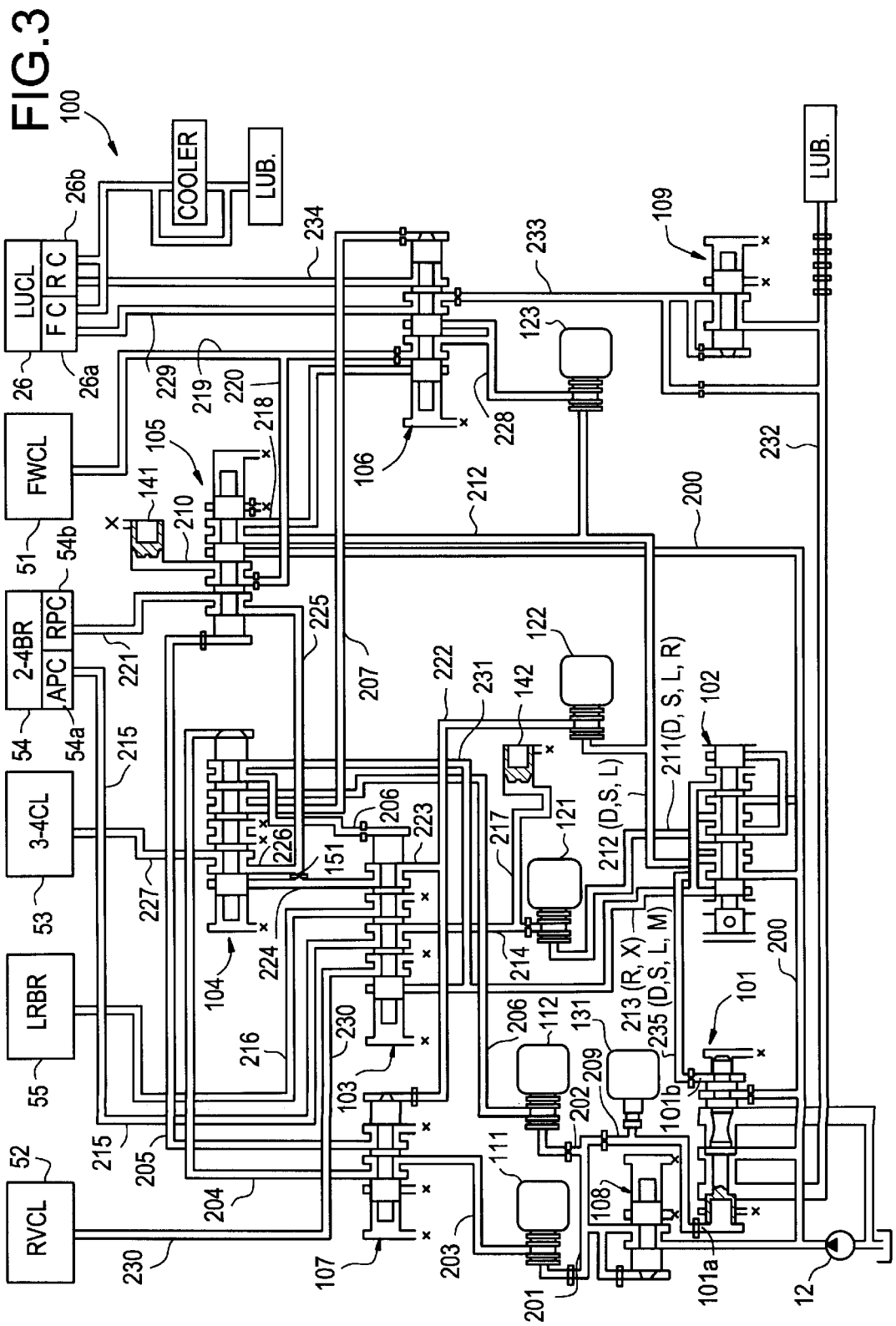
FIG. 3 is a hydraulic control circuit of an automatic transmission control system in accordance with an embodiment of the present invention.

FIG. 3 is a circuit diagram showing a hydraulic pressure control system for supplying the working hydraulic pressure to and releasing the working hydraulic pressure from the pressure chambers of the friction coupling elements 51–55 shown in FIGS. 1 and 2. It is to be noted that among the friction coupling elements, the 2–4 brake (2–4BR) 54, which is comprised of a band brake, has a servo apply pressure chamber 54a and a servo release pressure chamber 54b into which the working hydraulic pressure is supplied. Specifically, when the working hydraulic pressure is supplied into only the servo apply pressure chamber 54a, the 2–4 brake (2–4 BR) 54 is activated, and when the working hydraulic pressure is supplied into only the servo release pressure chamber 54b, or when the working hydraulic pressure is not supplied into the servo apply pressure chamber 54a nor into the servo release pressure chamber 54b, as well as when the working hydraulic pressure is supplied into both servo apply pressure chamber 54a and servo release pressure chamber 54b, the 2–4 brake (2–4BR) 54 is released. Each of the remaining friction coupling elements 51–53 and 55 has a single pressure chamber, and is locked when the working hydraulic pressure is supplied into the pressure chamber thereof.

As shown in FIG. 3 in detail, the hydraulic control system 100 is provided with, as the essential structural elements, a regulator valve 101 for generating a specified level of line hydraulic pressure by regulating discharge hydraulic pressure of the oil pump 12, a manual shift valve 102 which is manually operated to switch the ranges, and various switching valves, including a low-reverse valve 103, a bypass valve 104, a 3–4 shift valve 105 and a lockup control valve 106, for switching the fluid paths leading to the friction coupling elements 51–55, respectively, which are activated during gear shifts. The hydraulic control system 100 is further provided with first and second ON-OFF solenoid valves (which are hereafter referred to simply as first and second solenoid valves or SVs) 111 and 112 in order to operate these switching valves 103–106, a solenoid relay valve (which is hereafter abbreviated as SRV if necessary) 107 which switches the destination of the supply of working hydraulic pressure from the first solenoid valve 111, and first, second and third duty solenoid valves (which are hereafter abbreviated as first, second and third DSVs if necessary) 121, 122 and 123 which perform controlled generation, regulation and discharge of the working hydraulic pressure to be supplied into the pressure chambers of the friction coupling elements 51–55.

The first and second solenoid valves (SVs) 111 and 112 and the first, second, and third duty solenoid valves (DSV) 121, 122 and 123 are of a three-way type which provides communication of the fluid path between upstream and downstream therefrom and drains the working fluid from the fluid path downstream therefrom. During draining, because the fluid path upstream from each valve is shut off, the oil pump 12 does not discharge the working fluid uselessly from the fluid path upstream the valve, reducing drive loss.

When each of the first and second solenoid valves (SVs) 111 and 112 is activated or turned ON, it brings the fluid paths on upstream and downstream sides therefrom into communication. Further, when each of the first, second and third duty solenoid valves (DSVs) 121, 122 and 123 is turned OFF, in other words, when the duty solenoid valve (DSV) 121, 122, 123 operates at a duty rate of 0% (a rate of an ON duration of time in one ON-OFF cycle), it fully opens to bring the fluid paths on upstream and downstream sides thereof into complete communication; when turned ON, in other words, when operates at a duty rate of 100%, it drains the working fluid from the fluid path downstream therefrom by shutting off the fluid path upstream thereof; and when operates at an intermediate duty rate, it generates a hydraulic pressure in the fluid path downstream therefrom regulated according to the duty rate by using a hydraulic pressure in the fluid path upstream therefrom as a source hydraulic pressure.

The line hydraulic pressure regulated through the regulator valve 101 is supplied to the manual shift valve 102 through a main hydraulic pressure line 200 as well as to a solenoid reducing valve 108 (which is hereafter referred to simply as a reducing valve) and the 3–4 shift valve 105. The line hydraulic pressure supplied to the reducing valve 108 is reduced to a fixed level and then supplied to the first and second solenoid valves (SVs) 111 and 112 through hydraulic pressure lines 201 and 202, respectively. While the fixed level line hydraulic pressure is supplied to the solenoid relay valve (SRV) 107 through a hydraulic pressure line 203 when the first solenoid valve (SV) 111 is ON, it is further supplied to a control port of the bypass valve 104 as a pilot hydraulic pressure through a hydraulic pressure line 204 when the spool of the solenoid relay valve (SRV) 107 is placed in its right-end position as viewed in FIG. 3 to force the spool of the bypass valve 104 toward the left-end position. On the other hand, when the solenoid relay valve (SRV) 107 places its spool in the left-end position, the fixed level line hydraulic pressure is supplied to a control port of the 3–4 shift valve 105 as a pilot hydraulic pressure through a hydraulic pressure line 205 to force the spool of the 3–4 shift valve 105 toward the right-end position.

The fixed level line hydraulic pressure provided from the reducing valve 108 is further supplied to the bypass valve 104 through a hydraulic pressure line 206 when the second solenoid valve (SV) 112 is ON; supplied as the pilot hydraulic pressure to a control port of the lockup control valve 106 through a hydraulic pressure line 207 when the spool of the bypass valve 104 is placed in its right-end position to force the spool of the lockup control valve 106 toward the left-end position; and supplied to a control port of the low-reverse valve 103 through a hydraulic pressure line 208 when the spool of the bypass valve 104 is placed its left-end positioned to force the spool of the low-reverse valve 103 toward the left-end position. Additionally, the fixed level line hydraulic pressure from the reducing valve 108 is supplied to a control port 110a of the regulator valve 101 through a hydraulic pressure line 209. In this event, the fixed level line hydraulic pressure is adjusted according to, for example, opening of an engine throttle by way of a linear solenoid valve 131 in the hydraulic pressure line 209 and accordingly, the line hydraulic pressure is adjusted according to throttle opening by way of the regulator valve 101.

The main hydraulic pressure line 200 leading to the 3–4 shift valve 105 is brought into communication with a first accumulator 141 through a hydraulic pressure line 210 when the 3–4 shift valve 105 has placed its spool in the right-end position to introduce the line hydraulic pressure into the accumulator 141. On the other hand, the line hydraulic pressure supplied to the manual shift valve 102 from the main hydraulic pressure line 200 is introduced into a first output hydraulic pressure line 211 and a second output hydraulic pressure line 212 for forward ranges, i.e. the drive (D) range, the second speed (S) range and the low (L) range; into the first output hydraulic pressure line 211 and a third output hydraulic pressure line 213 for the reverse (R) range; and into the third output hydraulic pressure line 213 for the neutral (N) range.

The first output hydraulic pressure line 211 leads to the first duty solenoid valve (DSV) 121 to supply the line hydraulic pressure as a control source hydraulic pressure to the first duty solenoid valve (IDSV) 121. The first duty solenoid (IDSV) 121 at its downstream side leads to the low-reverse valve 103 through a hydraulic pressure line 214; leads to the servo apply pressure chamber 54a of the 2–4 brake (2–4BR) 54 through a servo apply hydraulic pressure line 215 when the low-reverse valve 103 has placed the spool in the right-end position; and further leads to the pressure chamber of the low-reverse brake (LRBR) 55 through a low-reverse brake hydraulic pressure line 216 when the low-reverse valve 103 has placed the spool in the left-end position. A hydraulic pressure line 217 branches off from the hydraulic pressure line 214 and leads to a second accumulator 142. The second output hydraulic pressure line 212 leads to both second duty solenoid valve (DSV) 122 and third duty solenoid valve (DSV) 123 to supply the line hydraulic pressure as a control source hydraulic pressure to these duty solenoid valves (DSVs) 122 and 123. The second output hydraulic pressure line 212 also leads to the 3–4 shift valve 105. The second output hydraulic pressure line 212 leading to the 3–4 shift valve 105 is brought into communication with the lock-up control valve 106 through a hydraulic pressure line 218 when the 3–4 shift valve 105 has placed the spool in the right-end position; and brought into communication with the pressure chamber of the forward clutch (FWCL) 51 through a forward clutch hydraulic pressure line 219 when the lockup control valve 106 has placed the spool in the left-end position. A hydraulic pressure line 220 branching off from the forward clutch hydraulic pressure line 219 leads to the 3–4 shift valve 105. This hydraulic pressure line 220 is brought into communication with the first accumulator 141 through the hydraulic pressure line 210 when the 3–4 shift valve 105 has placed the spool in the left-end position, and on the other hand, is brought into communication with the servo release pressure chamber 54b of the 2–4 brake (2–4BR) 54 through a servo release hydraulic pressure line 221 when the 3–4 shift valve 105 has placed the spool in the right-end position.

The second duty solenoid valve (DSV) 122 at its downstream side to which a control source hydraulic pressure is supplied through the second output hydraulic pressure line 212 leads to a control port of the solenoid relay valve (SRV) 107 through a hydraulic pressure line 222 and supplies a pilot hydraulic pressure to the port to force the solenoid relay valve (SRV) 107 to shift its spool toward the left-end position. A hydraulic pressure line 223 branching off from the hydraulic pressure line 222 leads to the low-reverse valve 103, and is further brought into communication with a hydraulic pressure line 224 when the low-reverse valve 103 has placed the spool in the right-end position. A hydraulic pressure line 225 branching off from the hydraulic pressure line 224 through an orifice 151 leads to the 3–4 shift valve 105 and is brought into communication with the servo release pressure chamber 54b of the 2–4 brake (2–4BR) 54 through the servo release hydraulic pressure line 221 when the 3–4 shift valve 105 has placed the spool in the left-end position. A hydraulic pressure line 226 branching off from the hydraulic pressure line 225 leads to the bypass valve 104, and is further brought into communication with the pressure chamber of the 3–4 clutch (3–4CL) 53 trough a 3–4 clutch hydraulic pressure line 227 when the bypass valve 104 has placed the spool in the right-end position. Further, the hydraulic pressure line 224 leads directly to the bypass valve 104, and is brought into communication with the hydraulic pressure line 225 through the hydraulic pressure line 226 when the bypass valve 104 has placed the spool in the left-end position. In other words, the hydraulic pressure lines 224 and 225 are intercommunicated with each other by bypassing the orifice 151.

The third duty solenoid valve (DSV) 123 at the downstream side to which a control source hydraulic pressure is supplied from the second output hydraulic pressure line 212 leads the lock-up control valve 106 through a hydraulic pressure line 228, and is brought into communication with the forward clutch hydraulic pressure line 219 when the lock-up control valve 106 has placed the spool in the right-end position. On the other hand, the third duty solenoid valve (DSV) 123 is brought into communication with the front pressure chamber 26a of the lock-up clutch 26 through a hydraulic pressure line 229 when the lock-up control valve 106 has placed the spool in the left-end position.

The third output hydraulic pressure line 213 extending from the manual shift valve 102 leads to the low-reverse valve 103 to supply the line hydraulic pressure to the low-reverse valve 103. The low-reverse valve 103 directs the line hydraulic pressure to the pressure chamber of the reverse clutch (RVCL) 52 through a reverse clutch hydraulic pressure line 230. A hydraulic pressure line 231 branching off from the third output hydraulic pressure line 213 leads to the bypass valve 104, and supplies the line hydraulic pressure as a pilot hydraulic pressure to the control port of the low-reverse valve 103 through the hydraulic pressure line 208 when the bypass valve 104 has placed the spool in the right-end position, forcing the low-reverse valve 103 to shift the spool toward the left-end position.

The hydraulic control circuit 100 is provided with a converter relief valve 109 to adjust the working hydraulic pressure supplied from the regulator 101 through a hydraulic pressure line 232 to a fixed level, and then directs the fixed level of hydraulic pressure to the lock-up control valve 106 through a hydraulic pressure line 233. The fixed level hydraulic pressure is supplied to the front pressure chamber 26a of the lock-up clutch 26 through the hydraulic pressure line 229 when the- lock-up control valve 106 has placed the spool in the right-end position, and is supplied to the rear pressure chamber 26b through a hydraulic pressure line 234 when the lock-up control valve 106 has placed the spool in the left-end position. This lock-up clutch 26 is released when the fixed level hydraulic pressure is supplied to the front pressure chamber 26a, and is, however, controlled to allow slippage according to the level of the working hydraulic pressure supplied to the front pressure chamber 26a from the third duty solenoid valve (DSV) 123 when the lock-up control valve 106 has placed the spool in the left-end position.

A hydraulic pressure line 235, which is brought into communication with the main hydraulic pressure line 200 through the manual valve 102 in each of the drive (D) range, the second (S) range, the low (L) range and the neutral (N) range, leads to a reduction port 101b of the regulator valve 101 to introduce the line hydraulic pressure to the reduction port 101b in the respective range, so that the line hydraulic pressure is adjusted to be lower in level in these ranges than in the remaining range, i.e. the reverse (R) range.

Figure 4:
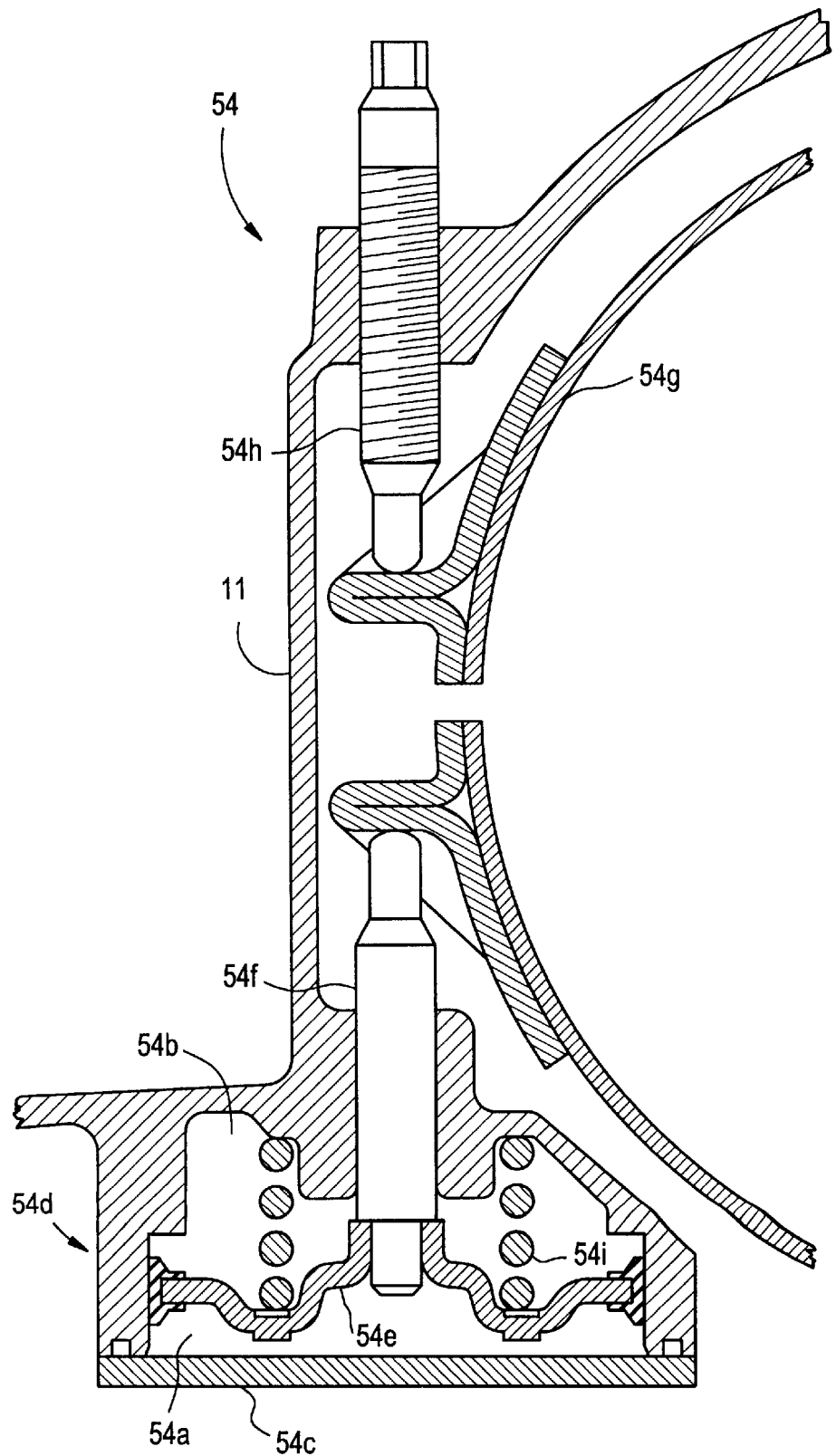
FIG. 4 is a cross-sectional view of a hydraulic actuator for a 2–4 brake.

FIG. 4 shows the structure of a hydraulic actuator of the 2–4 brake (2–4BR) 54 in detail. As shown in FIG. 4, the hydraulic actuator has a servo-cylinder 54d and a piston 54e which is received in the servo-cylinder 54d and provided with a stem 54f secured thereto. The servo cylinder 54b is comprised of part of the transmission housing 11 and a cover member 54c fixed to the transmission housing 11 to form therein a cylinder chamber which is divided into two sub-chambers by the piston 54e, i.e. the servo apply pressure chamber 54a and the servo release pressure chamber 54b. A brake band 54g, which is wrapped around a brake-receiving member, such as a brake drum, (not shown), has one end against which the piston stem 54f is forced to abut and another end against which a fixed stem 54h fastened to the transmission housing 11 abuts. A spring 54i is installed within the interior of the servo release pressure chamber 54b to force the piston 54e toward the servo apply pressure chamber 54a so as usually to loosen the brake band 54g. The working hydraulic pressure is supplied to both or one of the servo apply pressure chamber 54a and the servo release pressure chamber 54b from the hydraulic control circuit 100 to tighten or loosen the brake band 54g, locking or unlocking the 2–4 brake (2–4BR) 54. In this hydraulic actuator, especially, the piston 54e has approximately equal pressure surface areas on the sides of the servo apply pressure chamber 54a and the servo release pressure chamber 54b and, therefore, when, for example, both pressure chambers 54a and 54b are supplied with an equal working hydraulic pressure, the piston 54e is activated only by the expanding force of the spring 54i to move toward the servo apply pressure chamber 54a, so as to loosen the band brake 54g.

Figure 5:
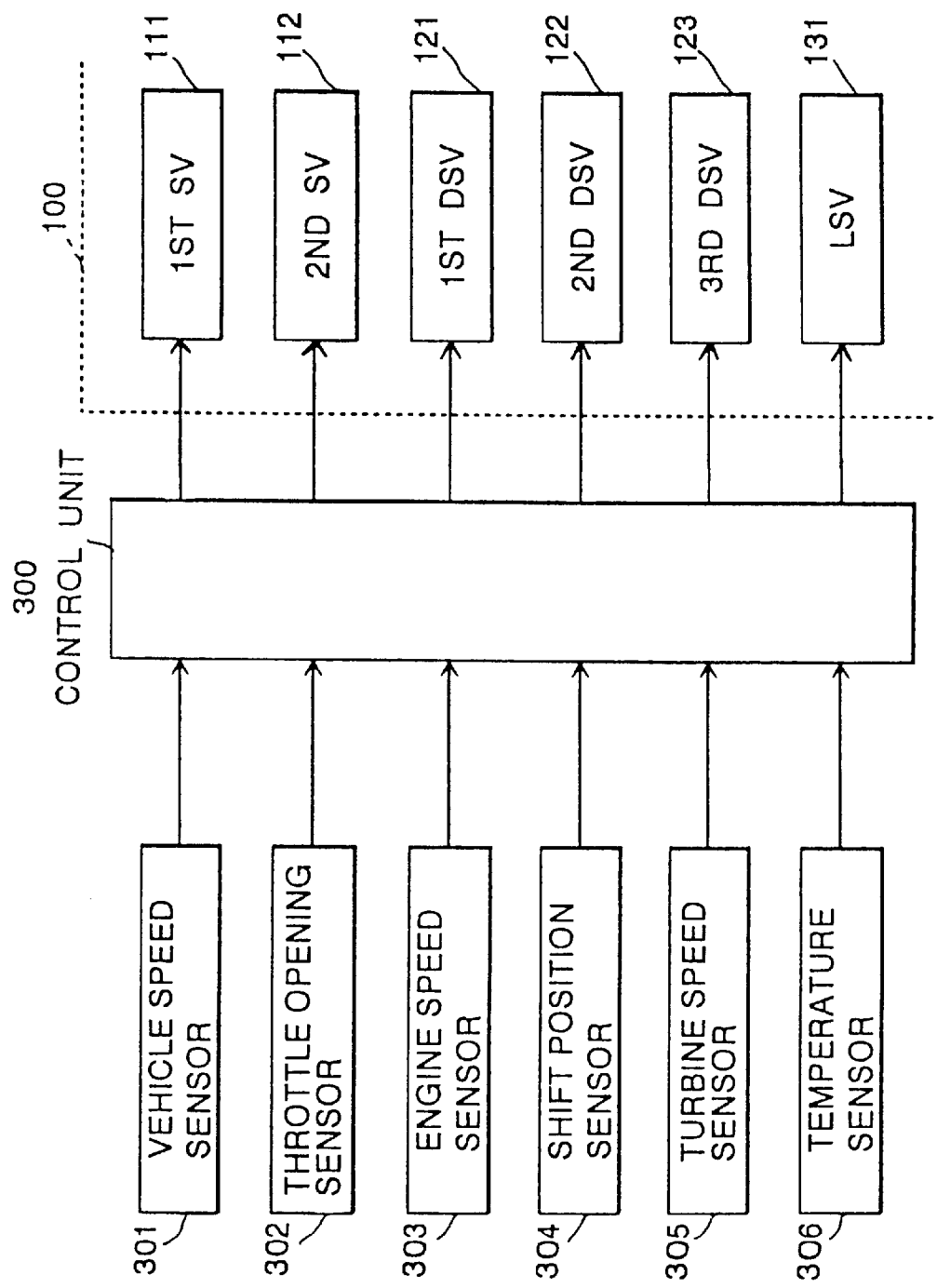
FIG. 5 is a block diagram illustrating a control system of various solenoid valves installed in the hydraulic control circuit.

FIG. 5 shows a control unit 300 provided in the automatic transmission 10 which controls the first and second solenoid valves (SVs) 111 and 112 and the first through third duty solenoid valves (DSVs) 121 through 123 as well as the linear solenoid valve 131. The control unit 300 receives various signals such as a vehicle speed signal from a speed sensor 301, a throttle opening signal from a throttle opening sensor 302, an engine speed signal from an engine speed sensor 303, a transmission position signal from a shift position sensor 304, a turbine speed signal from a turbine speed sensor 305, and a temperature signal from a fluid temperature sensor 306. With these signals, the control unit 300 controls operation of each of these valves 111, 112, 121–123 and 131 according to driving conditions of the vehicle or operating conditions of the engine. Various types of these sensors are well known in the art, and any well known type may be taken. As was previously described, in particular, the turbine speed sensor 305 may be installed as shown in FIG. 2.

The relationship between operation of these first and second solenoid valves (SVs) 111 and 112 and the first to third duty solenoid valves (DSVs) 121 to 123 and supply of the working hydraulic pressure to each of the friction coupling elements 51 to 55 is described in each of the possible gears in Table II. In Table II, a mark "O" (circle) in parentheses indicates an ON state in regard to the first and second solenoid valves (SVs) 111 and 112 and, however, an OFF state in regard to the first to third duty solenoid valves (DSVs) 121 to 123, in each state, the valve bringing fluid paths upstream and downstream therefrom into communication with each other to permit a source hydraulic pressure to directly flow from the upstream path to the downstream-path. Also, a mark "X" in parentheses indicates an OFF state in regard to the first and second solenoid valves (SVs) 111 and 112 and an ON state in regard to the first to third solenoid valves (DSVs) 121 to 123, in each both state, the valve draining the working fluid from the upstream path while shutting off the upstream path.

TABLE II

| RANGE | DRIVE(Second) | | | | LOW | REV |
|---|---|---|---|---|---|---|
| GEAR | 1ST | 2ND | 3RD | 4TH | 1ST | REV |
| 1ST SV (111) | X | X | X | ○ | ○ | ○ |
| 2ND SV (112) | X | X | X | X | ○ | ○ |
| 1ST DSV (121) | X | ○ | ○ | ○ | ○ | ○ |
| 2ND DSV (122) | X | X | ○ | ○ | X | ○ |
| 3RD DSV (123) | ○ | ○ | ○ | X | ○ | ○ |

Figure 6:
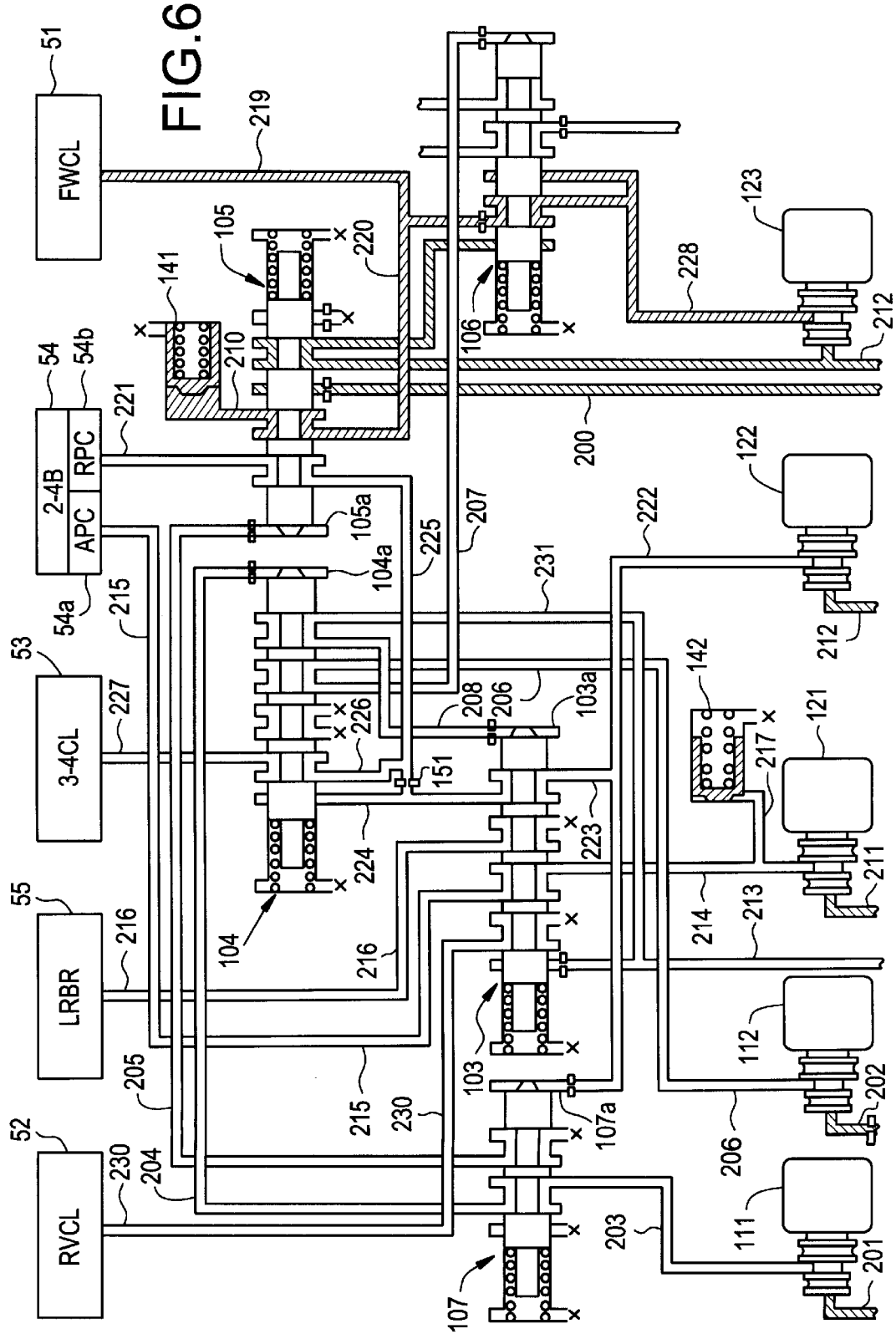
FIG. 6 is an enlarged view of an essential part of the hydraulic control circuit of FIG. 3 which is in a state for a first gear.

As shown in FIG. 6 and indicated in Table II, for the first (1st) gear in the forward ranges excepting the low (L) range, only the third duty solenoid valve (DSV) 123 operates to generate a working hydraulic pressure from the line hydraulic pressure as a source hydraulic pressure from the second output hydraulic pressure line 212. This working hydraulic pressure is supplied to the lock-up control valve 106 through the hydraulic pressure line 228. Because, at this time, the lock-up control valve 106 has placed the spool in the right-end position, the working hydraulic pressure is directed to the pressure chamber of the forward clutch (FWCL) 51 as a forward clutch hydraulic pressure through the forward clutch hydraulic pressure line 219, locking the forward clutch (FWCL) 51. In this instance, because the hydraulic pressure line 220 branching off from the forward clutch hydraulic pressure line 219 has been brought into communication with the first accumulator 141 through the hydraulic pressure line 210 via the 3–4 shift valve 105, the forward clutch hydraulic pressure is supplied smoothly.

Figure 7:
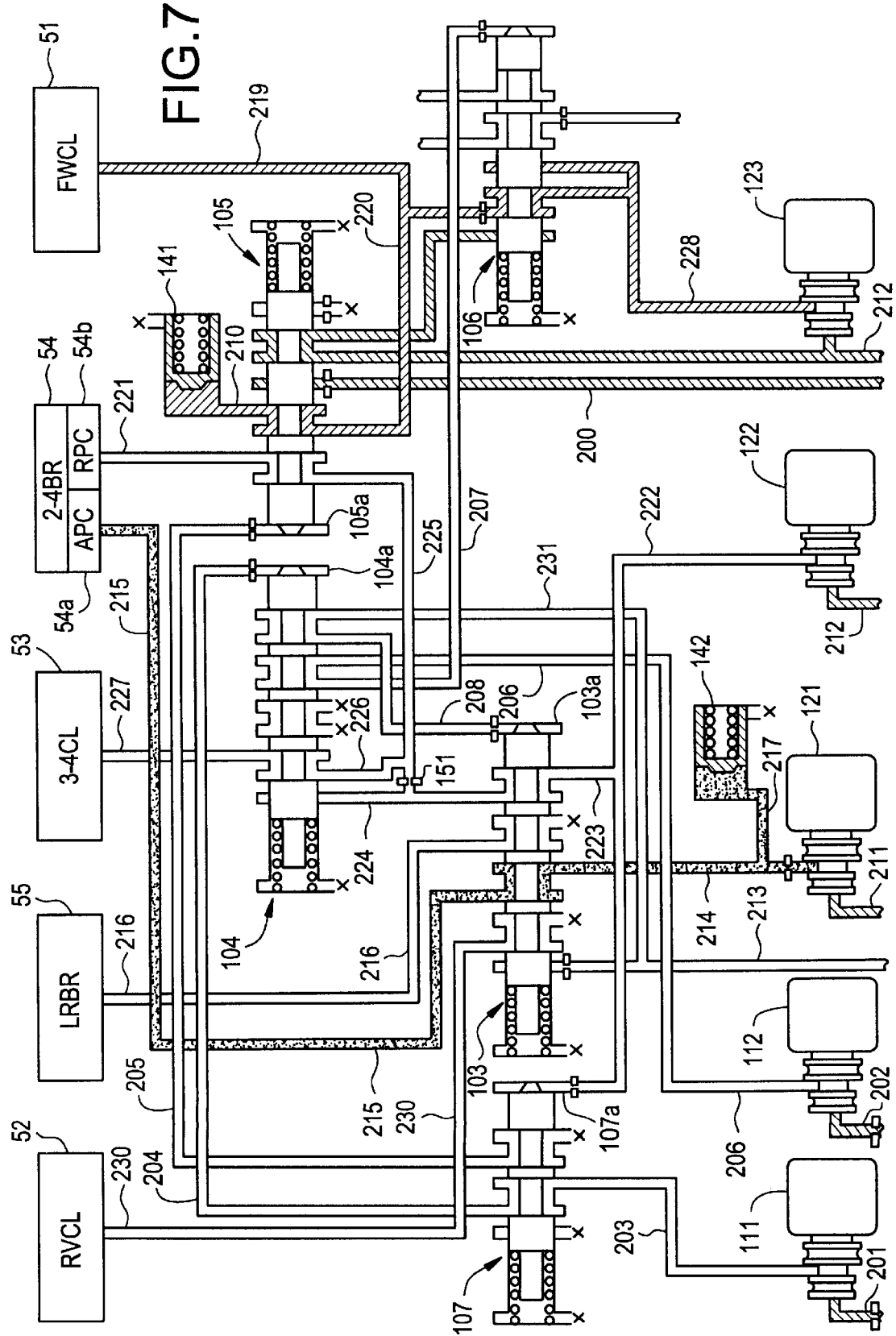
FIG. 7 is an enlarged view of an essential part of the hydraulic control circuit of FIG. 3 which is in a state for a second gear.

For the second (2nd) gear, as shown FIG. 7 and indicated in Table II, in addition to the third duty solenoid valve (DSV) 123 locked in the first (1st) gear, the first duty solenoid valve (DSV) 121 operates to generate a working hydraulic pressure from the line hydraulic pressure as a source hydraulic pressure from the first output hydraulic pressure line 211. This working hydraulic pressure is supplied to the low-reverse valve 103, and at this time, because the low-reverse valve 103 has placed the spool in the right-end position, the working hydraulic pressure is directed to the servo apply hydraulic pressure line 215, and then supplied to the servo apply pressure chamber 54a of the 2–4 brake (2–4BR) 54 and locking the 2–4 brake (2–4BR) 54, while the forward clutch (FWCL) 51 is locked. In this instance, because the hydraulic pressure line 214 leads to the second accumulator 142 through the hydraulic pressure line 217, it is gentle to supply the servo apply hydraulic pressure line 215, and hence to lock the 2–4 brake (2–4BR) 54. The working fluid accumulated in the accumulator 142 is pre-charged to the pressure chamber of the low-reverse brake (LRBR) 55 through the low-reverse brake hydraulic pressure line 216 when the low-reverse valve 103 shifts the spool toward the left-end position during a gear shift to the first (1st) gear in the low (L) range, as will be described later.

Figure 8:
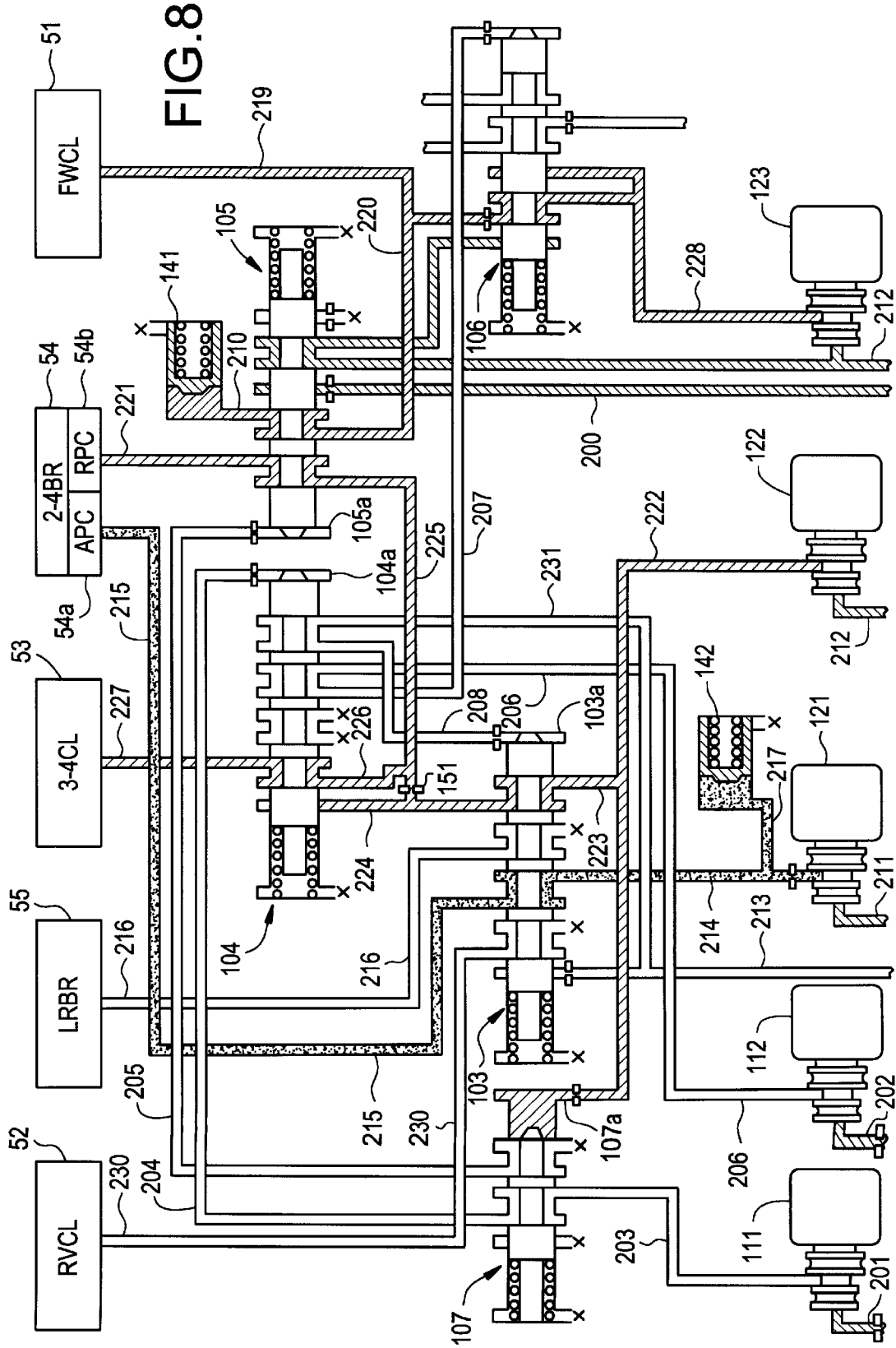
FIG. 8 is an enlarged view of an essential part of the hydraulic control circuit of FIG. 3 which is in a state for a third gear.

For the third (3rd) gear, as shown FIG. 8 and indicated in Table II, while the first and second solenoid valves (SVs) 111 and 112 and the first and third duty solenoid valves (DSVs) 121 and 123 remains in the state of the second (2nd) gear, the second duty solenoid valve (DSV) 122 operates to generate a working hydraulic pressure from the line hydraulic pressure as a source hydraulic pressure-supplied from the second output hydraulic pressure line 212. This working hydraulic pressure is supplied to the low-reverse valve 103 through the hydraulic pressure lines 222 and 223, and then, because the low-reverse valve 103 still remains the spool in the right-end position, directed to the hydraulic pressure line 224. As a result, the working hydraulic pressure is introduced into the hydraulic pressure line 225 through the orifice 151 from the hydraulic pressure line 224, and then to the 3–4 shift valve 105. At this time, because the 3–4 shift valve 105 has placed- the spool in the left-end position, the working hydraulic pressure is further directed as a servo release hydraulic pressure to the servo release pressure chamber 54b of the 2–4 brake (2–4BR) 54 through the servo release hydraulic pressure line 221. Consequently, the 2–4 brake (2–4BR) 54 is unlocked or released. On the other hand, the working hydraulic pressure is directed to the bypass valve 104 through the hydraulic pressure line 226 branching off from the hydraulic pressure line 225 after the orifice 151. At this time, because the bypass valve 104 has been placed the spool in the right-end position, the working hydraulic pressure is also supplied as a 3–4 clutch hydraulic pressure to the pressure chamber of the 3–4 clutch (3–4CL) 53 through the 3–4 clutch hydraulic pressure line 227. In this way, while the 2–4 brake (2–4BR) 54 is unlocked, both forward clutch (FWCL) 51 and 3–4 clutch (3–4CL) 53 are locked. In this instance, in the sate of operation of the valves for the third (3rd) gear, the second duty solenoid valve (DSV) 122 generates the working hydraulic pressure, as was previously described, and supplies it to the relay valve 107 at the control port 107a through the hydraulic pressure line 222 to force the relay valve 107 to shift the spool to the left-end position.

Figure 9:
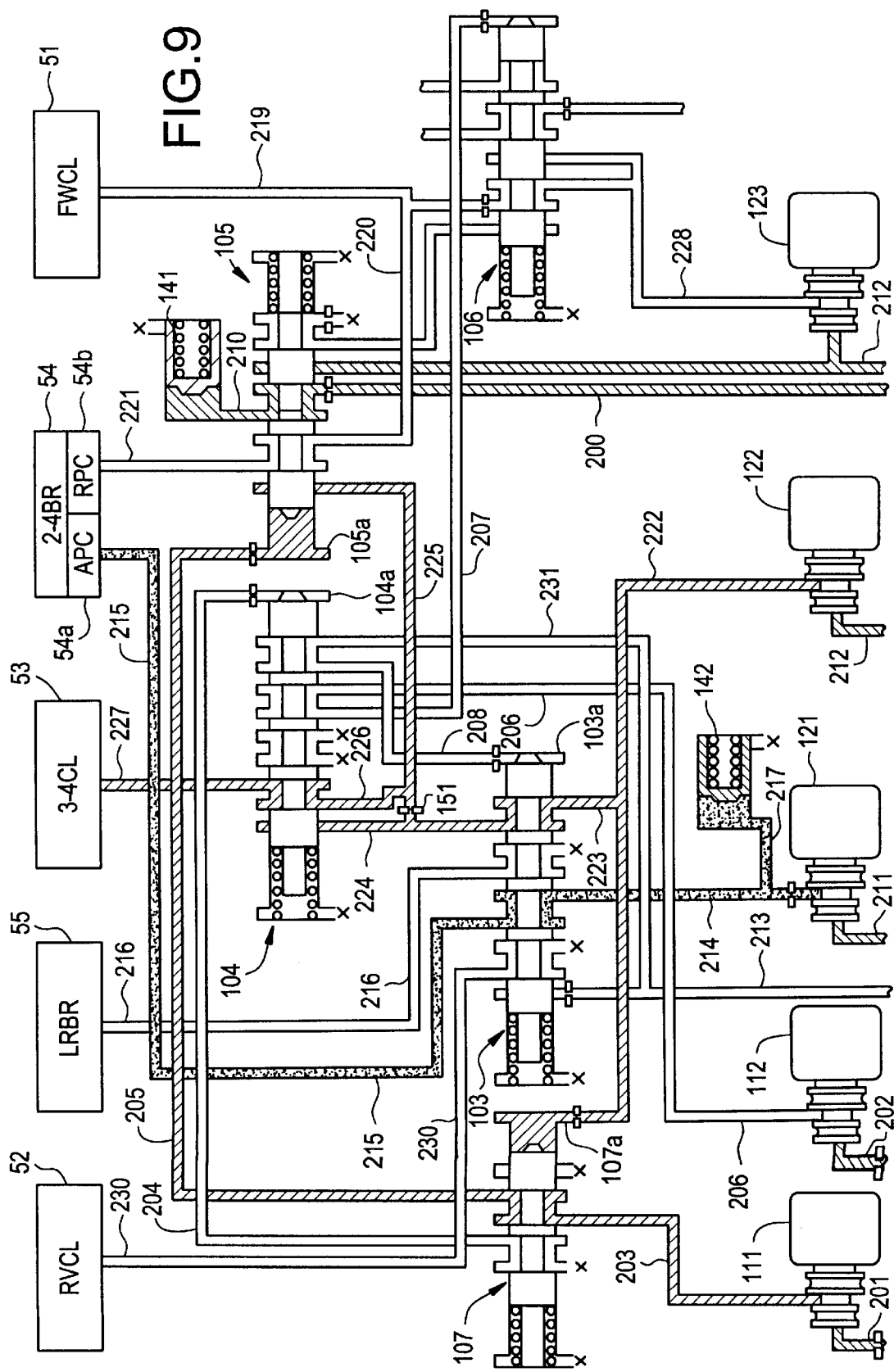
FIG. 9 is an enlarged view of an essential part of the hydraulic control circuit of FIG. 3 which is in a state for a forth gear.

For the forth (4th) gear, as shown in FIG. 9 and indicated in Table II, while the valves 112, 121 and 122 remain in the same state of operation as for the third (3rd) gear, the third duty solenoid valve (DSV) 123 stops the generation of working hydraulic pressure, and, on the other hand, the first solenoid valve (SV) 111 operates. Consequently, the first solenoid valve (SV) 111 supplies the fixed level hydraulic pressure to the relay valve 107 from the hydraulic pressure line 201 through the hydraulic pressure line 203. At this time, because the relay valve 107 has placed the spool in the left-end position for the third (3rd) gear, it directs the fixed level hydraulic pressure to the 3–4 shift valve 105 at the control port 105a through the hydraulic pressure line 205, forcing the 3–4 shift valve 105 to shift the spool to the right-end position, so that the servo release hydraulic pressure line 221 is brought into communication with the hydraulic pressure line 220 branching off from the forward clutch hydraulic pressure line 219 to put the releasing chamber 54b of the 2–4 brake (2–4BR) 54 and the pressure chamber of the forward clutch (FWCL) 51 intercommunicated with each other.

By means of putting the third duty solenoid valve (DSV) 123 inoperative to stop the generation of working hydraulic pressure and drain the working fluid from the downstream path from the third duty solenoid valve (DSV) 123, while the servo release hydraulic pressure is drained from the releasing chamber 54b of the 2–4 brake (2–4BR) 54 through the hydraulic pressure line 228 via the lock-up control valve 106, to lock the 2–4 brake (2–4BR) 54 again, and the forward clutch hydraulic pressure is drained from the pressure chamber of the forward clutch (FWCL) 51 through the hydraulic pressure line 228 via the lock-up control valve 106 to unlock the forward clutch (FWCL) 51.

Figure 10:
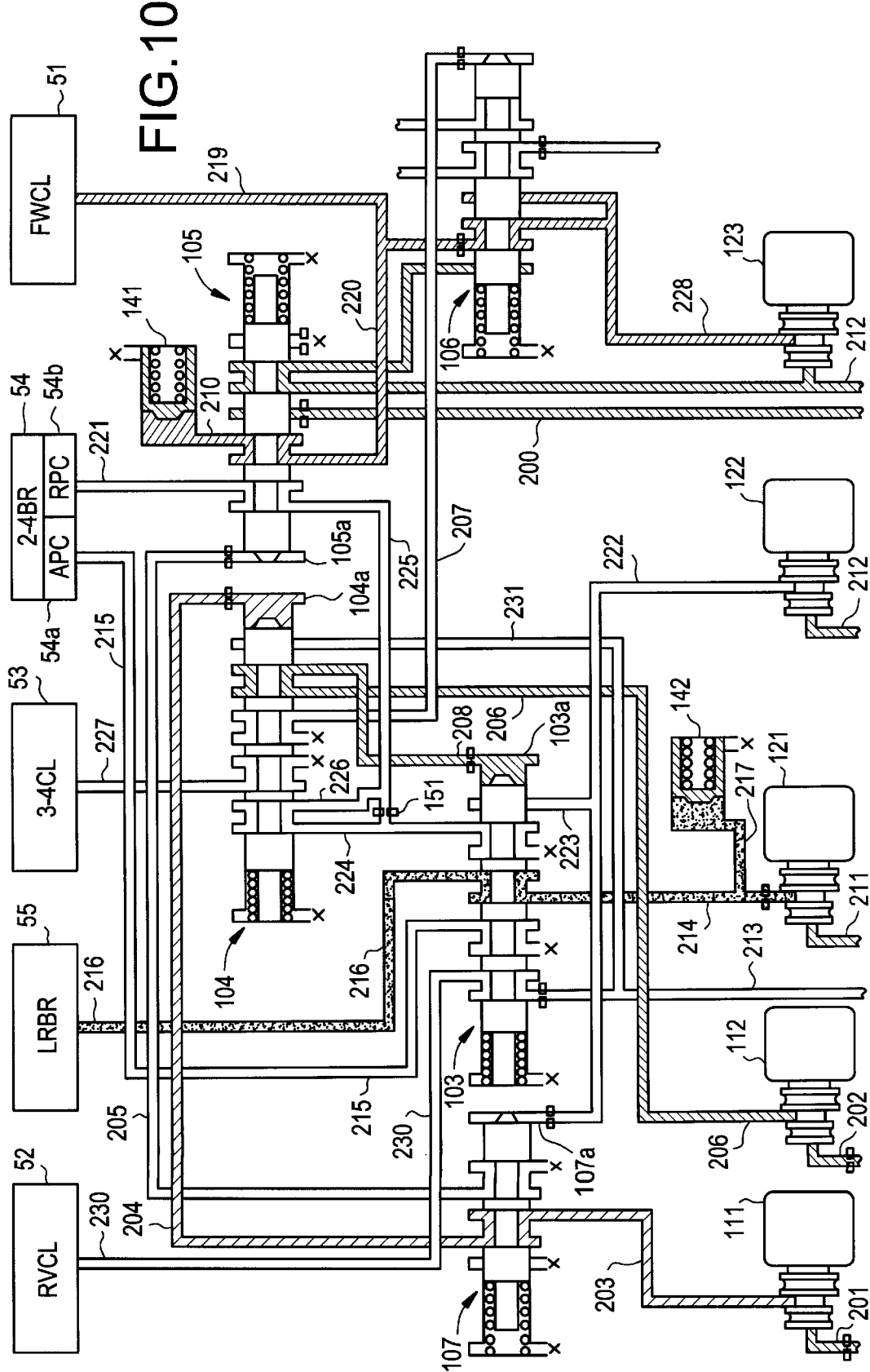
FIG. 10 is an enlarged view of an essential part of the hydraulic control circuit of FIG. 3 which is in a state for the first gear in a low (L) range.

For the first (1st) gear in the low (L) range, as shown in FIG. 10 and indicated in Table II, the first and second solenoid valves (SVs) 111 and 112, and the first and third duty solenoid valves (DSVs) 121 and 123 operate to supply the working hydraulic pressure generated by way of the third duty solenoid valve (DSV) 123 as a forward clutch hydraulic pressure to the pressure chamber of the forward clutch (FWCL) 51 through the hydraulic pressure line 228 and forward clutch hydraulic pressure line 219 via the lock-up-control valve 106 in a similar way for the first (1st) gear, for example, in the drive (D) range. In this manner, the forward clutch (FWCL) 51 is applied with the working hydraulic pressure to lock. At this time, due to accumulation of the working hydraulic pressure in the first accumulator 141 through the hydraulic pressure lines 210 and 220 via the 3–4 shift valve, the forward clutch (FWCL) 51 is locked smoothly.

By means of the operation of the first solenoid valve (SV) 111, the bypass valve 104 at the control port 104a is supplied with a pilot hydraulic pressure through the hydraulic pressure lines 203 and 204 via the relay valve 107 to shift the spool to the left-end position, which is followed by introduction of the working hydraulic pressure into the hydraulic pressure line 208 through the hydraulic pressure line 206 via the bypass valve 104, forcing the low reverse valve 103 to shift the spool to the left-end position. Consequently, the working hydraulic pressure at the first duty solenoid valve (DSV) 121 is supplied as a low-reverse brake hydraulic pressure to the pressure chamber of the low-reverse brake (LRBR) 55 through the low-reverse brake hydraulic pressure line 216 the low-reverse valve 103, by which, while the forward clutch (FWCL) 51 is locked, the low-reverse brake (LRBR) 55 is locked, providing the first (1st) gear where engine brake is available.

Figure 11:
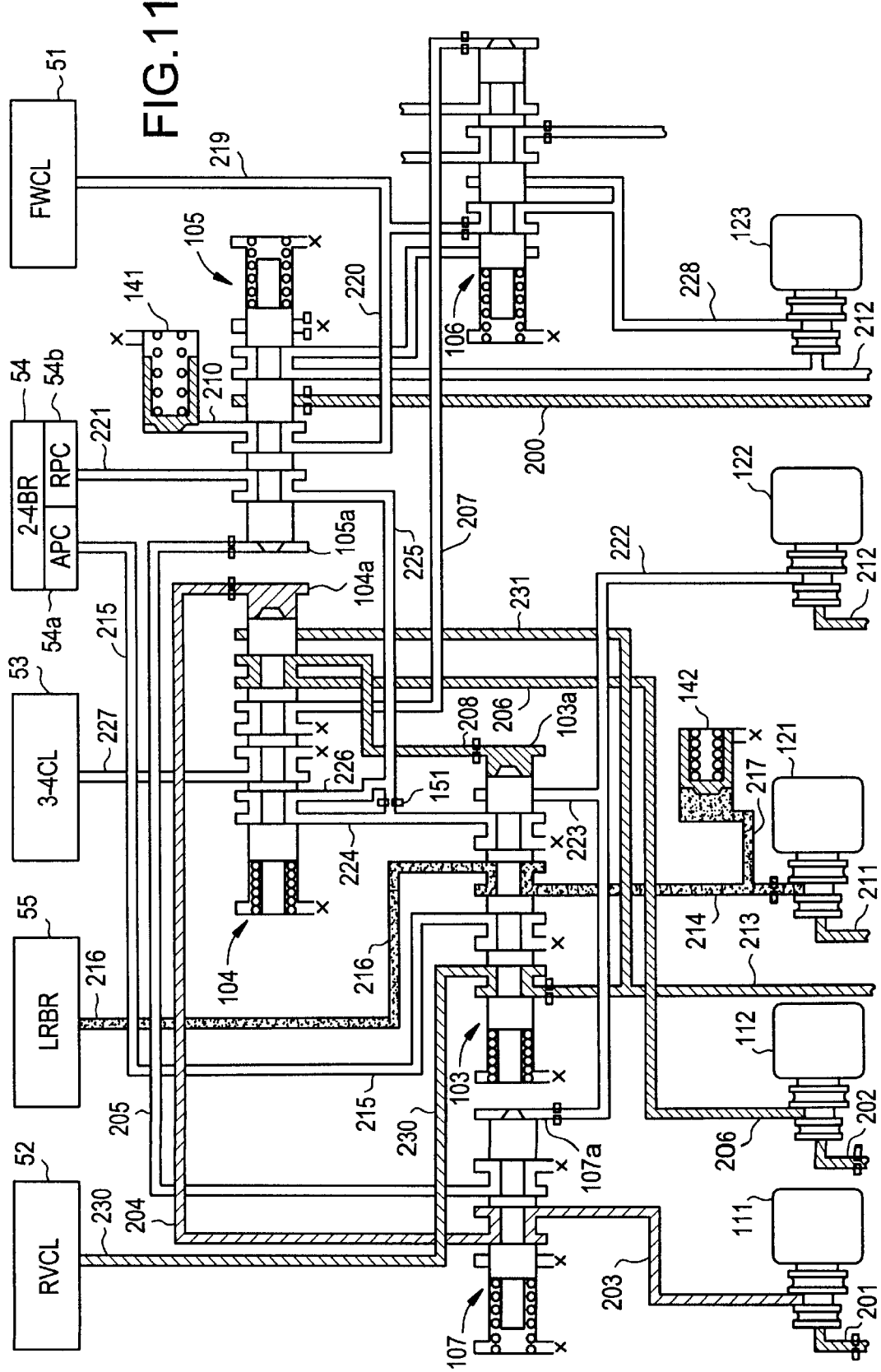
FIG. 11 is an enlarged view of an essential part of the hydraulic control circuit of FIG. 3 which is in a state for a reverse gear

In the reverse (R) range, as shown in FIG. 11 and indicated in Table II, all of the valves 111 and 112, and 121 to 123 operate. In this state, the second and the third duty solenoid valves (DSVs) 122 and 123 do not generate any working hydraulic pressure due to interruption of supply of the source hydraulic pressure thereto from the second output hydraulic pressure line 212. As was described, because the first and second solenoid valves (SVs) 111 and 112 operate, the bypass valve 104 shifts the spool to the left-end position similarly for the first (1st) gear in the low (L) range, which is followed by forcing the low reverse valve 103 to shift the spool to the left-end position. Under this circumstance, the working hydraulic pressure generated at the first duty solenoid valve (DSV) 121 is supplied as the low-reverse brake hydraulic pressure to the pressure chamber of the low-reverse brake (LRBR) 55. In the reverse (R) range, the line hydraulic pressure is introduced into the third output hydraulic pressure line 213 from the manual shift valve 102, and is directed as a reverse clutch hydraulic pressure to the pressure chamber of the reverse clutch (RVCL) 53 through the reverse clutch hydraulic pressure line 230 via the low-reverse valve 103 with the spool shifted to the left-end position. Consequently, the reverse clutch (RVCL) 52 and the low reverse brake (LRBR) 55 are locked. In this instance, the line hydraulic pressure is introduced into the third output hydraulic pressure line 213 from the manual valve 102 even in the neutral (N) range, locking the reverse clutch (RVCL) 52 in the neutral (N) range when the low reverse valve 103 has placed the spool to the left-end position.

Control Operation

Figure 12:
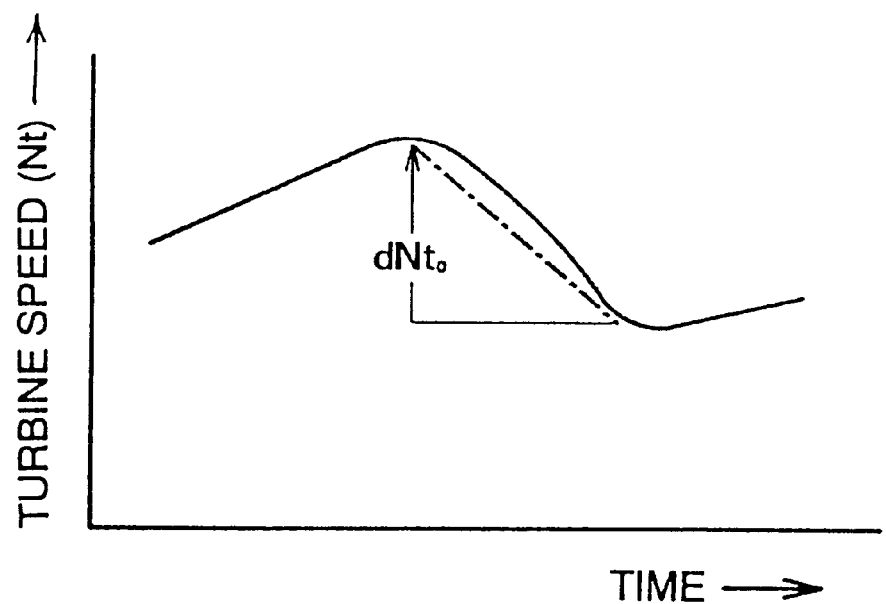
FIG. 12 is an explanatory diagram of turbine speed change rate with respect to time during an up shift.
Figure 13:
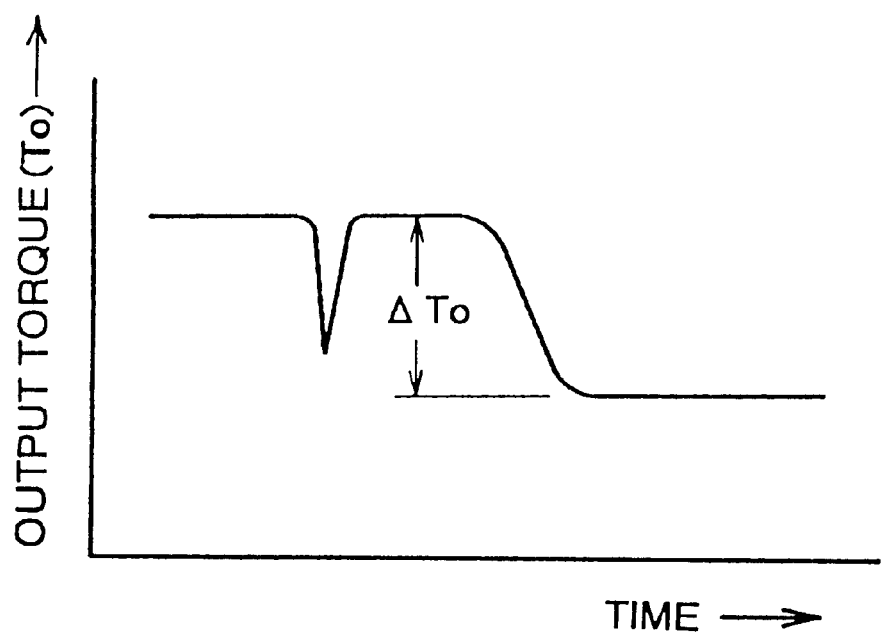
FIG. 13 is an explanatory diagram of transmission output torque during an up shift.

The following description is directed to gear shifts, in particular up shifts, through the gear shift control accomplished by the control unit 300. Specifically, as shown in FIG. 12, up shift control is accomplished by feedback controlling mainly supply of the working pressure to the friction coupling element to be locked so as to bring a change rate dNt of the dropping turbine speed Nt into agreement with a target change rate $dNt_0$ as shown in FIG. 12. The turbine speed change rate dNt is equivalent to a change in transmission output torque $T_0$ (which is hereafter refereed to simply as an output torque change) $\Delta T_0$ between during an inertia phase for which the turbine speed Nt changes due to a gear shift and after a conclusion of the gear shift as shown in FIG. 13. If the output torque change $\Delta T_0$ becomes larger than the output torque difference between before and after the gear shift, a shift shock is enhanced. On the other hand, if it is smaller than the difference, a shift time necessary to conclude the gear shift is prolonged. Accordingly, the target turbine speed change rate $dNt_0$ is set to meet the output torque change $\Delta T_0$ so as to be approximately equal to the output torque difference in transmission output torque between before and after the gear shift.

(1) 1–2 Up Shift

As apparent from FIGS. 6 and 7, a 1–2 gear shift is performed by, while locking the forward clutch 51 with a working pressure generated through the third duty solenoid valve 123, supplying a servo apply pressure generated through the first duty solenoid valve 121 to the servo apply pressure chamber 54a of the 2–4 brake 54. In this instance, the servo apply pressure is feedback controlled through the first duty solenoid valve 121. As was previously mentioned, when each of the first, second and third duty solenoid valves 121, 122 and 123 operates at a duty rate of 0%, it fully opens to bring the fluid paths on upstream and downstream sides thereof into complete communication; when operates at a duty rate of 100%, it drains the working fluid from the fluid path downstream therefrom by shutting off the fluid path upstream thereof; and when operates at an intermediate duty rate, it generates a hydraulic pressure in the fluid path downstream therefrom regulated according to the duty rate by using a hydraulic pressure in the fluid path upstream therefrom as a source hydraulic pressure.

Figure 14:
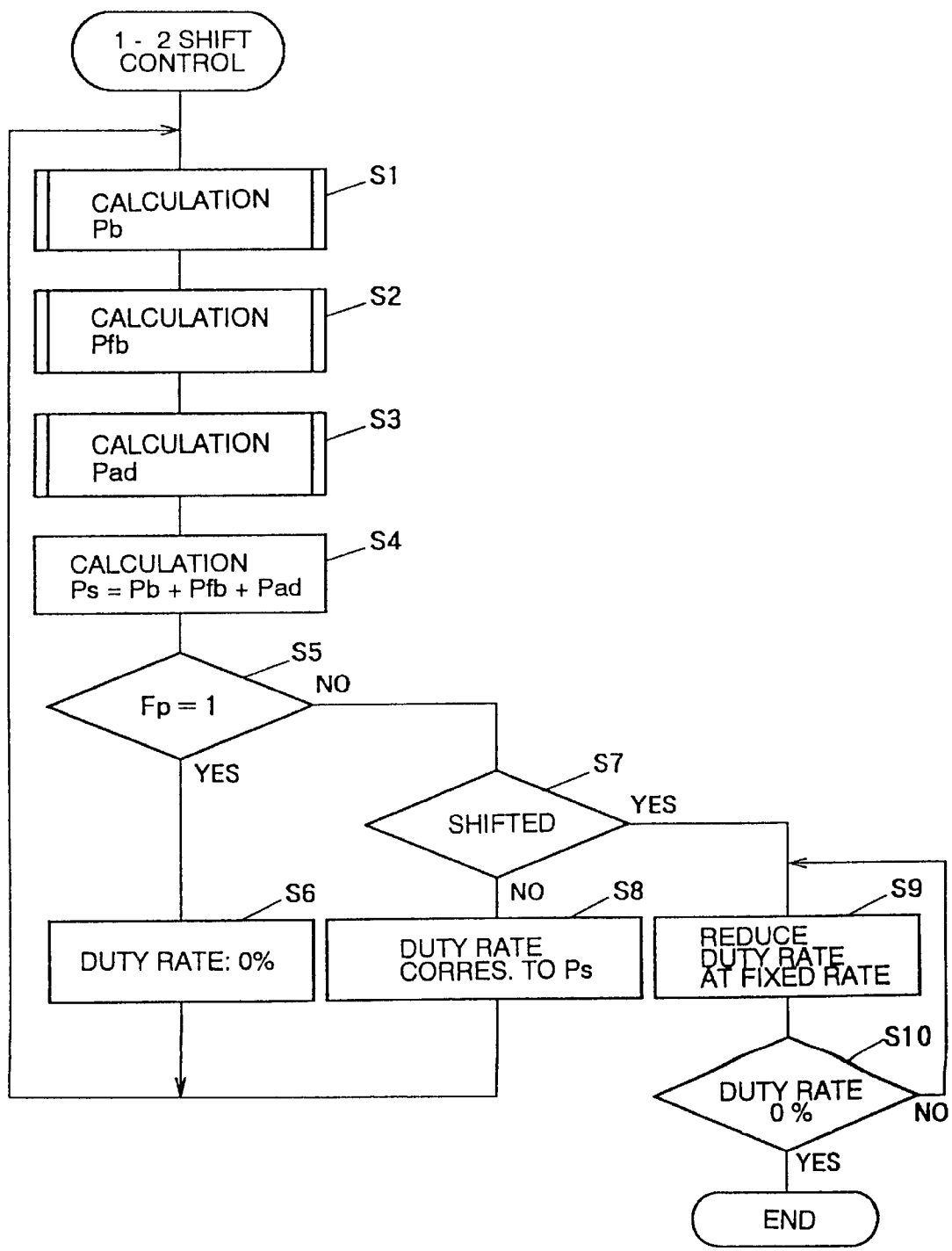
FIG. 14 is a flowchart illustrating the sequence routine of first duty solenoid control during a 1–2 gear shift.
Figure 15:
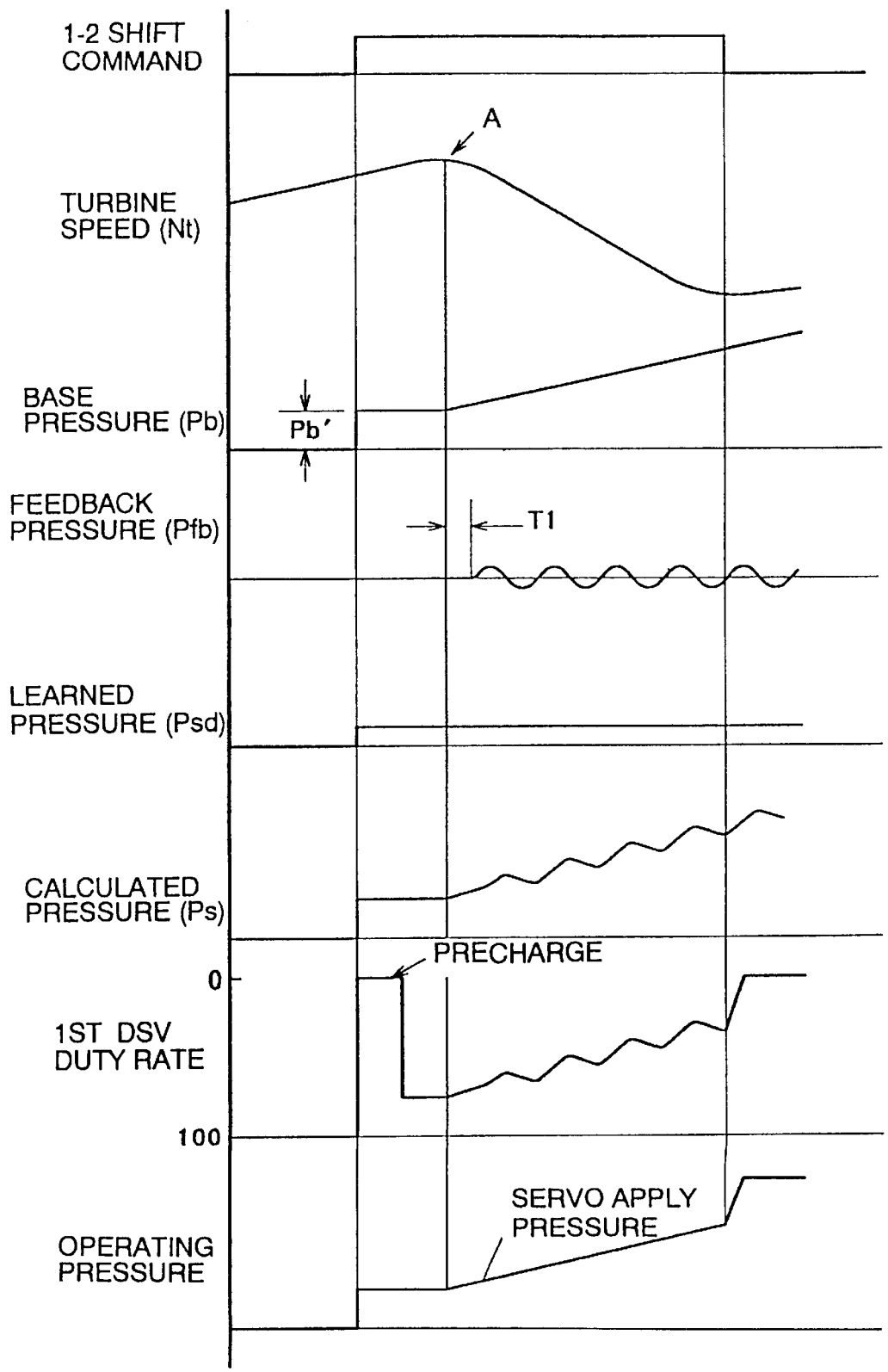
FIG. 15 is a time chart illustrating controlling and controlled parameters during the 1–2 gear shift.
Figure 25:
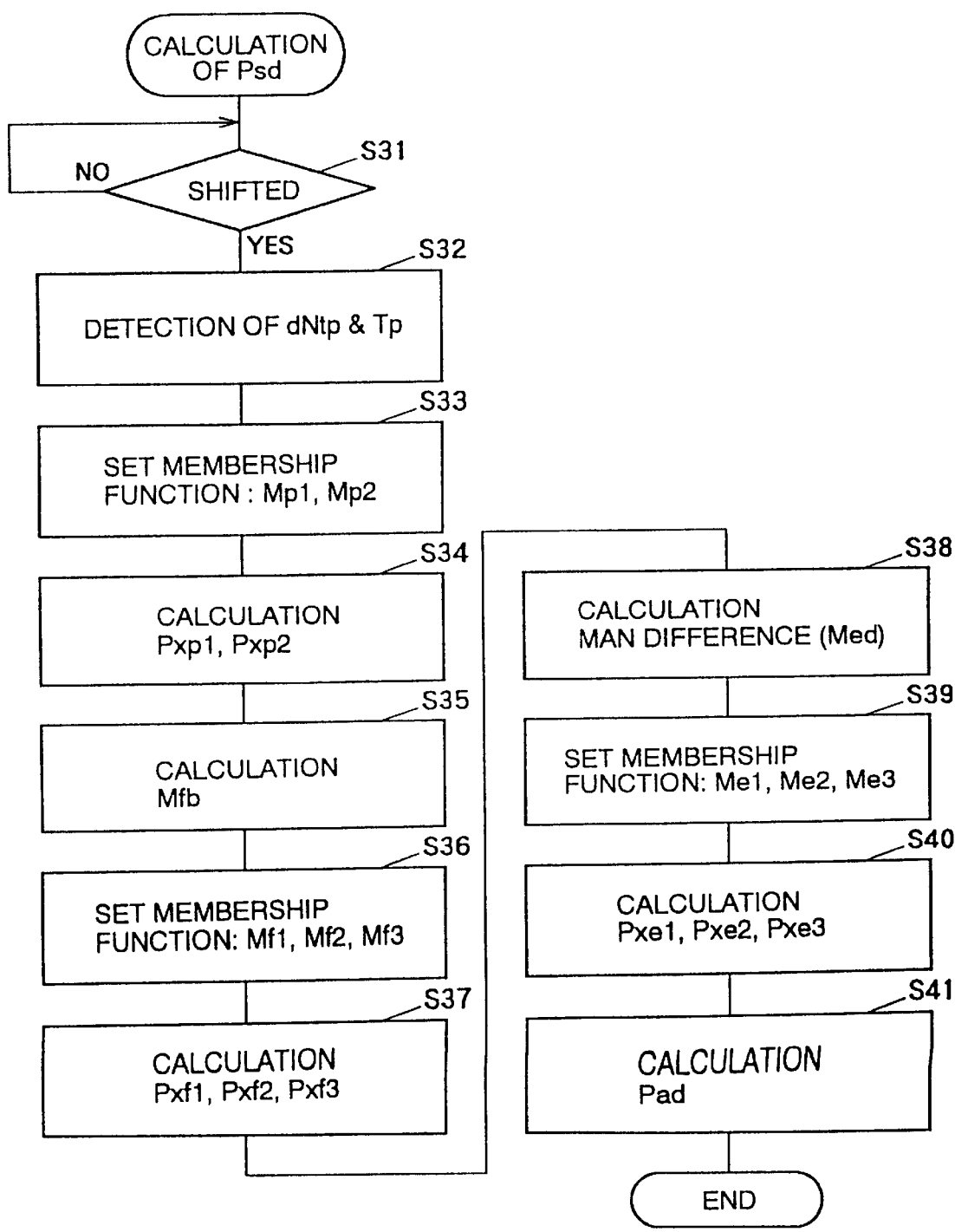
FIG. 25 is a flowchart illustrating the sequence routine of learned pressure calculation during the 1–2 gear shift.

The feedback control of servo apply hydraulic pressure by way of the first duty solenoid valve 121 is performed following the flowchart illustrating a sequence routine shown in FIG. 14. Explaining this sequence routine with reference to a time chart shown in FIG. 15, when a 1–2 gear shift command is given, a calculated hydraulic pressure Ps is derived by adding a base hydraulic pressure Pb, a feedback hydraulic pressure Pfb and a learned pressure Pad all together at step S3 subsequently to calculations of the base hydraulic pressure Pb, the feedback hydraulic pressure Pfb and made at steps S1, S2 and S3, respectively. The calculations of these base hydraulic pressure Pb, feedback hydraulic pressure Pfb and learned pressure Pad will be described in connection with hydraulic pressure calculation subroutines shown in FIGS. 16, 20 and 25, respectively. As shown in FIG. 15, the base pressure Pb is kept at a constant initial level of pressure Pb' from an appearance of the gear shift command to a point of time at which the turbine speed starts to fall, i.e. at which an inertia phase starts as labeled "A" in FIG. 15 and increases at a fixed rate after the commencement of the inertia phase. The feedback pressure Pfb is established so as to bring the turbine speed change rate dNt into agreement with the target turbine speed change rate $dNt_0$ during the inertia phase after a passage of a specified time interval T1 from the commencement of the inertia phase. The reason for not performing the calculation of the feedback pressure Pfb until passage of the specified time interval T1 from the commencement of the inertia phase is that it is impossible to obtain a precise turbine speed change rate dNt, which is-used in the calculation as a foundation of the base pressure, at the beginning of the inertia phase. Further, the learned pressure Pad is set on the basis of the state of an inertia phase in a first previous 1–2 gear shift after a conclusion of the first previous 1–2 gear shift. All of these calculations will be described in detail later.

Subsequently, a determination is made at step S5 whether or not a precharge flag Fp has been up or set to a state of "1," this indicates that it is during the precharge control since an appearance of a gear shift command. The precharge control is performed by filling the fluid path leading to the servo apply pressure chamber 54*a* of the 2–4 brake 54 with a working fluid immediately after the beginning of a gear shift in order to provide an improved gear shift responsiveness. If the precharge flag Fp is up, the first duty solenoid valve 121 is operated at a duty rate of 0% to remain fully open at step S6. On the other hand, when the precharge flag Fp is down or has been reset to a state of "0," this indicates that the precharge control has been concluded, then, another determination is made at step S7 whether or not the 1–2 gear shift has been concluded. The criterion for the determination of up-shift conclusion may be achievement of any one of such events that the turbine speed change rate dNt has turned over from negative to positive, that the absolute value of the turbine speed change rate dNt has fallen lower than half a turbine speed change rate dNt during the gear shift is in progress, and that the turbine speed Nt has fallen below a turbine speed (which is hereafter referred to as a shift-end turbine speed) at the end of gear shift which is calculated based on the turbine speed at the beginning of the gear shift. When the 1–2 gear shift has not yet been concluded after the conclusion of the precharge control, the first duty solenoid valve 121 is operated at a duty rate corresponding to the calculated hydraulic pressure Ps at step S8. On the other hand, after a conclusion of the 1–2 gear shift, the duty rate is reduced at a fixed rate and returned once again to 0% through steps S9 and S10. Tn this manner, the servo apply hydraulic pressure is controlled as shown in FIG. 15 to bring the turbine speed change rate dNt during the inertia phase into agreement with a target turbine speed change rate $dNt_0$.

(2) Base Hydraulic pressure Calculation

Figure 16:
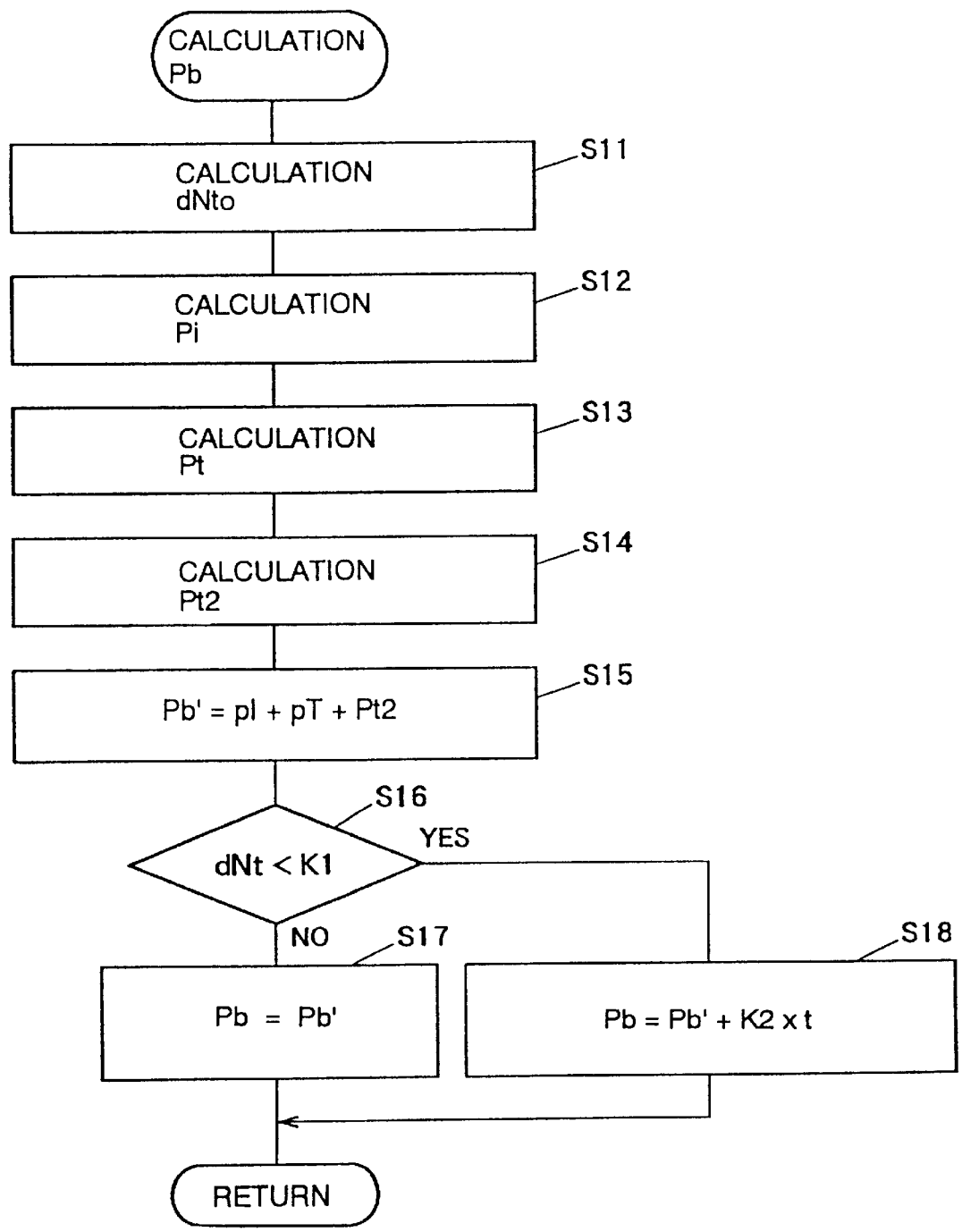
FIG. 16 is a flowchart illustrating the sequence routine of base hydraulic pressure calculation performed during the 1–2 gear shift.

The calculation of the base hydraulic pressure Pb is accomplished following the flowchart illustrating the base hydraulic pressure calculation sequence subroutine shown in FIG. 16.

Figure 17:
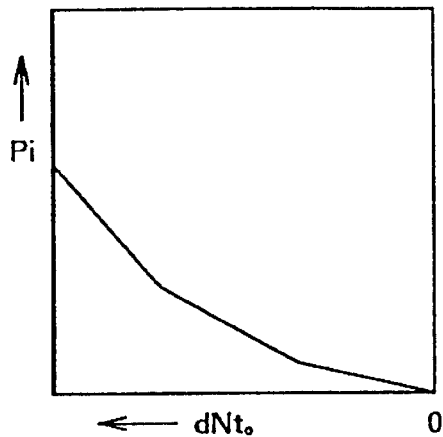
FIG. 17 is a map of hydraulic pressure with respect to target turbine speed change rate used in the base hydraulic pressure calculation.
Figure 18:
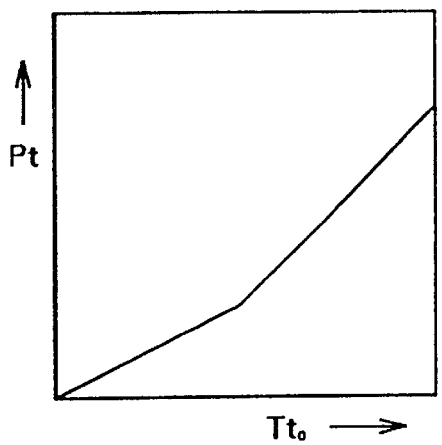
FIG. 18 is a map of hydraulic pressure with respect to target turbine torque used in the base hydraulic pressure calculation.
Figure 19:
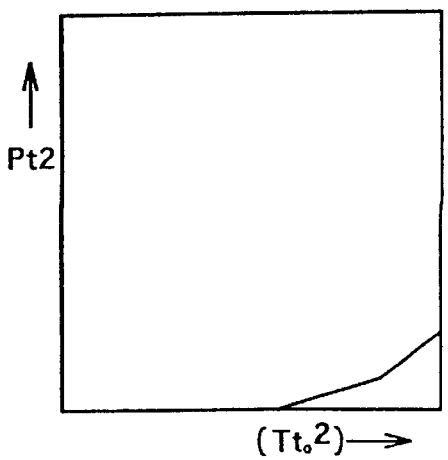
FIG. 19 is a map of a square of hydraulic pressure with respect to target turbine torque used in the base hydraulic pressure calculation.

At step S11, a target turbine speed change rate $dNt_0$ during the gear shift is calculated, and then, at step S12, a hydraulic pressure Pi for the target turbine speed change rate $dNt_0$ is read from a hydraulic pressure map such as shown in FIG. 17 in which the greater the hydraulic pressure Pi is, the greater the absolute value of the target turbine speed change rate $dNt_0$ is. Subsequently, hydraulic pressures Pt and Pt2 corresponding to target turbine torque $Tt_0$ during the gear shift and its square $(Tt_0)^2$ are read from hydraulic pressure maps such as shown in FIGS. 18 and 19, respectively, at steps S13 and S14, respectively. An initial base hydraulic pressure Pb' is found by adding these hydraulic pressures Pt and Pt2 to the hydraulic pressure Pi at step S15. In this instance, this target turbine torque $Tt_0$ is calculated by multiplying the turbine torque before a gear shift by an engine torque drop rate. Through the correction of the hydraulic pressure Pi for the target turbine speed change rate $dNt_0$ making use of the hydraulic pressures Pt and Pt2 corresponding to this target turbine torque $Tt_0$, fluctuations of transmission output torque is more effectively suppressed during the gear shift.

Thereafter, at step S16, a determination is made in order to find a point of time (labeled "A" in FIG. 15) at which the turbine speed Nt starts to fall due to commencement of the inertia phase as to whether or not the target turbine speed change rate $dNt_0$ is less than a specified rate K1. Until the target turbine speed change rate $dNt_0$ becomes less than the specified rate K1, the initial base pressure Pb' is directly used as the base hydraulic pressure Pb at step S17. On the other hand, when the target turbine speed change rate $dNt_0$ is already less than the specified rate K1, then, the base hydraulic pressure Pb is increased at a fixed rate by adding to the initial base pressure Pb' a correction pressure (K2×t) obtained by multiplying a specified value K2 by the a time t passed from the point of time at which the target turbine speed change rate $dNt_0$ exceeded the specified rate K1. As a result, the base pressure Pb is controlled to change as shown in FIG. 15.

(3) Feedback Hydraulic Pressure Calculation

Figure 20:
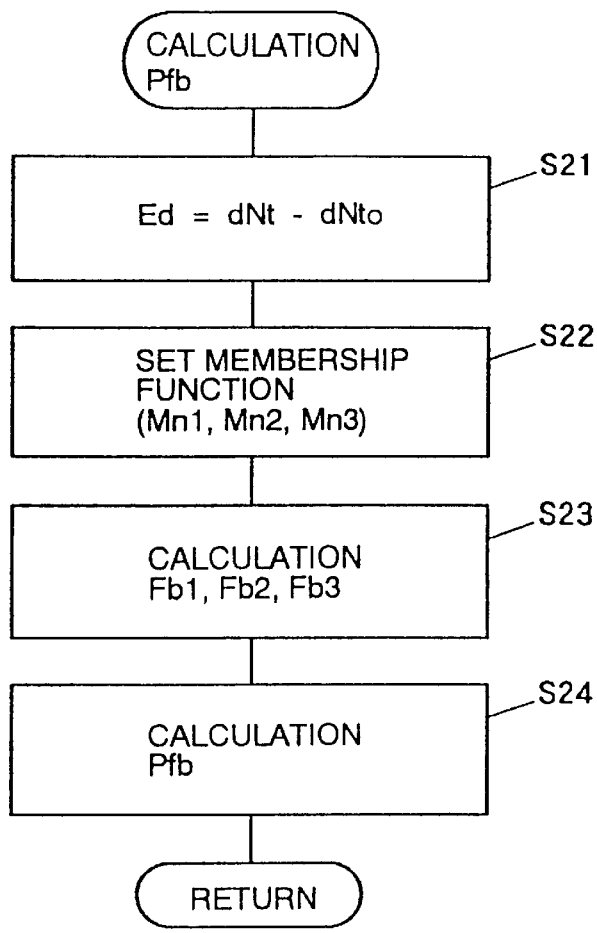
FIG. 20 is a flowchart illustrating the sequence routine of feedback hydraulic pressure calculation during the 1–2 gear shift.

The calculation of the feedback hydraulic pressure Pfb is accomplished following the flowchart illustrating the feedback hydraulic pressure calculation sequential subroutine shown in FIG. 20. The feedback pressure Pfb is calculated in a fuzzy control method in order to cope with the fact that the feedback control system has dynamic characteristics different in accordance with driving conditions including the turbine speed Nt and so forth.

Figure 21:
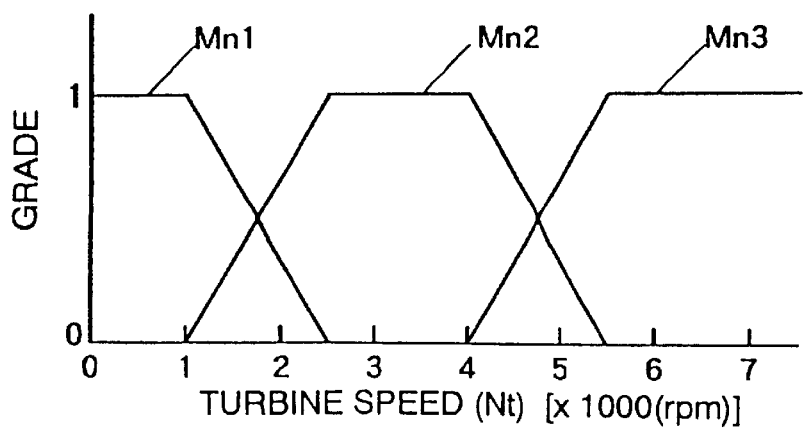
FIG. 21 is an explanatory diagram of an example of membership functions used in the feedback hydraulic pressure calculation.

The flowchart logic commences and control passes directly to a function block S21 where a calculation of the deviation Ed(t) of the turbine speed change rate dNt from the target turbine speed change rate $dNt_0$. At step S22, fuzzy stratification is made on turbine speeds Nt to classify them into a plurality of sheaves according to which three functions of members Mn1, Mn2 and Mn3 have different grade values between one and zero. These membership functions Mn1, Mn2 and Mn3 are graphically shown in FIG. 21 and defined by the following numerical formulas:

$$Mn1 = \begin{bmatrix} 1.0 & : Nt < 1,000 \\ (2,500 - Nt)/1,500 & : 1,000 \leq Nt \leq 2,500 \\ 0.0 & : Nt \geq 2,500 \end{bmatrix}$$

$$Mn2 = \begin{bmatrix} 0.0 & : Nt < 1,000 \\ 1 - Mn1 & : 1,000 \leq Nt < 2,500 \\ 1.0 & : 2,500 \leq Nt < 4,000 \\ (5,500 - Nt)/1,500 & : 4,000 \leq Nt < 5,500 \\ 0.0 & : Nt \geq 5,500 \end{bmatrix}$$

$$Mn3 = \begin{bmatrix} 0.0 & : Nt < 4,000 \\ 1 - Mn2 & : 4,000 \leq Nt < 5,500 \\ 1.0 & : Nt \geq 5,500 \end{bmatrix}$$

Subsequently, at step S23, feedback-manipulated variables Fb1(t), Fb2(t) and Fb3(t) in accordance with the deviations Ed(t) obtained at step T201 by calculating the following generalized expressions F1, F2 and F3 in which coefficients corresponding to the respective three regions of turbine speeds Nt having different dynamic characteristics are given.

Fb1(t)=F1[Ed(t), Ed(t−1), Ed(t−2), . . . Fb1(t−1), Fb1(t−2), Fb1(t−3), . . . ]

Fb2(t)=F2[Ed(t), Ed(t−1), Ed(t−2), . . . Fb2(t−1), Fb2(t−2), Fb2(t−3), . . . ]

$$Fb3(t)=F3[Ed(t), Ed(t-1), Ed(t-2), \ldots Fb3(t-1), Fb3(t-2), Fb3(t-3), \ldots]$$

These generalized expressions are used to calculate the latest feedback-manipulated variables Fb1(t), Fb2(t) and Fb3(t) by substituting the latest and previous deviations Ed(t) and Ed(t−i) and the previous feedback-manipulated variables Fb1(t−i), Fb2(t−i) and Fb3(t−i) into the respective functions.

Finally, at step S24, eventual feedback-manipulated variables Fb(t) is calculated by performing fuzzy composition of the latest feedback-manipulated variables Fb1(t), Fb2(t) and Fb3(t) in accordance with the following formula in which grade values Mn1(Nt), Mn2(Nt) and Mn3(Nt) of the respective membership functions Mn1, Mn2 and Mn3 for the latest turbine speeds Nt.

$$Fb(t)=[Fb1(t) \cdot Mn1(Nt)+Fb2(t) \cdot Mn2(Nt)+Fb3(t) \cdot Mn3(Nt)] \div [Mn1(Nt)+Mn2(Nt)+Mn3(Nt)]$$

This eventual feedback-manipulated variable Fb(t) is substituted for the feedback pressure Pfb. As apparent from the above description, because the feedback pressure Pfb is calculated by composing the latest feedback-manipulated variables Fb1(t), Fb2(t) and Fb3(t) which have been weighted in accordance with the regions of turbine speeds Nt, even in the event that dynamic characteristics of the feedback control system, such as a characteristic of turbine speed changing with respect to the working pressure and a characteristic of the working pressure with respect to the duty rate of a pressure control duty solenoid valve for example, are different in accordance with the regions of turbine speeds Nt, the feedback control is accomplished under the dynamic characteristics peculiar to a specific region of turbine speeds.

The feedback-manipulated variables Fb1(t), Fb2(t) and Fb3(t) are practically calculated from the following formulas:

$$Fb1(t) = A1_0 \cdot Ed(t) + \\
A1_1 \cdot Ed(t-1) + A1_2 \cdot Ed(t-2) + A1_3 \cdot Ed(t-3) + \\
A1_4 \cdot Ed(t-4) + A1_5 \cdot Ed(t-5) + A1_6 \cdot Ed(t-6) - \\
B1_1 \cdot Fb1(t-1) - B1_2 \cdot Fb1(t-2) - B1_3 \cdot Fb1(t-3) - \\
B1_4 \cdot Fb1(t-4) - B1_5 \cdot Fb1(t-5) - B1_6 \cdot Fb1(t-6)$$

$$Fb2(t) = A2_0 \cdot Ed(t) + \\
A2_1 \cdot Ed(t-1) + A2_2 \cdot Ed(t-2) + A2_3 \cdot Ed(t-3) + \\
A2_4 \cdot Ed(t-4) + A2_5 \cdot Ed(t-5) + A2_6 \cdot Ed(t-6) - \\
B2_1 \cdot Fb1(t-1) - B2_2 \cdot Fb1(t-2) - B2_3 \cdot Fb1(t-3) - \\
B2_4 \cdot Fb1(t-4) - B2_5 \cdot Fb1(t-5) - B2_6 \cdot Fb1(t-6)$$

$$Fb3(t) = A3_0 \cdot Ed(t) + \\
A3_1 \cdot Ed(t-1) + A3_2 \cdot Ed(t-2) + A3_3 \cdot Ed(t-3) + \\
A3_4 \cdot Ed(t-4) + A3_5 \cdot Ed(t-5) + A3_6 \cdot Ed(t-6) - \\
B3_1 \cdot Fb1(t-1) - B3_2 \cdot Fb1(t-2) - B3_3 \cdot Fb1(t-3) - \\
B3_4 \cdot Fb1(t-4) - B3_5 \cdot Fb1(t-5) - B3_6 \cdot Fb1(t-6)$$

These formulas, which are expressed in the form of what is called a transfer function, include coefficients $A1_0$ through $A1_6$ and $B1_0$ through $B1_6$, $A2_0$ through $A2_6$ and $B2_0$ through $B2_6$, and $A3_0$ through $A3_6$ and $B3_0$ through $B3_6$, respectively, each of the groups of coefficients being established differently so as to correspond to dynamic characteristics for the respective turbine speed regions. The feedback-manipulated variables Fb1(t), Fb2(t) and Fb3(t) may be alternatively calculated from the formulas expressed in a form of integral-proportional differential (I-PD) control as follows:

$$Fb1(t) = C1_1 \cdot [Ed(t) - Ed(t-1)] - \\
C1_2 \cdot [dNt(t) - dNt(t-1)] - \\
C1_3 \cdot [dNt(t) - 2 \cdot dNt(t-1) - dNt(t-2)] + \\
Fb1(t-1)$$

$$Fb2(t) = C2_1 \cdot [Ed(t) - Ed(t-1)] - \\
C2_2 \cdot [dNt(t) - dNt(t-1)] - \\
C2_3 \cdot [dNt(t) - 2 \cdot dNt(t-1) - dNt(t-2)] + \\
Fb2(t-1)$$

$$Fb3(t) = C3_1 \cdot [Ed(t) - Ed(t-1)] - \\
C3_2 \cdot [dNt(t) - dNt(t-1)] - \\
C3_3 \cdot [dNt(t) - 2 \cdot dNt(t-1) - dNt(t-2)] + \\
Fb3(t-1)$$

The groups of coefficients $A1_0$ through $A1_6$ and $B1_0$ through $B1_6$, $A2_0$ through $A2_6$ and $B2_0$ through $B2_6$, and $A3_0$ through $A3_6$ and $B3_0$ through $B3_6$ are differently established so as to correspond to dynamic characteristics for the respective turbine speed regions.

Figure 22:
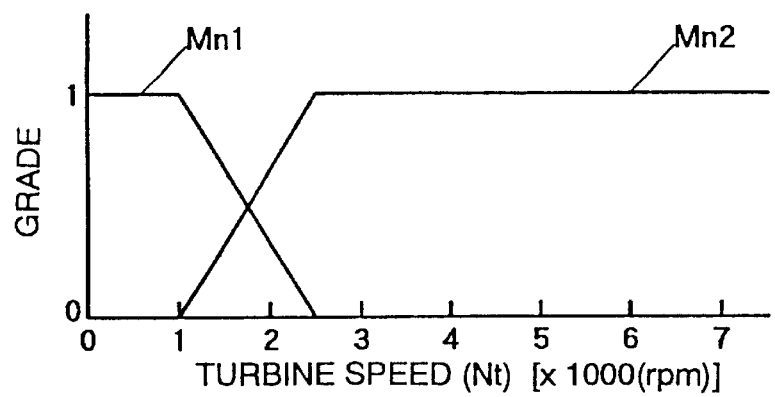
FIG. 22 is an explanatory diagram of another example of membership functions used in the feedback hydraulic pressure calculation.
Figure 23:
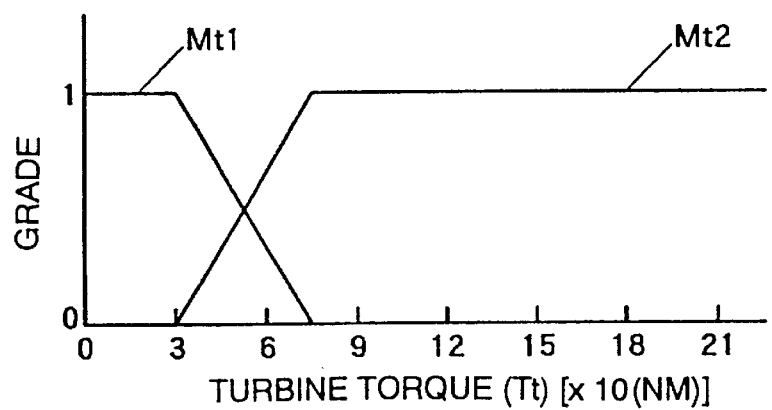
FIG. 23 is an explanatory diagram of another example of membership functions used in the feedback hydraulic pressure calculation.

The following description is directed to the example of calculating an eventual feedback-manipulated variable Fb(t) in the fuzzy composing manner by use of formulas corresponding to sheaves of turbine speeds Nt and sheaves of turbine torque Tt to which driving conditions are fuzzy stratified in accordance with dynamic characteristics of the feedback control system. In this example, membership functions Mn1 and Mn2, each of which includes a turbine speed Nt as a parameter, and membership functions Mt1 and Mt2, each of which includes turbine torque Tt as a parameter, are graphically shown in FIGS. 22 and 23 and defined by the following numerical formulas:

$$Mn1 = \begin{cases} 1.0 & : Nt < 1,000 \\ (2,500 - Nt)/1,500 & : 1,000 \leq Nt < 2,500 \\ 0.0 & : Nt \geq 2,500 \end{cases}$$

$$Mn2 = \begin{cases} 0.0 & : Nt < 1,000 \\ 1 - Mn1 & : 1,000 \leq Nt < 2,500 \\ 1.0 & : Nt \geq 2,500 \end{cases}$$

$$Mt1 = \begin{cases} 1.0 & : Tt < 30 \\ (75 - Tt)/45 & : 30 \leq Tt < 75 \\ 0.0 & : Tt \geq 75 \end{cases}$$

$$Mt2 = \begin{cases} 0.0 & : Tt < 30 \\ 1 - Mt1 & : 30 \leq Tt < 75 \\ 1.0 & : Tt \geq 75 \end{cases}$$

Figure 24:
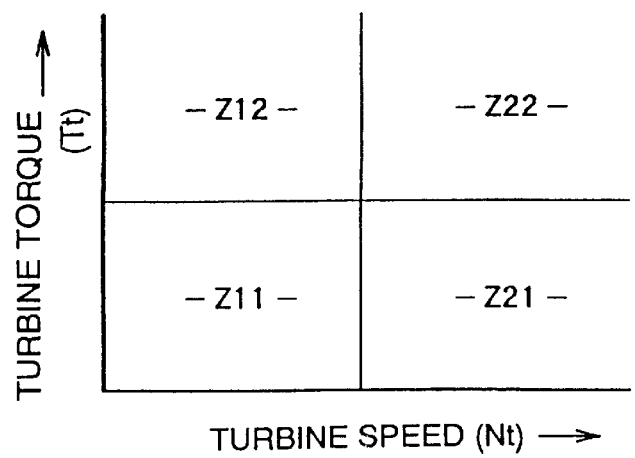
FIG. 24 is an explanatory diagram of fuzzy stratified zones.

Feedback-manipulated variables Fb11(t), Fb12(t), Fb21(t) and Fb22(t) are obtained by calculating the following formulas established for the four regions Z11, Z12, Z21 and Z22 stratified using as parameters turbine speeds Nt and turbine torque Tt such as shown in FIG. 24 in which the deviation Ed(t) of the turbine speed change rate from the target turbine speed change rate and the turbine speed change rate dNt(t) are substituted.

$$Fb11(t) = D1_1 \cdot [Ed(t) - Ed(t-1)] -$$
$$D1_2 \cdot [dNt(t) - dNt(t-1)] -$$
$$D1_3 \cdot [dNt(t) - 2 \cdot dNt(t-1) - dNt(t-2)] +$$
$$Fb11(t-1)$$

$$Fb12(t) = D2_1 \cdot [Ed(t) - Ed(t-1)] -$$
$$D2_2 \cdot [dNt(t) - dNt(t-1)] -$$
$$D2_3 \cdot [dNt(t) - 2 \cdot dNt(t-1) - dNt(t-2)] +$$
$$Fb12(t-1)$$

$$Fb21(t) = D3_1 \cdot [Ed(t) - Ed(t-1)] -$$
$$D3_2 \cdot [dNt(t) - dNt(t-1)] -$$
$$D3_3 \cdot [dNt(t) - 2 \cdot dNt(t-1) - dNt(t-2)] +$$
$$Fb21(t-1)$$

$$Fb22(t) = D4_1 \cdot [Ed(t) - Ed(t-1)] -$$
$$D4_2 \cdot [dNt(t) - dNt(t-1)] -$$
$$D4_3 \cdot [dNt(t) - 2 \cdot dNt(t-1) - dNt(t-2)] +$$
$$Fb22(t-1)$$

The groups of coefficients $D1_1$ through $D1_3$, $D2_1$ through $D2_3$, $D3_1$ through $D3_3$ and $D4_1$ through $D4_3$ are differently established so as to provide the feedback-manipulated variables Fb11(t), Fb12(t) and Fb21(t) and Fb22(t) correspondingly to dynamic characteristics for the respective turbine speed regions.

Eventual feedback-manipulated variable Fb(t) is calculated by performing fuzzy composition of the latest feedback-manipulated variables Fb11(t), Fb12(t), and Fb21 (t) and Fb22(t) in accordance with the following formula in which grade values Mn1(Nt) and Mn2(Nt) for the latest turbine speeds Nt and Mt1(Tt) and Mt2(Tt) for the latest turbine torque Tt of the respective membership functions Mn1, Mn2, Mt1 and Mt2.

$$Fb(t) = [Fb11(t) \cdot Mn1(Nt) + Fb12(t) \cdot Mn2(Nt) +$$
$$Fb21(t) \cdot Mt1(Tt) + Fb22(t) \cdot Mt2(Tt)] \div$$
$$[Mn1(Nt) + Mn2(Nt) + Mt1(Tt) + Mt2(Tt)]$$

In accordance with to this example, because the eventual feedback-manipulated variable Fb(t) is established in consideration with the difference among dynamic characteristics in accordance with the regions of turbine speeds and turbine torque, the feedback control of servo apply pressure is accomplished in conformity with driving conditions in any region of turbine speed and turbine torque.

(4) Learned Hydraulic Pressure Calculation

At the beginning of the 1–2 up shift, the torque phase is actualized by means of supplying the initial base hydraulic pressure Pb' to the servo apply pressure chamber of the 2–4 brake 54 after a conclusion of the precharge control. Practically, as shown at steps S3 and S4 of the flowchart in FIG. 14, the hydraulic pressure to be supplied is the base hydraulic pressure Pb added by the learned hydraulic pressure Pad obtained during the first previous 1–2 up shift.

Figure 26:
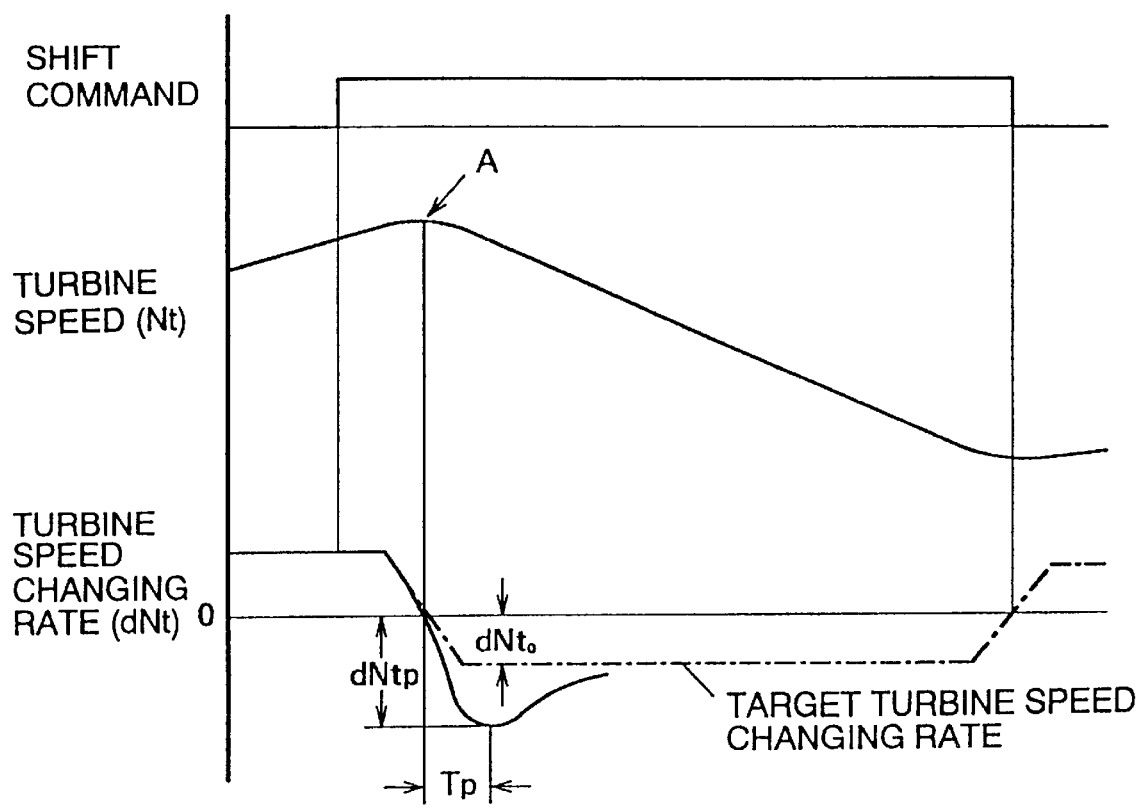
FIG. 26 is a time chart illustrating controlling and controlled parameters during the learned pressure calculation.

The learned hydraulic pressure Pad is established at conclusion of a first previous up shift in accordance with how the feedback control was performed in the inertia phase of the first previous up shift. Calculation of the learned hydraulic pressure Pad is accomplished following the flowchart illustrating the sequence subroutine shown in FIG. 25. The flowchart logic commences and control passes directly to a function block S31 a determination is made as to whether or not a gear shift has been concluded. When the gear shift has been concluded, at step S32, detection is made to find a first peak value (absolute value) dNtp of turbine speed change rate dNt in the inertia phase and the number of control cycles counted before the first peak value dNtp appears in an inertia phase such as graphically shown in FIG. 26. Subsequently, membership functions Mp1 and Mp2, each of which includes the point of time of the appearance of peak value as a parameter, are established in accordance with the following formulas at step T303.

$$Mp1 = \begin{bmatrix} 1.0 & : Tpt < 6 \\ (8 - Pt)/2 & : 6 \leq Nt < 8 \\ 0.0 & : Pt \geq 8 \end{bmatrix}$$

$$Mp2 = \begin{bmatrix} 0.0 & : Pt < 6 \\ 1 - Mp1 & : 6 \leq Nt < 8 \\ 1.0 & : Pt \geq 8 \end{bmatrix}$$

Figure 27:
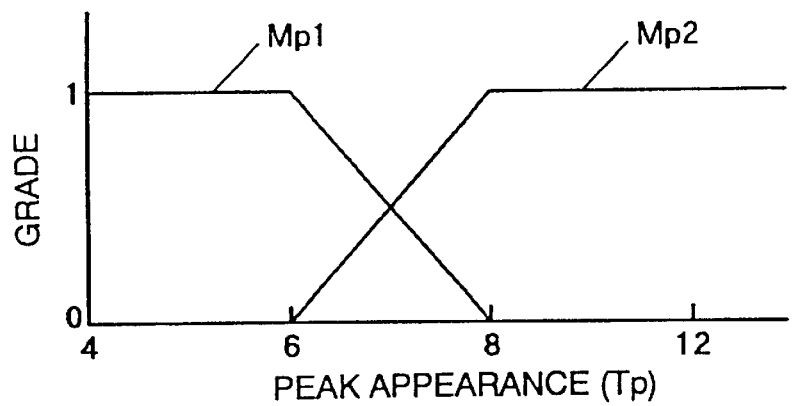
FIG. 27 is an explanatory diagram of an example of membership functions on peak values of turbine speed change rates used in the learned pressure calculation.

The membership functions Mp1 and Mp2 are graphically illustrated in FIG. 27.

At step S34, in accordance with the number of control cycles Tp, correction values Pxp1 and Pxp2 are obtained by calculating the following formulas into which the peak value dNtp is substituted.

$$Pxp1 = -(dNtp - dNt_0) \cdot E1$$
$$Pxp2 = -(dNtp - dNt_0) \cdot E2$$

where E1 and E2 are coefficients differently established in accordance with the number of control cycles Tp until an appearance of first peak value dNtp.

Thereafter, after striking the average Mfb of feedback-manipulated variables (feedback hydraulic pressures Pfb) in the inertia phase at step S35, membership functions Mf1, Mf2 and Mf3 including the average Mfb as a parameter are established at step S36 as follows:

$$Mf1 = \begin{bmatrix} 1.0 & : Mfb < -5 \\ (5 - Mfb)/10 & : -5 \leq Mfb < 5 \\ 0.0 & : Mfb \geq 5 \end{bmatrix}$$

$$Mf2 = \begin{bmatrix} 1.0 & : Mfb < -5 \\ 1 - Mf1 & : -5 \leq Mfb < 5 \\ 1.0 & : 5 \leq Mfb < 15 \\ (25 - Mfb)/10 & : 15 \leq Mfb < 25 \\ 0.0 & : Mfb \geq 25 \end{bmatrix}$$

$$Mf1 = \begin{bmatrix} 0.0 & : Mfb < 15 \\ 1 - Mf2 & : 15 \leq Mfb < 25 \\ 1.0 & : Mfb \geq 25 \end{bmatrix}$$

Figure 28:
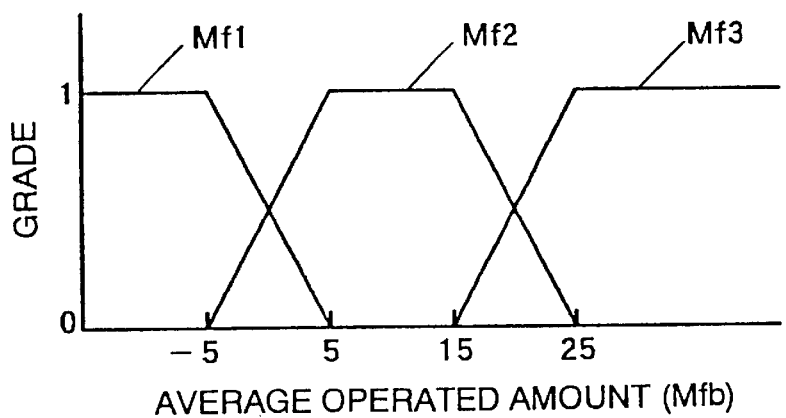
FIG. 28 is an explanatory diagram of an example of membership functions on average values of feedback-manipulated variables used in the learned pressure calculation.

These membership functions Mf1, Mf2 and Mf3 are graphically illustrated in FIG. 28.

At step S37, correction values Pxf1, Pxf2 and Pxf3 in accordance with the average Mfb of feedback-manipulated variables are obtained by calculating the following formulas into which average Mfb of feedback-manipulated variables is substituted.

$$Pxf1 = -Mfb \cdot F1$$

$$Pxf2 = -Mfb \cdot F2$$

$$Pxf3 = 0$$

where F1 and F2 are coefficients differently established in accordance with the average Mfb of feedback-manipulated variables, and F3 takes 0 (zero) regardless of the average Mfb of feedback-manipulated variables.

Following striking the average Med of deviations Ed of the turbine speed change rates dNt with respect to the target turbine speed change rates $dNt_0$ in the inertia phase at step S38, membership functions Mf1, Mf2 and Mf3 including the average Med of deviations Ed as a parameter are established at step S39 as follows:

$$Me1 = \begin{bmatrix} 1.0 & : Med < -15 \\ (-5 - Med)/10 & : -15 \le Med < -5 \\ 0.0 & : Mfb \ge -5 \end{bmatrix}$$

$$Me2 = \begin{bmatrix} 0.0 & : Med < -15 \\ 1 - Me1 & : -15 \le Med < -5 \\ 1.0 & : -5 \le Med < 5 \\ (15 - Med)/10 & : 5 \le Med < 15 \\ 0.0 & : Med \ge 15 \end{bmatrix}$$

$$Me3 = \begin{bmatrix} 0.0 & : Med < 5 \\ 1 - Me2 & : 5 \le Med < 15 \\ 1.0 & : Med \ge 15 \end{bmatrix}$$

Figure 29:
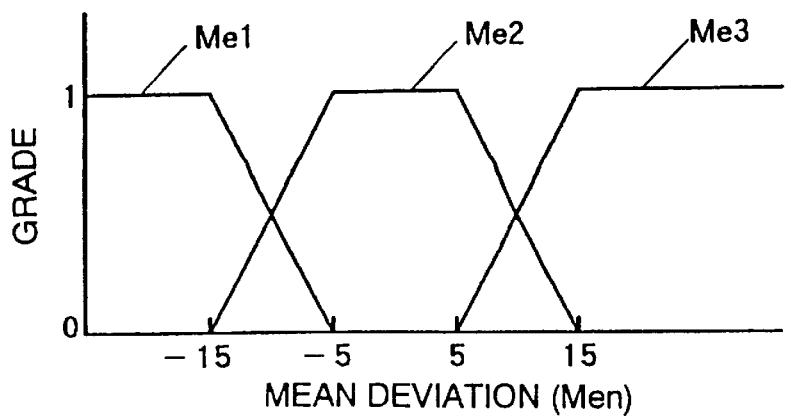
FIG. 29 is an explanatory diagram of an example of membership functions on average values of deviations of feedback-manipulated variables used in the learned pressure calculation.

These membership functions Me1, Me2 and Me3 are graphically illustrated in FIG. 29.

At step S40, correction values Pxe1, Pxe2 and Pxe3 in accordance with the average Med of deviations Ed are obtained by calculating the following formulas into which the average Med of deviations Ed is substituted.

$$Pxe1 = Med \cdot dNt_0 \cdot G1$$

$$Pxe2 = -Med \cdot dNt_0 \cdot G2$$

$$Pxe3 = 0$$

where G1 and G2 are coefficients differently established in accordance with the average Med of deviations Ed, and F3 takes 0 (zero) regardless of the average Med of deviations Ed.

Finally, at step S41, eventual correction value Pad is calculated by performing fuzzy composition of the correction values Pxp1, Pxp2, Pxf1 through Pxf3, and Pxe1 through Pxe3 in accordance with the following formula:

$$Pad = (Pxp1 \cdot Mp1 + Pxp2 \cdot Mp2 +$$

$$Pxf1 \cdot Mf1 + Pxf2 \cdot Mf2 + Pxf3 \cdot Mf3 +$$

$$Pxe1 \cdot Me1 + Pxe2 \cdot Me2 + Pxe3 \cdot Me3) \div$$

$$(Mp1 + Mp2 + Mf1 + Mf2 + Mf3 + Me1 + Me2 + Me3)$$

This learned hydraulic pressure Pad is added as an eventual correction pressure to the base pressure Pb during the same type of next gear shift to establish the working pressure during the torque phase. In this case, because the learned hydraulic pressure Pad is obtained by means of the fuzzy composition of correction values calculated based on a peak value dNtp of turbine speed change rate dNt having occurred first in the inertia phase, the number of control cycles Tp until an appearance of the first peak value dNtp, the average Mfb of feedback-manipulated variables (feedback hydraulic pressure Pfb) during the inertia phase, the average Med of deviations Ed of the turbine speed change rate dNt from the target turbine speed change rate $dNt_0$ during the inertia phase, respectively, during an inertia phase in the same type of next gear shift, the feedback control is satisfactorily accomplished by supplying as a working pressure the base hydraulic pressure Pb added by the learned hydraulic pressure Pad, making it possible to reduce the peak value dNtp of turbine speed change rate dNt and/or to reduce the feedback hydraulic pressure Pfb or the deviation Ed of the turbine speed change rate dNt from the target turbine speed change rate $dNt_0$. Consequently, precise agreement is yielded between the turbine speed change rate dNt and the target turbine speed change rate $dNt_0$ during the inertia phase. Although the learned hydraulic pressure Pad is calculated for each type of gear shift and used in the same type of next gear shift, it may be done to classify learned hydraulic pressures Pad in accordance with magnitude of turbine torque for the same type of gear shifts and store them and used afterward for the same turbine torque Tt in the same type of next gear shift. This makes it more precisely to perform not only the working pressure control during a torque phase but also the feedback pressure control during an inertia phase. The calculations of these base pressure Pb, feedback pressure Pfb and learned pressure Pad are performed in other gear shifts as well as in the 1–2 up shift.

(5) Working Pressure Correction at the Beginning of Inertia Phase

During an inertia phase in a 1–2 up shift, while keeping the turbine speed change rate dNt in agreement with a target turbine speed change rate $dNt_0$, the turbine speed Nt is reduced to a shift-end turbine speed by feedback controlling the working hydraulic pressure using feedback-manipulated variables. However, there are cases where, because, for example, the working pressure during a torque phase, i.e. the initial base pressure Pb' (see FIG. 15), is improper, the feedback control is unsatisfactorily performed after a shift to an inertia phase from the torque phase. For example, if the initial base hydraulic pressure Pb' is too high, the working hydraulic pressure is at a high level at the beginning of an inertia phase due to a delay of control in such a direction as to reduce the working hydraulic pressure at the beginning of the feedback control, causing the 2–4 brake 54 to be quickly. To the contrary, if the initial base pressure Pb' is too low, the inertia phase expends a long time due to a delay of control in such a direction as to increase the working hydraulic pressure at the beginning of the feedback control. In either case, it is hard to provide a satisfactory shift feeling.

In view of the above circumstances, in this embodiment, the working pressure correction control is performed in accordance with states of the feedback control at the beginning of an inertia phase to accomplish satisfactorily the feedback control during the inertia phase after detection of the state of the feedback control.

Figure 30:
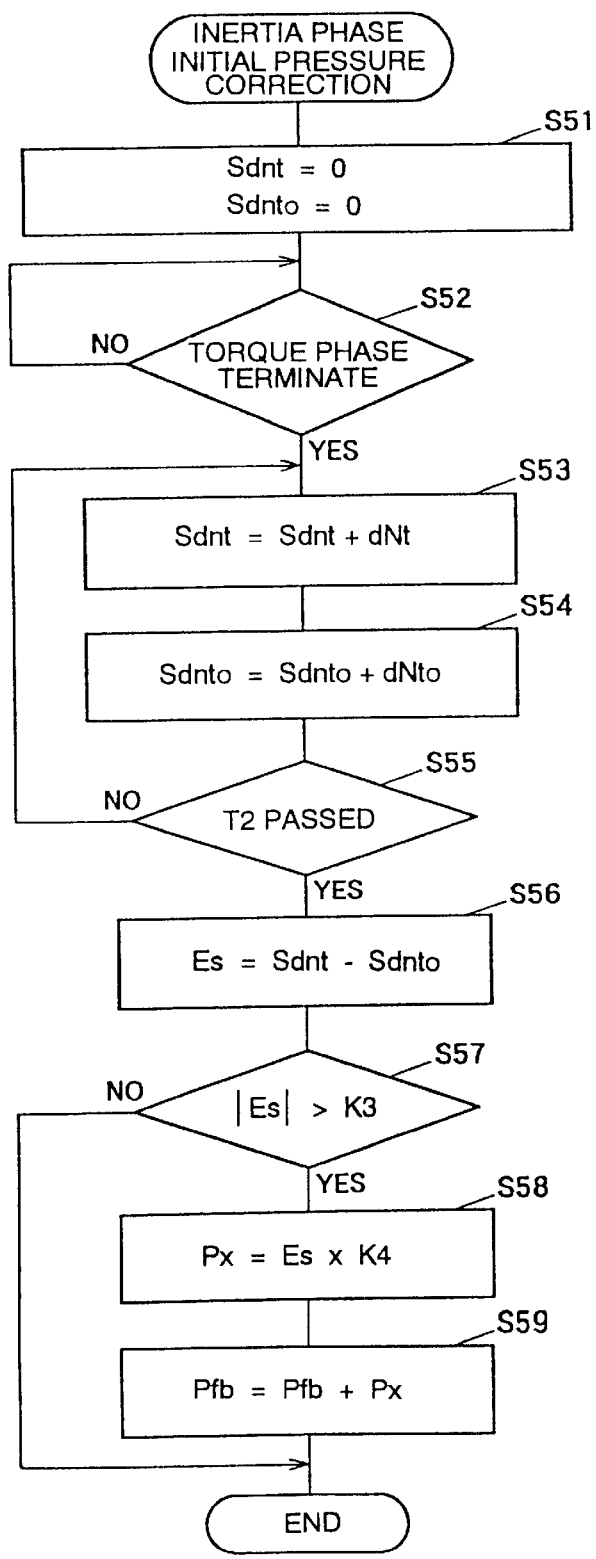
FIG. 30 is a flowchart illustrating the sequence routine of initial working pressure correction control during the 1–2 gear shift.

The working pressure correction at the beginning of an inertia phase is accomplished following the flowchart illustrating the sequence routine shown in FIG. 30. This working pressure correction is performed along with the servo apply pressure feedback control shown in FIG. 14 for a 1–2 up shift to correct the feedback hydraulic pressure Pfb calculated at step S2 of the flowchart. The flowchart logic commences in response to an appearance of a 1–2 gear shift command and control passes directly to a function block at S51 where initialization is made to clear the integrated value Sdnt of turbine speed change rate Nt and the integrated value $Sdnt_0$ of target turbine speed change rate $dNt_0$. Thereafter, a determination is made at step S52 as to whether or not a torque phase has been over. This determination is practiced by detecting a point of time at which the turbine speed change rate dNt reverses from positive to negative (see a point labeled "A" in FIG. 31). When the feedback control has shifted to an inertia phase from the torque phase, through steps S53 to S55, integration is performed on the turbine speed change rate dNt and the target turbine speed change rate $dNt_0$ to calculate their integration values Sdnt (=Sdnt+ dNt) and $Sdnt_0$(=$Sdnt_0$+$dNt_0$) until passage of a specified time T2 (which is, for example, 75 ms when the correction control needs 25 ms to perform one control cycle) from the phase shift. After the passage of the specified time T2, at step S56, deviation Es of the integration value Sdnt of the turbine speed change rate dNt with respect to the integration value $Sdnt_0$ of target turbine speed change rate $dNt_0$. Subsequently, a determination is made at step S57 as to whether or not the deviation Es has an absolute value greater than a specified value K3. The absolute value of deviation Es is equivalent to an area shadowed in FIG. 31.

When the absolute value of deviation Es is greater than the specified value K3, this indicates that there is great deviation between the turbine speed change rate dNt and the target turbine speed change rate $dNt_0$ and it is regarded that the feedback control is possibly unsatisfactorily performed afterward, then, after finding a correction pressure Px in accordance with the deviation Es by calculating an equation Px=Es×K4 (K4: constant) at step S58, the feedback hydraulic pressure Pfb is corrected by adding the correction pressure Px thereto.

Figure 31:
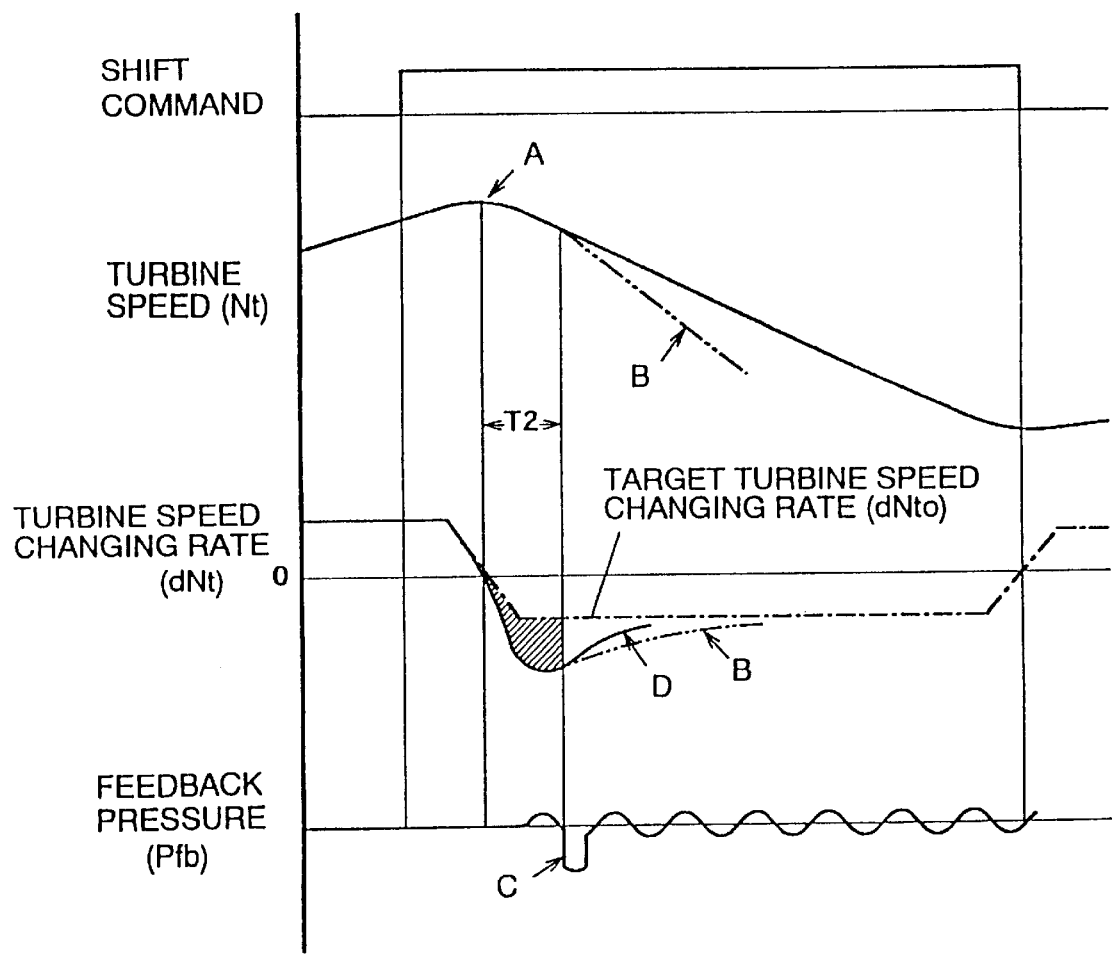
FIG. 31 is a time chart illustrating parameters of the initial working pressure correction control.

The case as shown in FIG. 31 where the deviation Es between the integration values Sdnt and $Sdnt_0$ has a minus value occurs when the working pressure is too high. In this case, as indicated by dotted-broken line "B" in FIG. 31, the absolute value of turbine speed change rate dNt becomes greater than the absolute value of target turbine speed change rate $dNt_0$, producing a rapid drop in turbine speed Nt. However, because the feedback pressure Pfb is added by a minus correction pressure Px, it is momentarily forced to drop as labeled "C" in FIG. 31. As a result, when the feedback control is resumed, the turbine speed change rate dNt rapidly converges at the target turbine speed change rate $dNt_0$. In a similar manner, even when the deviation Es has a minus value, the turbine speed change rate dNt rapidly converges at the target turbine speed change rate $dNt_0$. The working pressure correction is performed at the beginning of inertia phase during up shifts as well as during the 1–2 up shift.

(6) Setting of Precharge Period

Figure 32:
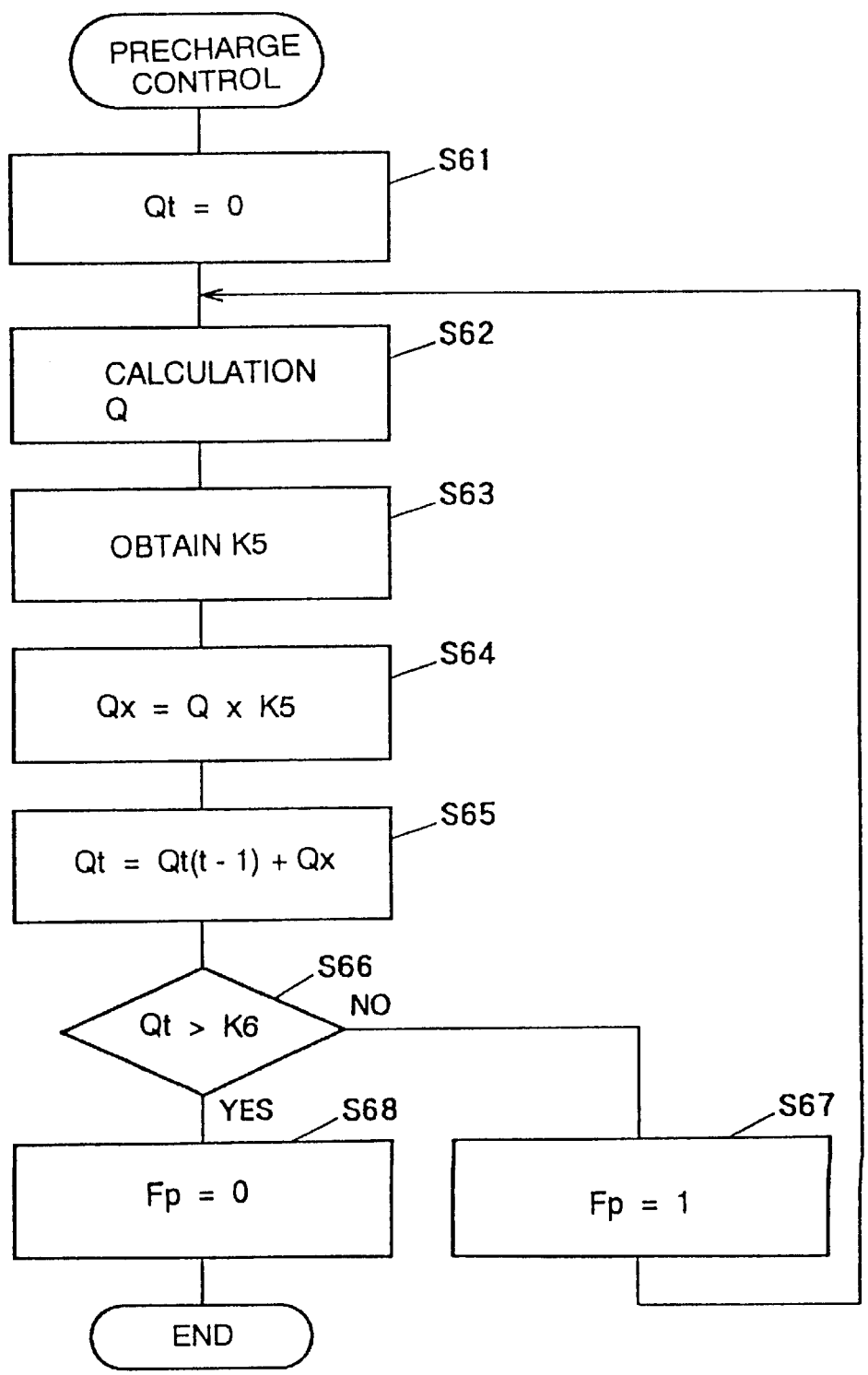
FIG. 32 is a flowchart illustrating the sequence routine of precharge control during the 1–2 gear shift.
Figure 33:
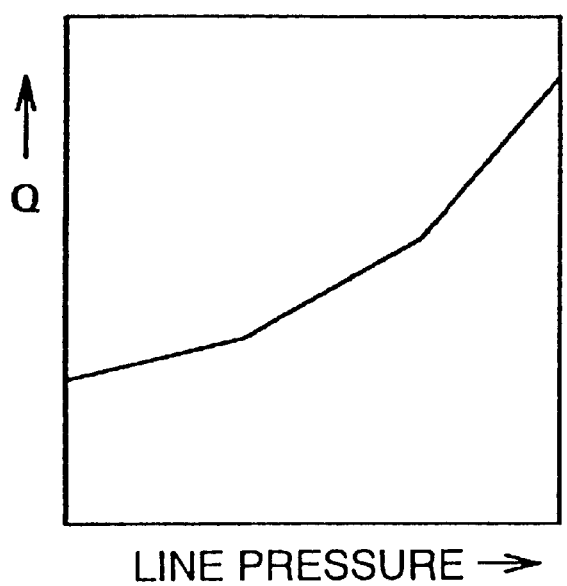
FIG. 33 is a map of flowing quantity of a base pressurized fluid with respect to line pressure used in the precharge control.
Figure 34:
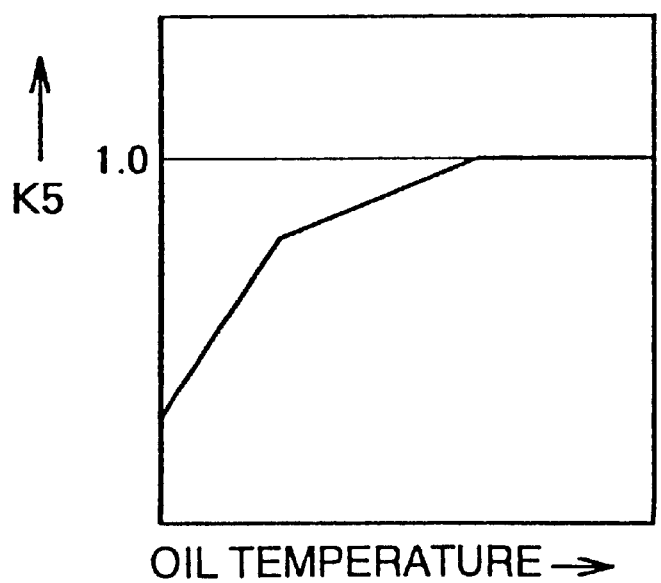
FIG. 34 is a map of control coefficient with respect to fluid temperature used in the precharge control.

The precharge period correction performed coincidentally with the servo apply pressure feedback control shown in FIG. 14 at the beginning of gear shift is accomplished following the flowchart illustrating the sequence routine shown in FIG. 32. The flowchart logic commences in response to an appearance of a gear shift command and control passes directly to a function block at S61 where initialization is made to reset the total flowing quantity of working fluid Qt. Subsequently, at step S62, a base flowing quantity Q, which is defined as the flowing quantity of working fluid passing through the first duty solenoid valve 121 operating at a duty rate of 0%, in accordance with the line pressure is read from a flowing rate map shown in FIG. 33. In the flowing rate map, the base flowing quantity of working fluid is specified to become greater with an increase in line pressure. This is because, even when the first duty solenoid valve 121 operates at a duty rate of 0%, the flowing quantity of working fluid passing through the first duty solenoid valve 121 changes in accordance with the level of line pressure and increases with an increase in line pressure. At step S63, a flowing rate correction coefficient K5 is read from a flowing rate correction map shown in FIG. 34 in order to correct the base flowing rate in accordance with the temperature of working fluid. The flowing rate correction map specifies the flowing rate correction coefficient K5 so as to lower it gradually from 1 (one) as the temperature of working fluid drops. After calculating a corrective flowing quantity Qx by multiplying the base flowing quantity Q by the correction coefficient K5 at step S64, a total flowing quantity Qt is obtained by calculating the following formula at step S65.

$$Qt=Qt(t-1)+Qx$$

where Qt(t-1) is the total flowing quantity in the previous cycle of sequential routine.

In cases where the working fluid passes through a valve at a flowing rate lower when it has a low viscosity due to a low temperature than it has a standard viscosity, the base flowing quantity is corrected to decrease in conformity with actual circumstances, so as to be adjusted to a practical flowing quantity.

Thereafter, a determination is made at step S66 as to whether or not the total flowing quantity Qt has exceeded a specified flowing quantity K6. Until the total flowing quantity Qt exceeds the specified flowing quantity K6, the precharge flag Fp remains up at step S67. On the other hand, when the total flowing quantity Qt exceeds the specified flowing quantity K6, the precharge flag Fp is reset to the state of "0" at step S68. In this instance, the specified flowing quantity K6 is established such as to be equal to the volume of fluid in a fluid path between the specific valve of the hydraulic pressure control circuit 100 to a pressure chamber of the specific friction coupling element, namely the hydraulic pressure line from the first duty solenoid valve 121 to the servo apply pressure chamber 54a of the 2–4 brake 54, when the gear shift is a 1–2 up shift. Consequently, it is regarded that the fluid path is filled with the working fluid when the total flowing quantity Qt reaches the specified flowing quantity K6, the precharge flag Fp is reset to the state of "0" at the moment.

In the period that the precharge flag Fp remains up, the first duty solenoid valve 121 is controlled to operate at a duty rate of 0% at step S6 of the flowchart shown in FIG. 14, quickly filling the hydraulic pressure line leading to the servo apply pressure chamber 54a of the 2–4 brake 54 with the working fluid. The precharge period setting routine is executed if necessary during up shifts as well as during the 1–2 up shift.

(7) 2–3 Up Shift

Basically, during a 2–3 up shift, the hydraulic pressure control circuit 100, on one hand, locks the 3–4 clutch 53 and unlocks the 2–4 brake 54 with the remaining friction coupling elements remained in the state for the second (2nd)

gear. In order to lock and unlock the 3–4 clutch 53 and the 2–4 brake 54, respectively, the second duty solenoid valve 122 is controlled to generate hydraulic pressures necessary to lock and unlock these 3–4 clutch 53 and 2–4 brake 54, respectively. During the 2–3 up shift, the height of what is called a shelf pressure, which refers to the fact that the hydraulic pressure in an inertia phase during locking the 3–4 clutch 53 increasingly or decreasingly changes through an intermediate shift constant in level, is feedback controlled to allow appropriate slippage of the 3–4 clutch 53, so as to bring the turbine speed change rate dNt into agreement with the target-turbine speed change rate $dNt_0$. This shelf pressure control is accomplished by controlling not the second duty solenoid valve 122 generating the 3–4 clutch pressure but the servo apply pressure through the first duty solenoid valve 121. Specifically, as shown in FIG. 3, because the hydraulic pressure control circuit 100 is provided with an orifice 151 at the junction where the hydraulic pressure line 224 extending from the second duty solenoid valve 122 is in communication with both hydraulic pressure line 225 and hydraulic pressure line 226 respectively leading to the servo release pressure line 221 and the 3–4 clutch pressure line 227, it is regarded that these hydraulic pressure lines 221 and 227 are disconnected from the second duty solenoid valve 122 upstream therefrom in terms of hydraulics. On the other hand, while the piston 54e of the 2–4 brake 54 (see FIG. 4) is traveling in the cylinder 54d of the 2–4 brake 54 by means of supply of the servo release pressure to the servo release pressure chamber 54b of the 2–4 brake 54, it becomes hard to control the hydraulic pressure in the pressure chamber of the 3–4 clutch 53. Though, as shown in FIG. 4, because of the mechanical structure of the 2–4 brake 54 in which the piston 54e partitions the pressure chamber into the servo apply pressure chamber 54a and the servo release pressure chamber 54b, the hydraulic pressure in the servo release pressure chamber 54b is directly affected by the hydraulic pressure in the servo apply pressure chamber 54a, enabling the hydraulic pressure in the pressure chamber of the 3–4 clutch 53 in communication with the servo release pressure chamber 54b of the 2–4 brake 54, namely the 3–4 clutch pressure, to be controlled by means of controlling the servo apply pressure through the first duty solenoid valve 121. Further, the second duty solenoid valve 122 regulates the flowing quantity of working fluid supplied to both pressure chamber of the 3–4 clutch 53 and servo release pressure chamber 54b of the 2–4 brake 54 through the orifice 151. This regulation controls the passage of time for which the shelf pressure is held in the inertia phase when the 3–4 clutch 53 is locked.

Accordingly, during the 2–3 up shift, while the level of shelf pressure is controlled by means of the first duty solenoid valve 121 when the 3–4 clutch 53 is locked, the passage of time for which the shelf pressure is held is controlled by means of the second duty solenoid valve 122.

Figure 35:
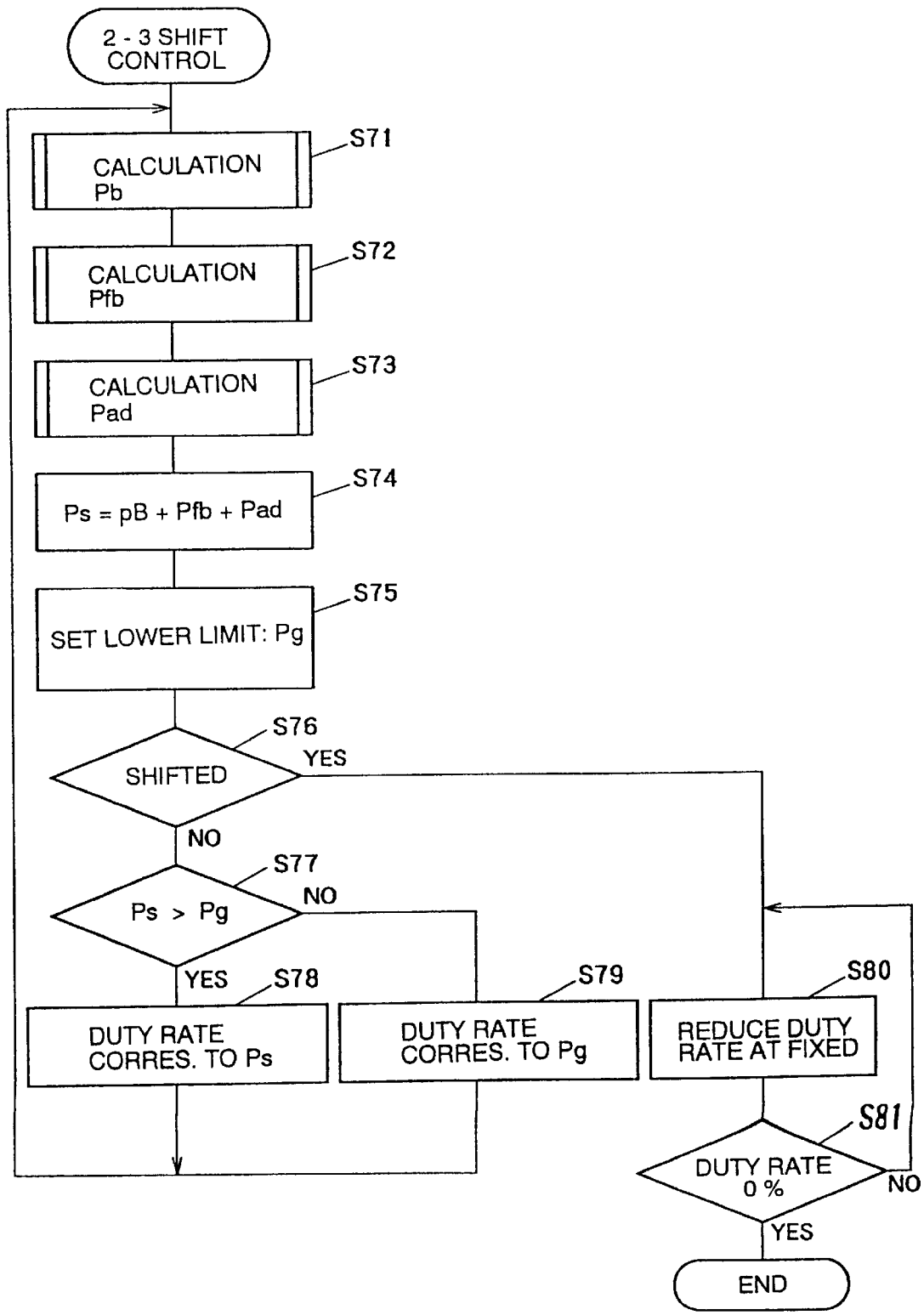
FIG. 35 is a flowchart illustrating the sequence routine of first duty solenoid control during a 2–3 gear shift.
Figure 36:
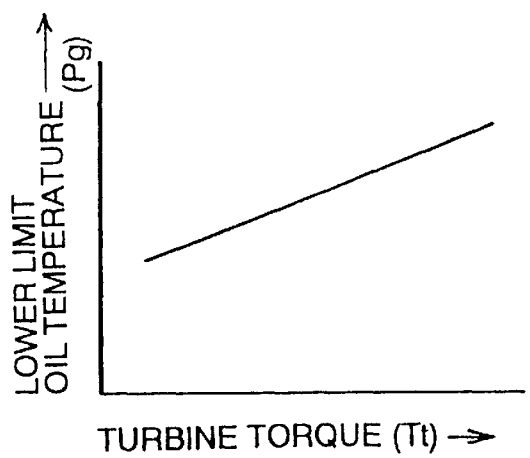
FIG. 36 is a map of lower limit hydraulic pressure with respect to turbine torque used during the 2–3 gear shift.
Figure 37:
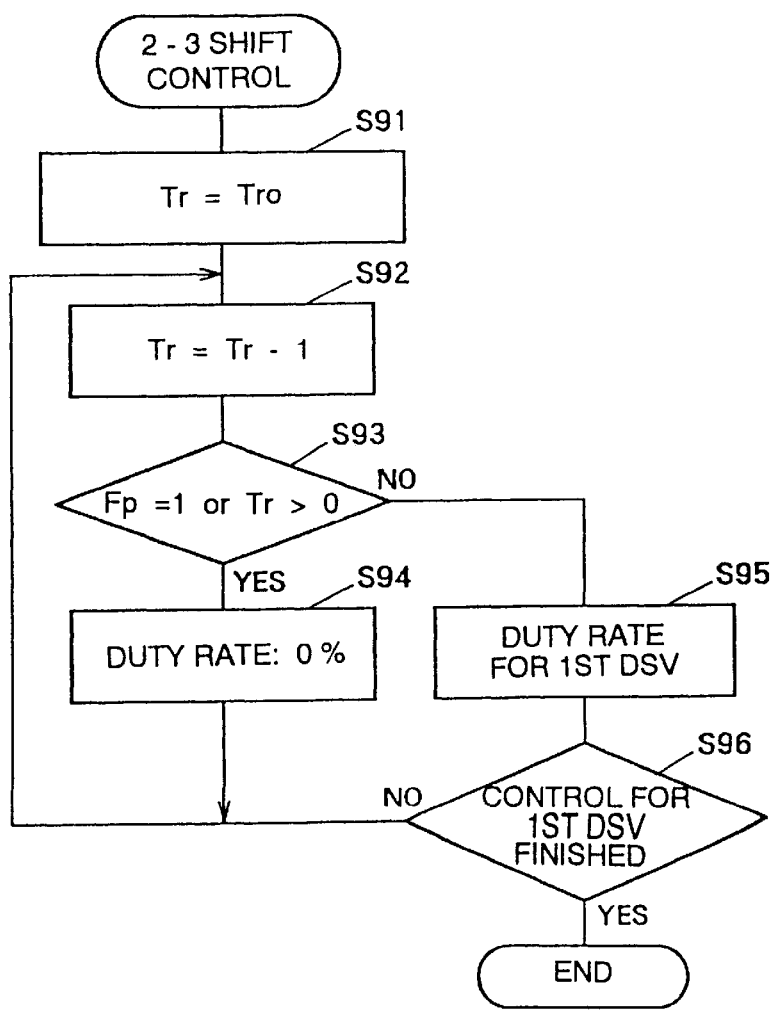
FIG. 37 is a flowchart illustrating the sequence routine of second duty solenoid valve control during the 2–3 gear shift.
Figure 38:
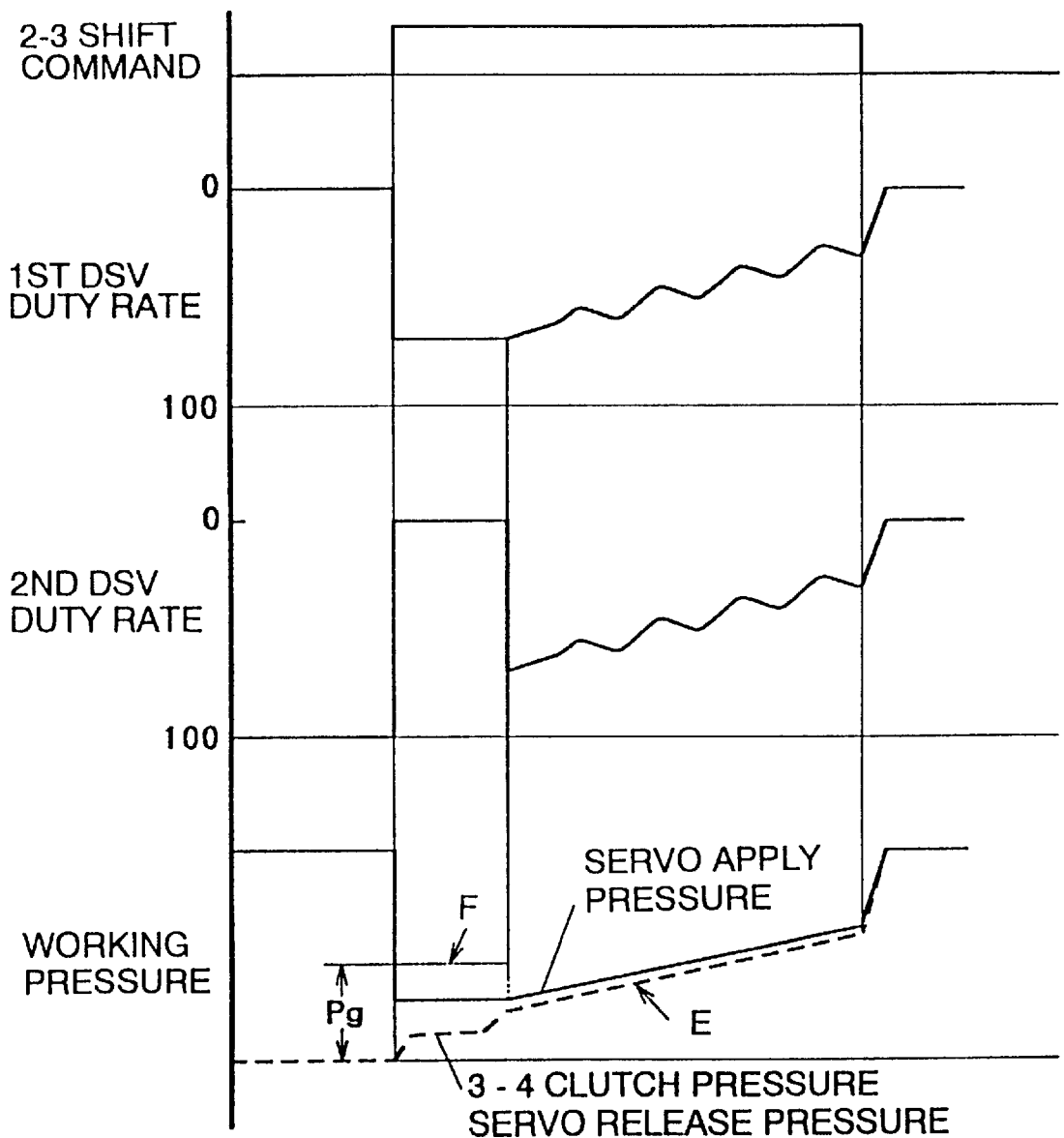
FIG. 38 is a time chart illustrating controlling and controlled parameters during the 2–3 gear shift.

Control of the first and second duty solenoid valves 121 and 122 is accomplished following the flowcharts illustrating the sequence routines shown in FIGS. 35 and 37, respectively. In the sequence routine of the first duty solenoid valve control shown by the flowchart in FIG. 35, steps S71 through S74 are identical in function with steps S1 through S4 of the flowchart illustrating the first duty solenoid valve control during the 1–2 up shift shown in FIG. 14, respectively. When the calculated hydraulic pressure Ps is obtained, after reading a lower limit hydraulic pressure Pg in accordance with the turbine torque Tr from a limit pressure map such as shown in FIG. 36 at step S75, a determination is made at step S76 as to whether or not the 2–3 up shift has been concluded. Until a conclusion of the 2–3 up shift, the calculated hydraulic pressure Ps is compared with the lower limit hydraulic pressure Pg at step S77. When it is determined that the calculated hydraulic pressure Ps is higher than the lower limit hydraulic pressure Pg, the first duty solenoid valve 121 is operated at a duty rate corresponding to the calculated hydraulic pressure Ps at step S78. On the other hand, when the calculated hydraulic pressure Ps is equal to or lower than the lower limit hydraulic pressure Pg, the first duty solenoid valve 121 is operated at a duty rate corresponding to the lower limit hydraulic pressure Pg at step S79. In this instance, before the 2–3 up shift, the first duty solenoid valve 121 is operated at a duty rate of 0% to supply a servo apply pressure, the precharge period control is not performed. When it is determined at step S76 that the 2–3 up shift has concluded, the duty rate of the first duty solenoid valve 121 is reduced at a fixed rate to 0% through steps S80 and S81, and the first duty solenoid valve control is terminated. As shown in FIG. 38, through the first duty solenoid valve control, the servo apply pressure drops from a specified level to a level of shelf pressure, and increases again to the specified level after the passage of time of the shelf pressure. While the shelf pressure remains held, both 3–4 clutch pressure and servo release pressure are controlled to hold a shelf pressure level corresponding to the servo apply pressure as labeled "E" in FIG. 38. As will be described in detail later, in cases where the target of servo apply pressure drops lower than the lower limit hydraulic pressure Pg immediately after an appearance of a gear shift command, the servo apply pressure is set to be equal to the lower limit hydraulic pressure Pg as labeled "F."

In the sequence routine of the second duty solenoid valve control shown by the flowchart in FIG. 37 for the 2–3 up shift, the flowchart logic commences and control passes directly to a function block at S91 where initialization is made to reset the timer count Tr to a specified initial count $Tr_0$. Subsequently, after changing the timer count Tr by a decrement of 1 (one) at step S92, a determination is made at step S93 as to whether or not the precharge flag Fp has been up or whether or not the timer count Tr is greater than 0 (zero) i.e. the timer count Tr has been counted down smaller than the initial count $Tr_0$. When the precharge flag Fp is up or when the timer count Tr has not yet counted down smaller than the initial count $Tr_0$, the second duty solenoid valve 122 is operated at a duty rate of 0% at step S94 to precharge rapidly the fluid paths leading to the pressure chamber of the 3–4 clutch 53 and the servo release pressure chamber 54b of the 2–4 brake 54, respectively, with the working fluid.

Thereafter, while the timer count Tr shows it counts of 0 (zero), i.e. has counted down over the initial count $Tr_0$, when the precharge flag Fp is reset to the state of "0," this indicates that the precharge period has terminated, then, at step S95, the second duty solenoid valve 122 is operated at the same duty rate as for the first duty solenoid valve 121 in the event where, while the 2–3 up shift is not concluded, the calculated hydraulic pressure Ps is higher than the lower limit hydraulic pressure Pg. As a result, the flowing quantities of working fluid supplied to the pressure chamber of the 3–4 clutch 53 and the servo release pressure chamber 54b of the 2–4 brake 54 through the orifice 151 is reduced after the precharge period lower than during the precharge period, and regulated to an appropriate quantity. The reason why the termination of precharge period is determined on the basis not only of the state of the precharge flag Fp but also of the passage of time from an appearance of a gear shift command.

In the event where the first and second duty solenoid valves 121 and 122 are operated at a same duty rate to supply a same level of working pressure to the 2–4 brake 54 at the servo apply pressure chamber 54a and the servo release pressure chamber 54b, because the piston 54e has approximately equal pressure surface areas on the sides of the servo apply pressure chamber 54a and the servo release pressure chamber 54b, the piston 54e is forced to travel in such a direction as to release the 2–4 brake 54 only by the force of the spring 54i, and lays a relatively long time on this travel. Thereafter, the control of second duty solenoid valve 122 is terminated following the determination that the control of first duty solenoid valve 121 has been over at step S96. As a result, during the locking of the 3–4 clutch 53, the shelf pressure is held for a duration of time sufficiently long for the inertia phase to conclude, eliminating a serious shift shock caused due, for example, to a sharp increase in working pressure resulting from a termination of the duration of shelf pressure before the conclusion of the inertia phase.

(8) Hydraulic Pressure Drop Control During 2–3 Up Shift

During the 2–3 up shift in which the 3–4 clutch pressure is indirectly controlled by means of the servo apply pressure during the 2–3 up shift, a servo apply pressure having been supplied at a relatively high pressure level in the state of second (2nd) gear is lowered once upon an appearance of a gear shift command and kept at the lowered pressure level for a duration of time sufficient to provide a torque phase in order to initiate smooth control of the 3–4 clutch pressure in an inertia phase. In this case, the initial base pressure Pb', a correction with the learned pressure Pad of which is equivalent to the calculated hydraulic pressure Ps in the torque phase and on the basis of which the feedback control of servo apply pressure is initiated, is given through a correction of the hydraulic pressure Pi for a target turbine speed change rate $dNt_0$ with hydraulic pressures Pt and Pt2 for target turbine torque $Tt_0$ and its square $(Tt_0)^2$, respectively, as was described on a 1–2 up shift. Accordingly, for example, when a 2–3 up shift is intentionally caused in a range of Row engine speeds by the driver, the initial base pressure Pb', i.e. the servo apply pressure during a torque phase, is relatively low because the hydraulic pressure Pi is low. However, while the gear shift occurs, when the engine throttle opens largely and the engine encounters higher loads, the servo apply pressure is insufficient against input torque to the 2–4 brake 54, allowing slippage of the 2–4 brake 54 before commencement of the locking of the 3–4 clutch 53 in the inertia phase which always results in an occurrence of an engine blow.

Figure 39:
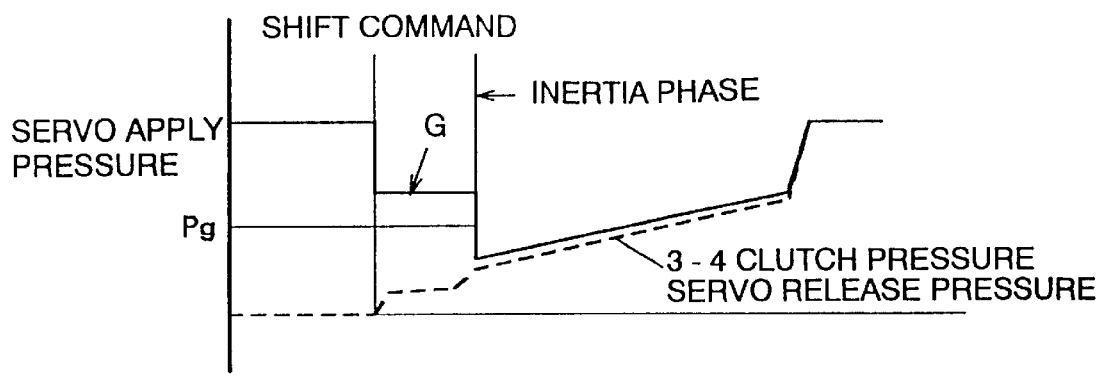
FIG. 39 is a time chart illustrating another example of servo apply pressure control during the 2–3 gear shift.
Figure 40:
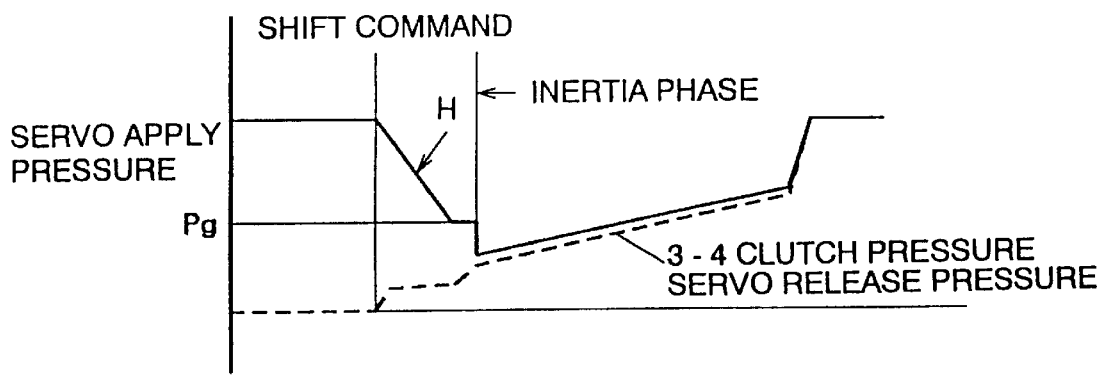
FIG. 40 is a time chart illustrating still another example of servo apply pressure control during the 2–3 gear shift.

In order to prevent the engine from encountering an engine blow during this kind of gear shift, at steps S95 through S99 of the flowchart in FIG. 35 the lower limit hydraulic pressure Pg set in accordance with the turbine torque Tt input to the transmission gear mechanism is substituted for the calculated hydraulic pressure Ps for the determination of a duty rate at which the first duty solenoid valve 121 is operated when it is exceeded by the calculated hydraulic pressure Ps. As a result, the servo apply pressure in the torque phase is prevented from falling below a pressure level corresponding to the input torque to the 2–4 brake 54, arresting slippage of the 2–4 brake 54 before commencement of the locking of the 3–4 clutch 53 in the inertia phase. In the case where the servo apply pressure is fallen upon an appearance of a gear shift command, while it is preferred for smooth commencement of the feedback control at the shift from a torque phase to an inertia phase to make the servo apply pressure equal to the standard pressure on the basis of which the feedback control is performed in the inertia phase, nevertheless, the servo apply pressure may be fallen to an intermediate pressure level between the pressures before the gear shift and during the inertia phase as labeled "G" in FIG. 39, or otherwise, may be gradually fallen from the pressure before the gear shift until the commencement of the inertia phase as labeled "H" in FIG. 40. In any case, when the servo apply pressure is on the point of falling below the lower limit hydraulic pressure Pg set in accordance with the turbine torque Tt in the torque phase, it is kept not to fall exceeding the lower limit hydraulic pressure Pg, preventing an occurrence of an engine blow.

(9) Precharge Control During 2–3 Up Shift

Figure 41:
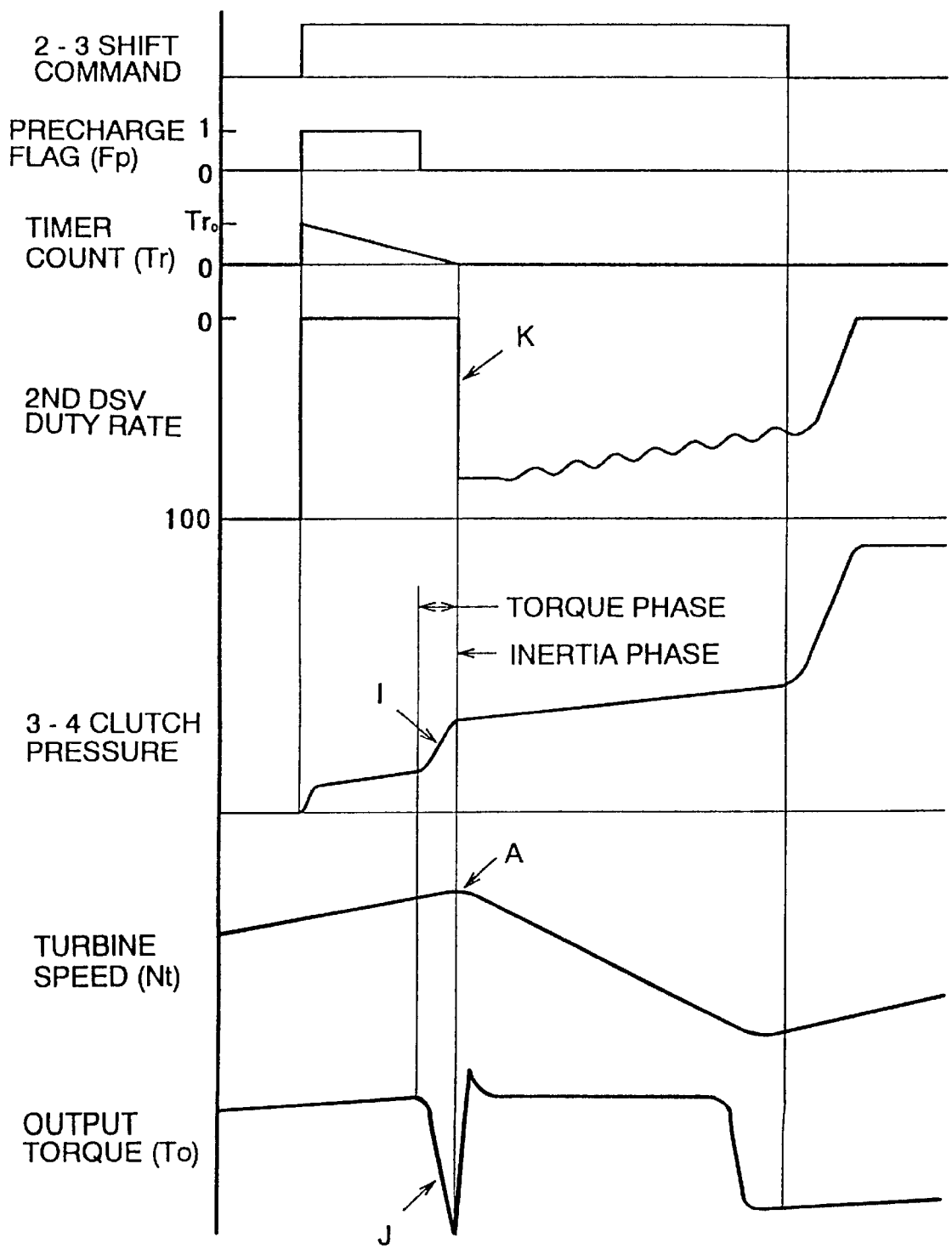
FIG. 41 is a time chart illustrating controlling and controlled parameters in the precharge control during the 2–3 gear shift.

The precharge control during the 2–3 up shift is different from the precharge control for the servo apply pressure chamber 54a of the 2–4 brake 54 during the 1–2 up shift in respect that the precharge period for the servo apply and servo release pressure chambers 54a and 54b of the 2–4 brake 54 is determined on the basis not only of the state of the precharge flag Fp but also of the passage of time from an appearance of a gear shift command. As shown in FIG. 41, in general, when a working pressure is supplied to a friction coupling element, such as the 3–4 clutch 53, during up shifts, the working pressure increases as labeled "I" through a travel of the piston to an extreme end to initiate a torque phase. At this time, a torque draw such as labeled "J," which refers to a temporary drop in output torque To, occurs and is one of causes from which a serious shift shock results when input torque to the transmission gear mechanism is large. In regard to making the adverse effect of a torque draw to a gear shift feeling less strong, it can be considered to be effective to shorten the duration of torque draw or the duration of torque phase in which the torque draw occurs, or otherwise to increase a rate at which the working pressure increases in the torque phase to eventually shorten the duration of torque phase. On account of this consideration, the precharge control is adequately performed to shorten the duration of torque phase.

Figure 42:
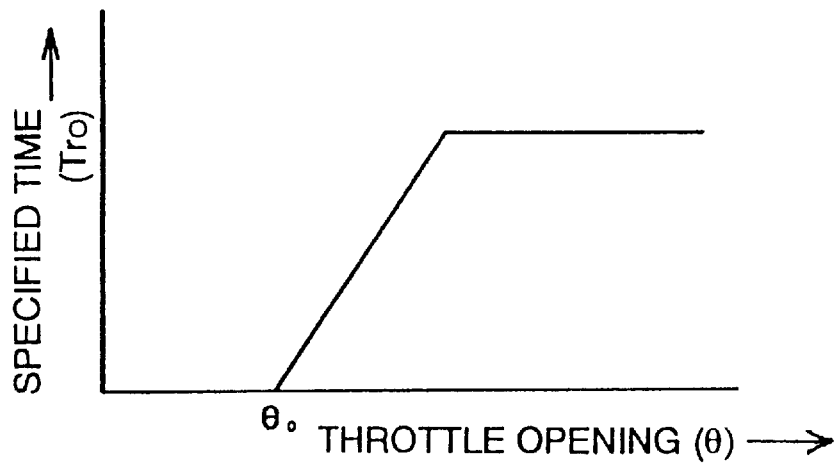
FIG. 42 is a map of initial count with respect to engine throttle opening used in the precharge control.

As was previously described, as a result of the determination concerning the up state of precharge flag Fp and the timer count Tr made at step 403 of the flowchart shown in FIG. 37, while the precharge flag Fp is down, when the timer count Tr is greater than 0 (zero), this indicates that the initial count $Tr_0$ has been counted down from an appearance of a gear shift command, after terminating the precharge control for the first time, the control proceeds to the supply of calculated pressure Ps through the second duty solenoid valve 122. In this instance, an initial count map specifies the initial count $Tr_0$ so as to be greater as the throttle opening θ becomes greater as shown in FIG. 42. Consequently, when input torque from the engine is great, the precharge control is continued after a shift of control to the inertia phase resulting from having filled the specific fluid path with the working fluid, for example as labeled "K", until the point of time of entering into the inertia phase as labeled "A" in FIG. 41. Resultingly, an increase in the rate at which the working pressure rises in the torque phase as labeled "I" in FIG. 41 is yielded, which is accompanied by a shortened duration of torque phase or a torque draw occurring in the shortened duration of torque phase, making aggravation of a gear shift feeling due to a shift shock less intense. Because, during the 2–3 up shift, the shelf pressure control on locking the 3–4 brake 53 is performed by controlling the servo apply pressure to the servo apply pressure chamber 54a of the 2–4 brake 54 through the first duty solenoid valve 121, even continuing the precharge control until the point of time of entering into the inertia phase does not affect the control of inertia phase in which the turbine speed Nt is fallen keeping the turbine speed change rate dNt in agreement with the target turbine speed change rate $dNt_0$. Consequently, while the control of inertia phase is satisfactorily maintained, a shift shock during the torque phase is made less strong.

Figure 43:
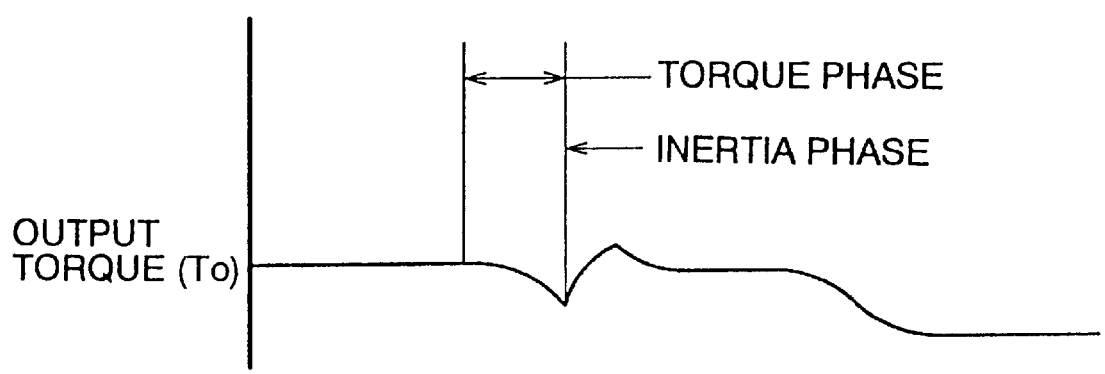
FIG. 43 is an explanatory diagram of transmission output torque during the precharge control when transmission input torque is low.

Because the initial count $Tr_0$ is set to 0 (zero) for throttle openings θ less than a specified opening $θ_0$ as shown in FIG. 42, the determination of termination of the precharge control is made on the basis of the state of the precharge flag Fp only in a range of low input torque, during the 2–3 up shift similarly to during other up shifts. Consequently, during a gear shift in which the output torque To changes gently without being accompanied by a significant torque draw and a significant torque blow, which refers to an phenomenon of a temporary sharp rise in output torque occurring at a shift of control from the torque phase to the inertia phase immediately after the torque draw, as shown in FIG. 43, the condition for the gentle change of output torque To is maintained, preventing an occurrence of another shift shock due to increasing the rate of rise of the working pressure.

Figure 44:
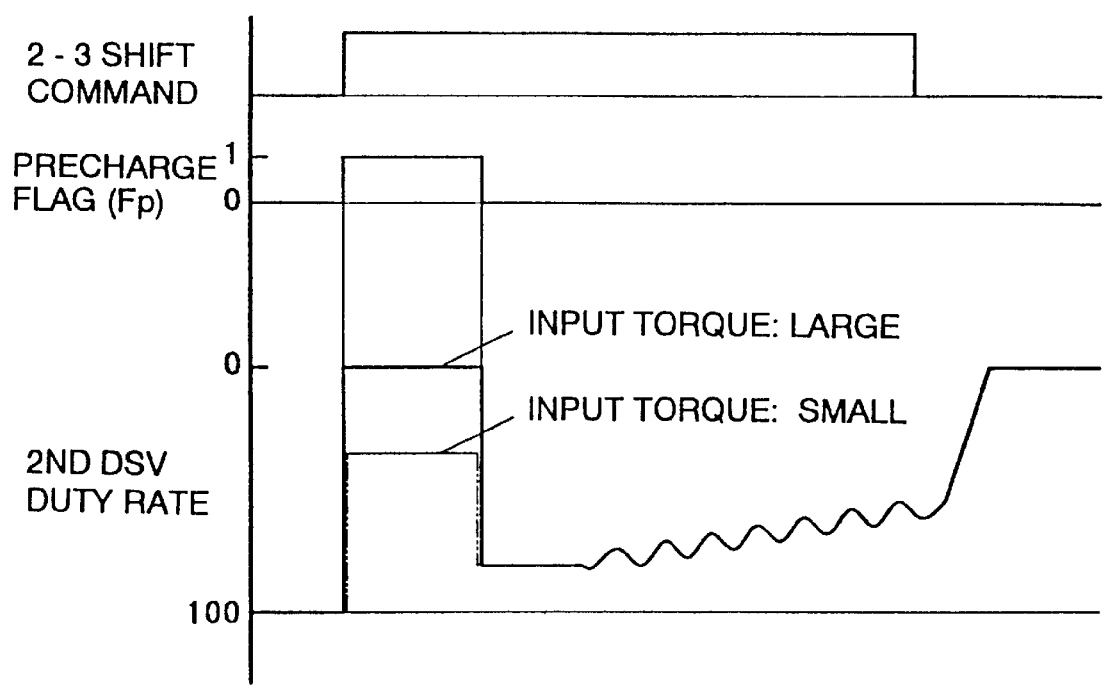
FIG. 44 is a time chart illustrating controlling and controlled parameters during the precharge control in the 2–3 gear shift.

The precharge control may be started at, instead of an appearance of a gear shift command, the beginning of a torque phase at which the output torque To begins to fall for example. The precharge period may be set constant. In this case, as shown in FIG. 44, the flowing quantity of working fluid passing through the second duty solenoid valve 122 is increased larger with an increase in input torque by operating the second duty solenoid valve 122 at a duty rate of 0% for larger input torque and at a duty rate larger than 0% for smaller input torque. Furthermore, both precharge period and flowing quantity during the precharge period may be changed in accordance with input torque.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. An automatic transmission control system for controlling an automatic transmission installed between an engine and drive wheels of an automotive vehicle to multiply and transmit engine output to said drive wheels from said engine, said automatic transmission comprising a working fluid source operative to provide working fluid pressure, a transmission gear mechanism with a plurality of friction coupling elements including at least a first friction coupling element which has a locking pressure chamber and an unlocking pressure chamber divided by a piston and which is locked when only said locking pressure chamber of said first friction coupling element is supplied with said working fluid pressure and is unlocked when at least said unlocking pressure chamber of said first friction coupling element is supplied with said working pressure and when neither said locking pressure chamber of said first friction coupling element nor said unlocking pressure chamber of said first friction coupling element is supplied with said working fluid pressure and a second friction coupling element which has a pressure chamber communicated with said unlocking pressure chamber of said first friction coupling element through a communication fluid path and which is locked when said pressure chamber of said second friction coupling element is supplied with said working fluid pressure, and a hydraulic pressure control system operative to control supply of said working fluid pressure to and discharge of said working fluid pressure from pressure chambers of said friction coupling elements to selectively lock and unlock said friction coupling elements according to driving conditions so as to change a torque transmission path in said transmission gear mechanism and thereby to provide available gears including a first specific gear which is achieved when said locking pressure chamber of said first friction coupling element is supplied with said working fluid pressure and neither said unlocking pressure chamber of said first friction coupling element nor said pressure chamber of said second friction coupling element is supplied with said working fluid pressure and a second specific gear which is achieved when both said locking pressure chamber and said unlocking pressure chamber of said first friction coupling element and said pressure chamber of said second friction coupling element are supplied with said working fluid pressure, said automatic transmission control system comprising:

a speed sensor operative to detect a vehicle speed of the automotive vehicle;

a throttle position sensor operative to detect a position of a throttle of said engine;

a torque sensor operative to detect input torque transmitted to said transmission gear mechanism from said engine;

first working fluid pressure control means installed in a fluid path extending from said working fluid source to both said unlocking pressure chamber of said first friction coupling element and said pressure chamber of said second friction coupling element upstream from said communication fluid path for controlling supply of said working fluid pressure to and discharge of said working fluid pressure from both said unlocking pressure chamber of said first friction coupling element and said pressure chamber of said second friction coupling element;

second working fluid pressure control means installed in a fluid path extending from said fluid pressure source to said locking pressure chamber of said first friction coupling element for controlling supply of said working fluid pressure to and discharge of said working fluid pressure from said locking pressure chamber of said first friction coupling element; and control means for providing a gear shift command signal indicating one of said available gears selected according to said throttle position and controlling said first working fluid pressure control means and said second working fluid pressure control means according to said gear shift command signal, said control means controlling, during a specific gear shift from said first specific gear to said second specific gear responding to an appearance of a specific gear shift command signal, said second working fluid pressure control means according to said input torque such that a level of said working fluid pressure supplied to said locking pressure chamber of said first friction coupling element for a substantial gear shift period of time for which a change in input speed to said transmission gear mechanism occurs due to said specific gear shift becomes lower than a level of said working fluid pressure supplied to said locking pressure chamber of said first friction coupling element immediately before said appearance of said specific gear shift command signal and a level of said working fluid pressure supplied to said locking pressure chamber of said first friction coupling element after said substantial gear shift period of time, and that, until a start of said substantial gear shift period of time from said appearance of said specific gear shift command signal, a level of said working fluid pressure supplied to said locking pressure chamber of said first friction coupling element becomes close to a level of said working fluid pressure supplied to said locking pressure chamber of said first friction coupling element during said substantial gear shift period of time and retains said level of said working fluid pressure supplied to said locking pressure chamber of said first friction coupling element higher than a specified level at which said input speed to said transmission gear mechanism is allowed to run idle.

2. The automatic transmission control system as defined in claim 1, wherein said control means controls said second working fluid pressure control means such that, until a start of said substantial gear shift period of time from said appearance of said specific gear shift command signal, said level of said working fluid pressure supplied to said locking pressure chamber of said first friction coupling element becomes equal to said level of said working fluid pressure supplied to said locking pressure chamber of said first friction coupling element during said substantial gear shift period of time.

3. The automatic transmission control system as defined in claim 2, wherein said control means controls said second working fluid pressure control means such that, until a start of said substantial gear shift period of time from said appearance of said specific gear shift command signal, said level of said working fluid pressure supplied to said locking pressure chamber of said first friction coupling element retains higher than a lower limit of said working fluid pressure specified according to said input torque so as to retain said level of said working fluid pressure supplied to said locking pressure chamber of said first friction coupling element higher than said specified level.

4. The automatic transmission control system as defined in claim 3, wherein said control means controls said lower limit of said working fluid pressure to become higher with an increase in said input torque.

5. An automatic transmission control system for controlling an automatic transmission installed between an engine and drive wheels of an automotive vehicle to multiply and transmit engine output to said drive wheels from said engine, said automatic transmission comprising a working fluid source operative to provide working fluid pressure, a transmission gear mechanism with a plurality of friction coupling elements including at least a first friction coupling element which has a locking pressure chamber and an unlocking pressure chamber divided by a piston and which is locked when only said locking pressure chamber of said first friction coupling element is supplied with said working fluid pressure and is unlocked when at least said unlocking pressure chamber of said first friction coupling element is supplied with said working pressure and when neither said locking pressure chamber of said first friction coupling element nor said unlocking pressure chamber of said first friction coupling element is supplied with said working fluid pressure and a second friction coupling element which has a pressure chamber communicated with said unlocking pressure chamber of said first friction coupling element through a communication fluid path and which is locked when said pressure chamber of said second friction coupling element is supplied with said working fluid pressure, and a hydraulic pressure control system operative to control supply of said working fluid pressure to and discharge of said working fluid pressure from pressure chambers of said friction coupling elements to selectively lock and unlock said friction coupling elements according to driving conditions so as to change a torque transmission path in said transmission gear mechanism and thereby to provide available gears including a first specific gear which is achieved when said locking pressure chamber of said first friction coupling element is supplied with said working fluid pressure and neither said unlocking pressure chamber of said first friction coupling element nor said pressure chamber of said second friction coupling element is supplied with said working fluid pressure and a second specific gear which is achieved when both said locking pressure chamber and said unlocking pressure chamber of said first friction coupling element and said pressure chamber of said second friction coupling element are supplied with said working fluid pressure, said automatic transmission control system comprising:

a speed sensor operative to detect a vehicle speed of the automotive vehicle;

a throttle position sensor operative to detect a position of a throttle of said engine;

a torque sensor operative to detect input torque transmitted to said transmission gear mechanism from said engine;

a first solenoid valve installed in a fluid path extending from said working fluid source to both said unlocking pressure chamber of said first friction coupling element and said pressure chamber of said second friction coupling element upstream from said communication fluid path for controlling supply of said working fluid pressure to and discharge of said working fluid pressure from both said unlocking pressure chamber of said first friction coupling element and said pressure chamber of said second friction coupling element;

a second solenoid valve installed in a fluid path, which extends from said fluid pressure source to said locking pressure chamber of said first friction coupling element, for controlling supply of said working fluid pressure to and discharge of said working fluid pressure from said locking pressure chamber of said first friction coupling element; and a controller operative to provide a gear shift command signal indicating one of said available gears selected according to said vehicle speed, said throttle position and said input torque and to control said first and second solenoid valves according to said gear shift command signal, said controller, during a specific gear shift from said first specific gear to said second specific gear responding to an appearance of a specific gear shift command signal, said second solenoid valve according to said input torque such that a level of said working fluid pressure supplied to said locking pressure chamber of said first friction coupling element for a substantial gear shift period of time for which a change in input speed to said transmission gear mechanism occurs due to said specific gear shift becomes lower than a level of said working fluid pressure supplied to said locking pressure chamber of said first friction coupling element immediately before said appearance of said specific gear shift command signal and a level of said working fluid pressure supplied to said locking pressure chamber of said first friction coupling element after said substantial gear shift period of time, and that, until a start of said substantial gear shift period of time from said appearance of said specific gear shift command signal, a level of said working fluid pressure supplied to said locking pressure chamber of said first friction coupling element becomes close to a level of said working fluid pressure supplied to said locking pressure chamber of said first friction coupling element during said substantial gear shift period of time and retains said level of said working fluid pressure supplied to said locking pressure chamber of said first friction coupling element higher than a specified level at which said input speed to said transmission gear mechanism allows to run idle.

6. The automatic transmission control system as defined in claim 5, wherein said controller controls said second solenoid valve such that, until a start of said substantial gear shift period of time from said appearance of said specific gear shift command signal, said level of said working fluid pressure supplied to said locking pressure chamber of said first friction coupling element retains higher than a lower limit of said working fluid pressure specified according to said input torque so as to retain said level of said working fluid pressure supplied to said locking pressure chamber of said first friction coupling element higher than said specified level.

7. The automatic transmission control system as defined in claim 6, wherein said controller controls said lower limit of said working fluid pressure to become higher with an increase in said input torque.

* * * * *